(12) United States Patent
Bowers et al.

(10) Patent No.: US 6,994,782 B2
(45) Date of Patent: Feb. 7, 2006

(54) APPARATUS FOR REMOVING PHOSPHORUS FROM WASTE LAGOON EFFLUENT

(75) Inventors: Keith E. Bowers, Seattle, WA (US); Philip W. Westerman, Raleigh, NC (US)

(73) Assignee: North Carolina State University, Raleigh, NC (US)

( * ) Notice: Subject to any disclaimer, the term of this patent is extended or adjusted under 35 U.S.C. 154(b) by 63 days.

(21) Appl. No.: 10/659,239

(22) Filed: Sep. 9, 2003

(65) Prior Publication Data

US 2005/0051495 A1  Mar. 10, 2005

(51) Int. Cl.
  *C02F 1/58* (2006.01)
(52) U.S. Cl. ............. 210/127; 210/128; 210/192; 210/199; 210/206; 210/257.1; 210/258
(58) Field of Classification Search ......... 210/127, 210/128, 192, 199, 205, 206, 257.1, 258, 210/715, 906
See application file for complete search history.

(56) References Cited

U.S. PATENT DOCUMENTS

| | | | |
|---|---|---|---|
| 3,892,539 A | 7/1975 | Midler, Jr. ............ 23/301 |
| 4,389,317 A | 6/1983 | Trentelman et al. ........ 210/715 |
| 5,360,546 A | 11/1994 | Tomita et al. ........... 210/603 |
| 6,235,203 B1 * | 5/2001 | Lee et al. .............. 210/711 |
| 6,287,471 B1 | 9/2001 | De Rigaud ............. 210/724 |
| 6,338,799 B1 * | 1/2002 | Fukushima et al. ........ 210/631 |
| 6,406,629 B1 | 6/2002 | Husain et al. ............ 210/605 |
| 6,409,788 B1 * | 6/2002 | Sower .................. 71/11 |

* cited by examiner

*Primary Examiner*—Peter A. Hruskoci
(74) *Attorney, Agent, or Firm*—Jenkins, Wilson & Taylor, P.A.

(57) ABSTRACT

An apparatus and method for removing phosphorus from a wastewater effluent stream from a hog waste lagoon. The wastewater effluent is introduced to the bottom of an inverted cone-shaped continuous crystallizer including a fluidized bed of struvite therein. An effective amount of ammonia is introduced to the wastewater effluent at the bottom of the crystallizer to elevate the pH of wastewater effluent a predetermined amount. An effective amount of magnesium is also introduced to the wastewater effluent at the bottom of the crystallizer. The composition adjusted wastewater effluent is then continuously passed upwardly through the fluidized bed of struvite to reduce the total phosphorus content of the wastewater effluent a predetermined amount of up to about 80% or more. The treated wastewater effluent stream is removed from the top of the crystallizer, and struvite crystals that grow large enough to sink from the bottom of the crystallizer are periodically removed from a collection chamber therebeneath.

12 Claims, 27 Drawing Sheets

Schematic Representation of Field-Scale Crystallizer, Showing Principal Components Variation of Equilibrium Conditional Solubility versus pH for Struvite
(from Ohlinger et al., 1998)

Free Energy versus Number of Particles in a Precipitating Crystal

Concentration (−1/3 log of Ionic Product, Mol/L) versus Induction Time (Sec) for Struvite Precipitation Breakdown of Phosphorus Content (ppm) by Form in
Rocky Mount and Clayton Effluent Breakdown of Mg Content (ppm) by Form in
Rocky Mount and Clayton Effluent Sketch of Laboratory-Scale Continuous Crystallizer First Series of FCRs: Phosphorus Reduction (fraction) vs.
Operating Time (h)
(Run Numbers Indicated)

First Series of FCRs: OP (ppm) at Various Sampling Points
vs. Operating Time (h)
(Run Numbers Indicated)

Second Series of FCRs: Bed Weight (g), Broken Down by
Particle Size (Standard Sieve), vs. Time Operated (h)
(Numbered Vertical Strips Correspond with Runs)

Second Series of FCRs: Bed Height (cm) at End of Run
vs. Operating Time (h)
(Run Numbers Indicated)

Second Series of FCRs: Production (g/h), Averaged Over Each Run,
Broken Down by Particle Size (Standard Sieve)
(Numbered Vertical Strips Correspond with Runs)

Second Series of FCRs: Phosphorus Reduction (fraction) vs.
Operating Time (h)
(Run Numbers Indicated)

Second Series of FCRs: OP (ppm) at Various Sampling Points
vs. Operating Time (h)
(Run Numbers Indicated)

Third Series of FCRs: Bed Weight (g), Broken Down by
Particle Size (Standard Sieve), vs. Time Operated (h)
(Numbered Vertical Strips Correspond with Runs)

Third Series of FCRs: Bed Height (cm) at End of Run vs.
Operating Time (h)
(Run Numbers Indicated)

Third Series of FCRs: Production (g/h), Averaged Over Each Run,
Broken Down by Particle Size (Standard Sieve)
(Numbered Vertical Strips Correspond with Runs)

Third Series of FCRs: Phosphorus Reduction (fraction) vs. Operating Time (h)
(Run Numbers Indicated)

Third Series of FCRs: OP (ppm) at Various Sampling Points vs. Operating Time (h)
(Run Numbers Indicated)

MVRs: OP Removal (%) vs. Mg Addition (ppm) with 200 ppm (as TAN) Ammonia and 41.2 L/h Flow MVRs: TP Removal (%) vs. Mg Addition (ppm) with Zero Ammonia and 41.2 L/h Flow MVRs: TP Removal (%) vs. Mg Addition (ppm) with 100 ppm (as TAN) Ammonia and 41.2 L/h Flow MVRs: TP Removal (%) vs. Mg Addition (ppm) with 200 ppm (as TAN) Ammonia and 41.2 L/h Flow MVRs: OP Removal (%) vs. Mg Addition (ppm) with 200 ppm (as TAN) Ammonia and 56.8 L/h Flow MVRs: TP Removal (%) vs. Mg Addition (ppm) with Zero Ammonia and 56.8 L/h Flow MVRs: TP Removal (%) vs. Mg Addition (ppm) with 100 ppm (as N) Ammonia and 56.8 L/h Flow MVRs: TP Removal (%) vs. Mg Addition (ppm) with 200 ppm (as N) Ammonia and 56.8 L/h Flow Schematic Representation of Field-Scale Crystallizer, Showing Principal Components TP Reduction (%) vs. Magnesium added (ppm) at Lower Flow Rate (341 L/h)

OP Reduction (%) vs. Magnesium added (ppm) at Lower Flow Rate (341 L/h)

TP Reduction (%) vs. Magnesium added (ppm)
at Higher Flow Rate (568 L/h)

OP Reduction (%) vs. Magnesium added (ppm)
at Higher Flow Rate (568 L/h)

APPARATUS FOR REMOVING PHOSPHORUS FROM WASTE LAGOON EFFLUENT

ABBREVIATIONS AND OTHER SYMBOLS

° C. Degrees Celsius
Ca Calcium
cc Cubic centimeters
cm Centimeters
$CO_2$ Carbon dioxide
dm Decimeters
° F. Degrees Fahrenheit
FCT Fixed-condition run
ft Feet
g Grams
gal Gallons
h Hours
HCl Hydrogen chloride (in water solution, hydrochloric acid)
in. Inches
kg Kilograms
kPa Kilopascals
L Liters
m Meters
mg Milligrams
Mg Magnesium
MgO Magnesium Oxide
min Minutes
MLMB Mixed liquid, mixed bed
mm Millimeters
MVR Multi-variate run
N Nitrogen
OP Orthophosphate Phosphorus
PLCB Plug-flow liquid, classified bed
PLMB Plug-flow liquid, mixed bed
PVC Polyvinyl chloride
ppm Parts per million
psi Pounds per square inch
s Seconds
TAN Total Ammoniacal nitrogen
TP Total Phosphorus
% Percent Other Symbols A=Cross-sectional area of the vessel at a given height (area).
[A]=Molar concentration of dissolved ammoniacal nitrogen in liquid in the reaction zone.
$[A]_0$=Molar concentration of dissolved ammoniacal nitrogen in liquid entering the reaction zone.
AM=Amount of ammonia addition, in ppm as N. Used in regression equations.
AP=Amount of pH adjustment by ammonia addition: zero, 0.5 pH rise, or 1.0 pH rise. Used in regression equations.
$C_0$=Concentration of struvite in the liquid phase entering the vessel (dimensionless). Specifically, the sum of the concentration of all OP species, expressed as mass $PO^{4-3}$ per mass of water; the concentration of magnesium ions, expressed as mass magnesium per mass of water; and the concentration of TAN, expressed as mass $NH_4^+$ per mass of water.
C=Concentration of struvite in the liquid phase at any height, expressed in the same manner as $C_0$ (dimensionless).
$F_j$=Moles per time of reactant exiting reaction zone of the crystallizer. For struvite, this is the moles per time of dissolved magnesium, ammoniacal nitrogen, and orthophosphate, the sum divided by three.
$F_{j0}$=Moles per time of reactant entering the crystallizer. For struvite, this is the moles per time of dissolved magnesium, ammoniacal nitrogen, and orthrophosphate, the sum divided by three.
FL=Liquid flow rate in field-scale crystallizer, in gallons per hour. Used in regression equations.
G=The rate of deposition of struvite onto a solid struvite particle surface (length per time). It is equal to $$\frac{dl}{dt}.$$

g=Acceleration of gravity (9.8 meters per second squared).
H=Height above bottom of vessel (length).
$H_t$=Height at top of vessel (length).
K=Equilibrium constant.
k'=Surface-area-specific reaction rate constant. It is the rate of drop in P per unit of surface area density at a given P (volume per time per area).
L=Radius of a solid struvite particle (length).
MG=Amount of Mg addition, in ppm. Used in regression equations.
m=Surface area on bed particles per volume of reaction zone (area per volume).
[M]=Molar concentration of dissolved magnesium in liquid in the reaction zone.
$[M]_0$=Molar concentration of dissolved magnesium in liquid entering the reaction zone.
n=number of ions in a particle.
n*=number of ions in a critical nucleus.
OPR=% reduction in OP. Used in regression equations.
pK=Negative base-10 logarithm of an equilibrium constant.
pKa=pH at which an acid at equilibrium is half protonated and half de-protonated.
P=Conditional solubility product. Equal to the sum of the molarities of all magnesium-containing species, $[Mg]_T$; times the sum of the molarities of all ammonia-containing species, $[NH_3]_T$; times the sum of the molarities of all the orthophosphate-containing species.
[P]=Molar concentration of dissolved orthophosphate in liquid in the reaction zone.
$[P]_0$=Molar concentration of dissolved orthophosphate in liquid entering the reaction zone.
$P_e$=P at struvite saturation at a given pH (moles cubed per volume cubed).
R=Universal gas constant.
$r_H$ =Radius of the cone at height H (length).
$r_{H+\Delta H}$=Radius of the cone at height H+ΔH (length).
$R_T$=Reynolds number, indicating the tendency toward turbulent flow (dimensionless).
Q=Flow rate of liquid phase entering the vessel (volume per time).
$r_A$=Reaction rate, expressed as moles of species A generated per time per volume of reaction zone. For struvite crystallization, it is minus one third of the sum of the moles of dissolved magnesium, ammoniacal nitrogen, and orthophosphate that precipitate per time from solution.

$r_j$=Reaction rate, expressed as moles of species j consumed per time per volume of reaction zone. For struvite crystallization, it is one third of the sum of the moles of dissolved magnesium, ammoniacal nitrogen, and orthophosphate that precipitate from a volume of solution per time.

S=Surface area content of the bed material (area per mass).

T=Absolute temperature.

t=Time.

TPR=% reduction in TP. Used in regression equations.

$U_s$=Superficial upward velocity of liquid phase (length per time). At a given point in the vessel, it is equal to the volumetric flow rate of the liquid divided by the cross-sectional area of the vessel at the height; i.e., it is the upward velocity the liquid would have if there were no bed.

$U_T$=Terminal velocity of a bed particle (length per time).

V=Volume of the reaction zone. In the crystallizer it is the portion occupied by the bed (volume).

$V_0$=Volumetric flow rate (volume per time).

W=Diameter of vessel at a given height (length).

$W_t$=Diameter of vessel at top (length).
  $W_0$=Diameter of vessel at bottom (length).

x=The number of moles per liter of struvite that have precipitated from solution, defined as: x={$([M]_0-[M])+([A]_0-[A])+([P]_0-[P])$} over 3 z=Expansion index (dimensionless).

α=Volume factor for a solid struvite particle (dimensionless). Multiplying it by $L^3$ gives the volume of the particle. For example, for a sphere, the volume factor is $4\pi/3$.

β=Surface factor for a solid struvite particle (dimensionless). Multiplying it by $L^2$ gives the surface area of the particle. for example, for a sphere, the surface factor is $4\pi$.

ΔG=Molar Gibbs energy difference between individual ions in solution and ions in an infinite crystal.

$\Delta G_f^0$=Standard molar Gibbs energy of formation.

$\Delta G_r^0$=Standard molar Gibbs energy reaction.

ΔH=Difference in height between the upper and lower horizontal surfaces of a horizontal slice of the vessel selected arbitrarily for analysis (length).

$\Delta t_i$=Induction time.

ε=Void fraction; that is, the fraction of volume occupied by the liquid phase at a given height in the vessel (dimensionless).

φ=Gibbs energy difference between individual ions in solution and ions in infinite crystal.

γ=Diameter factor for a solid struvite particle (dimensionless). Multiplying it by L gives the diameter of the particle. For example, for a sphere, the diameter factor is 2.

$\mu$=Viscosity of the solution (mass per length per time).

P=Density of the liquid phase (mass per volume).

$P_p$=Density of struvite particles (mass per volume).

$P_p^*$=Density of struvite excluding the weight of the water of crystallization (mass per volume).

ψ=Constant of proportionality relating free surface energy to $N^{2/3}$.

FIELD OF THE INVENTION

The present invention relates to wastewater effluent treatment and more particularly to a method and apparatus for removing phosphorus from wastewater effluent such as hog lagoon effluent.

RELATED ART

Livestock manure or waste, which contains nutrients such as carbon, nitrogen, and phosphorus, is often flushed with water from animal confinement areas into a lagoon for treatment and storage. From the lagoon, wastewater is recycled back into the confinement area for flushing. In addition, to avoid the over-filing of the lagoon that would otherwise result from the net inputs of waste and possible rainwater, an effluent stream is withdrawn and directed as irrigation water onto soil supporting crops.

In the lagoon, anaerobic microbes remove carbon by converting it into the volatile gases carbon dioxide and methane. These gases may escape to the atmosphere or be collected as biogas and combusted for energy recovery.

Nitrogen, which exists primarily in forms of ammonia in the lagoon, may partly volatilize into the atmosphere from the lagoon or during irrigation. The crop acreage is typically calculated to allow for uptake by the crops of the applied nitrogen from the soil, thus minimizing movement of nitrogen in ground and surface water beyond the farm's boundaries. In addition, to reduce the amount of ammonia escaping to the atmosphere and/or to reduce the demand for nitrogen uptake by crops, processes are under development for removal of nitrogen by microbes. In these processes, aerobic microbes convert ammoniacal forms of nitrogen to oxidized forms such as nitrate, followed by conversion of the oxidized forms to nitrogen gas by anaerobic microbes. The nitrogen gas escapes to the atmosphere, thus removing nitrogen.

Unlike carbon and nitrogen, phosphorus cannot volatilize from the system. In the lagoon, it exists partly as organic phosphorus and partly as orthophosphate phosphorus (OP), neither of which can evaporate or be converted by microbes to gaseous forms. Some phosphorus may be removed from the wastewater by settling of phosphorus-containing solids to the lagoon bottom; however, this process does not ultimately remove the nutrient from the system, and appreciable phosphorus remains dissolved in the lagoon water. The irrigated crops typically take up from the soil less phosphorus than that applied in the irrigation water, because the acreage has been calculated for nitrogen removal, which requires less acreage. The soil absorbs phosphorus, but over time reaches saturation. Additional application of phosphorus can cause the release of phosphorus to surface waters beyond the farm's boundaries, risking oxygen depletion of those waters by accelerating growth of oxygen-consuming water organisms. New processes mentioned above for nitrogen removal will, if anything, worsen the phosphorus excess as the acreage requirements for nitrogen removal shrink. Measures to reduce the phosphorus content of the lagoon effluent must be therefore be considered.

Methods to remove solids, such as centrifuging and settling, will remove phosphorus that is contained in the solids. For removing the soluble phosphorus, four methods may be considered: (1) removal by aerobic microbes; (2) removal by phosphate-accumulating microbes; (3) precipitation by iron or calcium addition; and (4) precipitation as struvite.

Phosphorus can be removed from the effluent by subjecting it to the action of aerobic microbes, which assimilate the phosphorus into their cell mass, and then removing those cells from the system. This method suffers from three drawbacks. First, phosphorus removal may be limited because the phosphorus-to-carbon ratio in the effluent may exceed the ratio at which the microbes can take in the nutrients. Second, the cells are typically removed in a sludge-like form, leading to high costs for handling and transportation. Third, aeration is necessary, resulting in additional energy and equipment costs.

Phosphate-accumulating organisms are bacteria that out compete other organisms in conditions that cycle between aerobic and anaerobic. These organisms are able to take up phosphorus in excess of their needs during aerobic periods and use it to store energy. During anaerobic periods, they consume the stored energy and release phosphorus in the process. If these bacterial cells are removed from the system just at the time they have completed their phosphorus uptake phase, the net result will be removal of phosphorus and carbon in a ratio considerably greater than the cells' overall phosphorus-carbon use ratio. Higher phosphorus removal for a given carbon content is thus possible than that achievable with purely aerobic microbes. While energy requirements may be decreased as a result of aeration being required only part of the time, the increased complexity may result in additional equipment costs that offset lower energy costs. Finally, costs related to sludge will be incurred because of the need to remove cells from the system.

Addition of soluble iron or calcium leads to precipitation of the phosphorus in the form of iron phosphate or calcium phosphate salts. Chemicals must be added to provide the iron or calcium ions, which can introduce new environmental concerns. In addition, the precipitated phosphorus-bearing salts are usually finely-divided, resulting again in a sludge-like waste product that is expensive to handle and transport.

Struvite (magnesium ammonium phosphate hexahydrate) precipitation could also be used to remove phosphorus from anaerobic treatment effluent. In this process, the concentration of magnesium (Mg) ions, ammonium, and phosphate ions must be brought high enough that the equilibrium solubility product of struvite is exceeded. In addition, there must be enough Mg and ammonium ions present in comparison with the phosphorus that, as the precipitation occurs, the solubility product will continue to be exceeded until the phosphorus reduction goal has been met. Although anaerobic waste effluent usually contains ammonium and some Mg, Mg may still have to added to remove the targeted amount of phosphorus. In addition, pH raising, and thus chemical addition, may be necessary to achieve a state of low struvite solubility. The main advantage of this method is that the precipitate can be made to form a coarse-grained material that is easily drained of its water and thus less expensive to handle and transport. In addition, the product can be used as a slow-release fertilizer. Finally, if part of the Mg in the product can be separated and recycled to the raw effluent, the need for obtaining Mg elsewhere could be avoided.

I. Literature Review of Methods of Struvite Precipitation

Given the advantages that struvite precipitation can potentially offer in treatment of lagoon effluent, a literature review was undertaken to support planning of research on that subject. The review focused on five points: (1) the factors promoting and inhibiting struvite crystallization; (2) the degree of nutrient removal achievable by struvite crystallization; (3) the form and manner of precipitation; (4) thermodynamics; and (5) kinetics. Results of the review are summarized below, organized according to the five points.

Factors Promoting and Inhibiting Struvite Crystallization

The pH for struvite precipitation from wastewater has been reported at values from 6.5 to more than 10. The fact that tests on real wastewater reveal a lower optimum pH than that indicated by tests on synthetic wastewater and by theoretical predictions suggests that real wastewater contains species excluded from the synthetic wastewater and from the theoretical model.

Temperature for struvite precipitation has not often been tested. Experiments have been conducted generally near room temperature, which approximates the average temperature at which waste treatment systems are likely to operate, with no treatment of temperature as an independent variable. Researchers did predict that the solubility product of struvite would be slightly lower at 25 degrees Celsius (° C.) than at 30° C. Other researchers heated their samples to 35° C. at the beginning before the reaction period, but did not report the temperature during the reaction and settling period.

For Mg supplementation, researchers have used magnesium oxide (MgO). Other researchers recommended magnesium sulfate and also tested magnesium chloride and magnesium carbonate.

For phosphate supplementation, phosphoric acid and potassium hydrogen phosphate and potassium dihydrogen phosphate have been tested.

Various additives for pH adjustment are also reported. Lime, sodium hydroxide and potassium hydroxide have been used. It has also been observed that higher phosphate removal occurs when no sodium hydroxide was added.

Regarding nucleating agents, borosilicate glass filings and sand were used. There was no variation of amounts or types of nucleating agents in experiments to evaluate their effects, and in other articles, nucleating agents were apparently not used.

The time permitted for precipitation of struvite is often mentioned in the art. 15 minutes (min), 1 hour and two hours (h), are mentioned. Research has taken measurements all the way out to 200 h, and researchers tested various reaction times between zero and 30 min, finding the optimum to be 25 min.

Degree of Nutrient Removal Achievable by Struvite Crystallization

In research, ammonia removal reached near 92 percent (%) when the other two ions were supplemented to 0.9 of stoichiometric equivalence with ammonia. With the same conditions except for dropping the phosphate concentration proportion to 0.6, ammonia removal was less complete, reaching 39% to 88%. Despite the researchers' indication that nutrient removal occurs via struvite, there must have been some other ammonia removal mechanism, because 88% removal could not have been achieved at the lower phosphate level—struvite could only have removed 60% of the ammonia. Furthermore, the authors state that no phosphate was removed at the higher phosphate level. If any of the ammonia removal at the higher phosphate level had occurred via struvite precipitation, then phosphate should have been removed.

Ammonium removal reached 97.6% when research focused on ammonium removal and hence did not report phosphate reduction. Others achieved up to 98% phosphorus reduction. Reduction of other nutrients was small in percentage terms. This result is due to the fact that the starting levels of the other nutrients were high in comparison with phosphate.

Others focused on phosphate rather than ammonium, reducing phosphate from 198 to 5 milligrams (mg) per liter (L), or 97.5%. It should be noted that the researchers indicated that operation in the high end of the pH range was necessary to achieve this removal rate. It should also be noted that lime was used for pH adjustment in this experiment, raising the possibility that some of the phosphate removal occurred via formation of calcium phosphate salts. Ammonium was reported only to have been reduced from 296 to 173 mg/L. Even though the experimenters were focusing on phosphate rather than ammonium removal and thus ammonium removal would be expected to be less, associated text stating that "more than half the ammonia was removed" points to the possibility that the ammonium concentration figures, through a typographical error, understate the reduction.

Other researchers achieved 90% reduction of phosphate in solution, down to about 1 mg/L, in continuous digester effluent. In batch digester effluent, removal was not as effective. They suggest that less successful removal from the liquid of struvite solid, rather than failure of phosphate to crystallize into struvite solid, may explain at least part of the comparative lack of effectiveness of phosphate removal from batch digester effluent. The phosphate concentrations constituted only a small portion of total phosphorus (TP) content. Unfortunately, the reductions in TP were not reported.

Research has also focused on nitrogen removal. Their removal efficiencies reached only 31–82%, despite relatively high starting concentrations and supplementation of the other ions to reach up to 100% excess.

Form and Manner of Precipitation

Research has reported the precipitated solid to be a "white flake-like" precipitate. It was also observed that it formed within 15 minutes. Other researchers state that the magnesium ammonium phosphate forms very quickly. They also state that an anionic flocculating agent was used to hasten separation of the precipitate. Their use of such an agent suggests that the precipitate was sufficiently small-grained and that settling or filtration of non-aggregated particles would present some difficulty. Its composition is not reported other than referring to it as magnesium ammonium phosphate.

Other research does not explicitly report the form of the precipitate. However, the experiments apparently yield a fine-grained precipitate, because it is mentioned using a microscope to compare precipitate grain size from synthetic wastewater to that of real wastewater. Grain size was smaller when real wastewater was used, a fact that the applicants attribute to breakage of grains by suspended organic particles. An alternate explanation would be that the organic particles in the real wastewater provided more crystallization nuclei. The same amount of precipitate deposited upon more nuclei would result in smaller, more numerous grains. The article implies the precipitate is struvite, but composition is not explicitly reported, and stoichiometric calculations do not support the supposition that the precipitate is all struvite.

Research has supplemented in part with calcium, so the precipitate contained some calcium along with the struvite. They did not report composition, but explained that the calcium could be in the form of calcium carbonate and/or hydroxyapatite [$Ca_5(PO4)_3OH$] Other research reports that up to 7 mg/L of the phosphate in batch digester effluent treated to precipitate struvite may exist as struvite in the 10–40 micron grain size range. By comparing with the starting and ending phosphate contents of the effluent, it is possible to deduce that 20–25% of the struvite formed exists in this very small grain size.

Thermodynamics

Thermodynamics, which revolves around concepts of equilibrium, thermodynamic potential, and stability, can be applied in two ways that are particularly useful in contemplating a system for removing phosphorus from lagoon effluent by struvite precipitation. One is equilibrium among chemical species, and the other is thermodynamics of precipitate nucleation.

Equilibrium Among Chemical Species

Research has demonstrated that, in a closed system at equilibrium and at a given temperature and pressure, chemical species that can react with one another will distribute themselves in a particular way to minimize Gibbs energy. Specifically, they will distribute themselves to satisfy the equilibrium constant, K, for each reaction. The K is equal to the product of the activities of the output species of the reaction (each activity raised to the power of its stoichiometric reaction coefficient) divided by a similar product for the input species. For aqueous systems that are very dilute (as are the systems dealt with in this application, ranging from 0.005 to 0.05 mol/L [moles per liter] of solute), activities of solutes can be approximated by their molar concentrations. Furthermore, K is linked to the standard molar Gibbs energy of reaction ($\Delta G°_r$), the absolute temperature (T), and the gas constant (R) by:

$$\Delta G°_r = -RT \ln(K)$$

The $\Delta G°_r$ is equal to the standard molar Gibbs energy of formation ($\Delta G°_f$) of the products minus that of the reactants. Water and solid substances have an activity near unity. The K for a reaction in which a solid substance dissolves into component ions is often called "solubility product."

These relations support analysis of the present practical problem because they enable one to predict whether, and to what extent, particular reactions will occur in the system of interest, if we have enough thermodynamic data related to the species of interest. Predictions of particular use are the extent to which phosphorus will be removed by struvite precipitation, and whether a sequence of reactions envisioned to separate the Mg from the struvite for recycle will actually occur.

Reports were discovered on two studies modeling struvite solubility. In the first study, results were obtained from a model simulating equilibrium between solid and dissolved ions in waste treatment effluent at various pH values. The study related total phosphate, Mg, and ammonia concentrations to struvite solubility. The model took into account the fact that not all phosphate, ammonia, and Mg ions in solution exist as free ions whose concentrations should be included fully in the solubility product. It adjusted the concentrations in three ways.

First, it recognized variation of speciation of phosphate—i.e., how total phosphate concentration would be partitioned among free phosphate, hydrogen phosphate, dihydrogen phosphate, and un-ionized phosphoric acid—and other ions with varying pH. Second, it recognized the effect that ionic strength of the effluent has upon the activities of ions. Finally, the model included partitioning of ions between their free forms and complexed forms with which they are in equilibrium—most notably magnesium, which for example can form the $MgOH^{+1}$ and $MgPO_4^{-1}$ complexes. The model found a minimum absolute solubility for struvite at a pH of 9.0. It also developed a solubility product estimate of pK=13.2.

The second study, modeled a system of Mg, ammonium, phosphate, hydrogen, hydroxide, and carbonate ions (the last three because they are present in natural water) and their various species and complexes in water, using equilibrium solubility products for struvite and other inorganic salts and equilibrium constants for formation of dissolved species. The modeling was done to predict how the equilibrium conditional solubility product for struvite varies with respect to pH. FIG. 1 shows the model-predicted struvite solubility as a function of pH.

In FIG. 1 the solubility is indicated as pPs, the negative base-10 logarithm of the equilibrium conditional solubility product. This quantity is the product of total Mg concentration (not just free Mg ion), total ammonia concentration (not just ammonium), and total phosphate (including all species and complexes) in a solution that is in equilibrium with solid struvite. The equilibrium conditional solubility product is easier to determine in the laboratory because total Mg, ammonia, and phosphate concentrations can be determined through simple testing. Unlike the equilibrium conditional solubility product, equilibrium solubility products of the conventional type remain constant with pH. However, determining the free ion concentrations composing the equilibrium solubility products of the conventional type presents a challenge due to the ability of the ions to protonate, deprotonate, and complex.

Knowledge of the equilibrium conditional solubility product at various pH values is particularly helpful in the present invention because it allows estimation of how much struvite, and thus phosphorus, can be precipitated from the wastewater by changing pH an/or total concentrations of ammonia and/or Mg. For example, by looking at FIG. 1, one can see that if there is a solution saturated with respect to struvite (that is, in equilibrium with solid struvite) at pH 7.5, and one raises the pH to 8.0, then the product falls from $10^{-7.1}$ to $10^{-7.75}$, a reduction by factor of about 4.5 (equal to $10^{(-7.1--7.75)}$, or $10^{0.65}$). If one knows the beginning total concentrations, then one can calculate the ending concentrations, including phosphate. It should be noted that the modeling that resulted in FIG. 1 includes only Mg, ammonia, phosphate, hydrogen, hydroxide, and carbonate species and their various combinations. Actual wastewater may have other inorganic ions and organic species that will alter the solubility profile with respect to pH.

The data and models relevant to struvite solubility indicate that struvite precipitation does indeed offer the potential for reducing phosphorus in lagoon effluent. Comparing the Mg, ammonium, and phosphate ion product of typical lagoon effluent (as estimated from pH and composition data from North Carolina lagoons) against an established value for the equilibrium solubility product, one can see that lagoon effluent is typically saturated or near-saturated in struvite. The same conclusion is reached by comparing the typical conditional solubility product with the saturation curve. This conclusion is consistent with reports that lagoon effluent readily forms struvite scale in systems that handle it. The equilibrium solubility product and the model also can be applied to estimate that greater than 90% of the OP in solution in the effluent can be precipitated if the starting Mg concentration is twice the starting OP concentration and pH is raised by 1 point.

Not only does the data on equilibrium among species address the question of whether struvite precipitation can remove phosphorus, but it also addresses the question of whether Mg can be separated from product struvite and re-used for supplementing the raw liquid. An analysis, conducted by the applicants of the present invention, envisioned reactions first to drive ammonia and water from struvite by heating to yield magnesium hydrogen phosphate, followed by dissolution of the latter in water to a concentration of 1% by weight. These two reactions are already known to occur. However, no reports on the third proposed reaction, carbonation with biogas (10% to 50% carbon dioxide) to precipitate a magnesium carbonate salt, could be found. The final reaction, heating of magnesium carbonate to convert to Mg), which could be used to supplement the raw effluent, is well known. The analysis thus centered on the third reaction, precipitation of magnesium carbonate.

To conduct the analysis, a simple equilibrium model of the proposed method (dissolution of the magnesium hydrogen phosphate in water at 1%, followed by carbonation to achieve equilibrium with carbon dioxide in biogas) was conceived. The model consisted of sixteen unknowns and sixteen equations relating the unknowns to one another. The unknowns were concentrations of dissolved species (hydrogen, hydroxide, phosphate, hydrogen phosphate, dihydrogen phosphate, phosphoric acid, Mg ion, magnesium monohydroxide ion, dissolved un-ionized magnesium carbonate, magnesium bicarbonate, monomagnesium monophosphate, un-ionized magnesium hydrogen phosphate, magnesium dihydrogen phosphate, carbonic acid, bicarbonate ion, and carbonate ion.

The sixteen equations were mainly dissociation and other equilibrium constants taken from a reliable source. In several cases, the constants were not available and thus were calculated by applying the relation between Gibbs energy of reaction (from formation energies in the table) and equilibrium constants. In addition an overall balance on Mg and phosphorus were used as linking equations. Ionic strength was considered negligible, permitting use of concentrations in place of activities.

Solving the sixteen equations yielded equilibrium concentration for each species. Two Mg and carbonate-containing salts were identified and judged most likely to have their solubility products approached, due to the large negative values of these compounds' Gibbs energy of formation. The two compounds were $MgCO_3$ (magnesium carbonate) and $3(MgCO_3)(OH)_2 3H_2O$ (magnesium carbonate magnesium hydroxide trihydrate). For these two salts, solubility products were calculated from Gibbs energy of reaction, and the products were compared against the product of their component ions' concentrations at equilibrium from the model.

The result was that, unfortunately, the equilibrium solubility product of neither of the salts was achieved. This means that, for these salts and for these assumptions, the proposed process cannot split Mg for recycle and supplementation.

Thermodynamics of Precipitate Nucleation

Thermodynamics of nucleation figure into research on struvite crystallization because it helps in understanding the conditions that may lead to large-grained, easily manageable product as opposed to fine-grained sludge-like product. The following discussion summarizes relevant aspects.

The free energy change of a substance passing from dissolved state into a precipitated particle equals the difference between the free energy of the precipitated particle and the free energy of the ions in solution. In addition to the dependence of the free energy of the ions in each phase upon their formation energy, the energy of the ions in solution also increases with increasing concentration, and the energy of the precipitated particle decreases with the size of the particle.

The energy of the ions in the precipitated particle decreases with particle size because it includes not only its energy of formation, but also the surface energy of the particle. The surface energy reflects the net energy that is required to break bonds between solute molecules (water, in this case) as the particle forms and grows. The surface energy is the product of the tension at the surface between particle and solute (expressed in energy per area) and the area of the particle's surface. For a particle of constant density that is growing or shrinking yet maintaining its shape, the total energy content will not vary linearly with volume. One energy component (the energy of formation) will in fact vary proportionally with the number of molecules, and therefore volume. However, the other component (the surface energy) will vary only as the ⅔ power of the volume, because area varies as the ⅔ power with volume if shape holds constant. One may think of the free energy content of the particle, then, as the sum of two terms, each different functions of the number of ions in the particle:

$$\Delta G = -n\phi + n^{2/3}\psi$$

where $\Delta G$ = Gibbs energy difference between individual ions in solution and particle with n ions;

n = number of ions in a particle;

$\phi$ = Gibbs energy difference between individual ions in solution and ions in an infinite crystal;

and $\psi$ = constant of proportionality relating free surface energy to $n^{2/3}$.

FIG. 2 of the drawings show this relationship by graphing $\Delta G$ against n for four values of $\phi$ (a negative value; zero; and two different positive values, the greater of which appears as the lowest curve on the graph). From the graph, one can see that, for any value of $\phi$ less than zero, $\Delta G$ will always rise for increasing n. That is, equilibrium particle size is zero; if a particle consisting of multiple ions happens to form through collision of ions, the direction of spontaneous change is for it to decrease in size. Also, one can see that, for values of $\phi$ greater than zero, there exists a maximum in the curve, indicated as n*, $\phi$G*. At this point, free energy gained from size increase equals that lost from size increase. Above this point, growth decreases free energy, and below it, the reverse is true. This size, then, is a critical one. If no particles size n* or larger exist in the solution, precipitation cannot spontaneously occur. If particles of size n* or larger do exist, they will grow. The figure also reveals that n* decreases as $\phi$ increases.

Particles of size n* are called critical nuclei; any particle size n* or larger is called a nucleus. The provision or presence of nuclei is called nucleation. Nucleation can occur homogeneously or heterogeneously.

In heterogeneous nucleation, particles of a substance other than the precipitating substance serve as nuclei. In this case, the other substance must possess sufficient size and a crystalline structure similar to that of the precipitating substance.

In homogeneous nucleation, particles of the precipitating substance itself serve as nuclei. Even though the average particle size is near zero when averaged over all the molecules and over time, there still exists a distribution of particle sizes. Particles of size near zero (only one or a few ions) abound; those of critical size are very few if the critical size is large. Particles of many ions form by random collision of smaller particles and disintegrate quickly if they are smaller than the critical size. Occasionally, however, a particle of critical size or larger will form. For these particles, the slope of the free energy curve favors growth, and hence they will tend to grow rather than to disintegrate. How frequently a particle of critical size or larger appears per cubic centimeter (cc) of volume depends on the relative size of $\phi$ and $\psi$, and can range from many per second to only one in many years.

For a given substance in solution, $\phi$ will increase with degree of supersaturation, while $\psi$ holds constant, resulting in smaller and smaller n*, and thus more frequent occurrence of nucleation. Also, if a solution contains particles that could serve as heterogeneous nuclei, the size to which those particles must be limited to prevent nucleation becomes smaller with increasing supersaturation. At some higher level of supersaturation, called the critical supersaturation, the critical size drops to just one ion, and nucleation will proceed immediately and in the form of many small particles.

Therefore, if struvite precipitates from a solution that is above its critical supersaturation level many nuclei will form rapidly and simultaneously. This action will result in the undesired, small particles of precipitate, because the available struvite will be distributed across a very large number of particles. In addition, even though a solution may not be critically supersaturated in struvite, precipitation could take the form of small particles if after reaching this level of supersaturation it is not exposed to already-existing large particles quickly enough to avoid precipitation onto homogeneously formed nuclei or small heterogeneous nuclei present in the wastewater.

Conversely, if the struvite precipitates from a solution in the range between saturation and critical supersaturation, and is exposed quickly enough to existing precipitate, then large crystals can be grown. Data on critical nucleus size or critical supersaturation level are needed to determine what particle size is to be avoided where precipitation is not wanted and what size is needed where precipitation is desired.

Unfortunately, the prior art literature review identified no reports of experiments to estimate critical nucleus size or critical supersaturation. However, one study, did monitor induction time ($\Delta t_i$) for struvite precipitation, a useful related characteristic. The quantity $\Delta t_i$, which may be considered to approximate the time for critical nuclei to be generated, was observed as a function of degree of the product of the concentrations of Mg ion, ammonium, and phosphate. Specifically, the study found a relation of:

$$\Delta t_i = (\text{constant}) \times [\{Mg^{++}\}[NH4^+]\{PO4^{---}\}]^{-1/3}]^2$$

This relation is graphed in FIG. 3 of the drawings. From the figure, one can estimate the induction time for a wastewater of given magnesium, TAN, and OP concentrations.

For example, suppose that wastewater, immediately after Mg supplementation and adjustment to 9.2 pH, had dissolved in it a total Mg concentration of 60 parts per million (ppm), TAN of 600 ppm, and OP of 90 ppm as phosphorus. Assuming the Mg to be nearly all available as free Mg ion rather than complexed in some way, the Mg concentration would be about 0.00247 moles per liter (mol/L). The total ammonium ion plus ammonia concentration would be 0.0429 mol/L, but at this pH only about 50% would be in the ammonium form, giving an ammonium ion concentration of about 0.0214 mol/L. The OP, totaling 0.0029 mol/L, would primarily exist (about 99%) as hydrogen phosphate ion, with about 1% as dihydrogen phosphate ion and 0.1%, or 0.0000029 moles per liter, as phosphate ion.

The product of the Mg, ammonium, and phosphate ion concentrations is (0.00247)×(0.0214)×(0.0000029), or about $1.53 \times 10^{-10}$. Taking the logarithm and multiplying by negative one-third gives 3.27. Finding this value on the vertical axis in FIG. 3 and reading down to the horizontal axis yields an estimate of 1.6 for the logarithm of the induction time in seconds, which means the induction time is about 40 seconds. Approximately this time may pass before spontaneous nucleation begins despite the high degree of supersaturation. Comparing with equilibrium solubility product of $10^{-13.2}$, we can see that the solution is supersaturated in struvite by a factor of 2000 or more.

If the concentration of Mg doubles and the other conditions remain the same, the estimated induction time from FIG. 3 drops to about 22 seconds. If the TAN concentration is then doubled, the time drops to about 12 seconds.

These estimates suggest that the critical nucleus size may be large enough that spontaneous nucleation may be avoidable. The induction times indicate that there is a comfortable time cushion available between the point in time at which supersaturation is achieved by pH and content adjustment and the point by which the adjusted effluent must be exposed to the struvite particle surfaces on which the precipitation is intended to occur. However, the time estimates to self-nucleation at various conditions must be regarded as upper limits of the time available, because heterogeneous nuclei in the raw effluent could promote nucleation before the time period is exhausted. In addition, locally very high levels of supersaturation could occur at the point where the adjusting chemicals are mixed into the raw effluent, possibly exceeding critical supersaturation and thereby forming nuclei almost immediately.

Previous research discloses that solutions supersaturated with respect to struvite can remain stable if they lie below the critical saturation level; however, the actual value of the level was not found in the literature review. Previous work discloses that increasing the pH of wastewater that is not precipitating struvite into the 8–11 range can result in induction and precipitation of struvite in a few minutes. The pH increase presumably increases, via pH-dependent speciation, the product of the concentrations of the required ions above the critical supersaturation level. The latter study also reports that a majority of phosphate can be precipitated via struvite.

Kinetics

Precipitation of a salt from a supersaturated solution occurs in either of two different modes. These are called nucleation and crystal growth.

If there are no surfaces of solid struvite present, the precipitation must first occur by forming nuclei. This mode of precipitation was reviewed above. It is desired that precipitation not occur by this mode in a struvite crystallizer, because it could lead to fine, sludge-like product and/or particles that are two small to be retained by gravity.

If there are solid struvite surfaces already present, then precipitation will occur by crystal growth. In this mode, the precipitation offers the possibility of being controlled to form large-grained product, which can be retained more easily by gravity and is easier to handle and dry. To create a process using crystal growth, it is helpful to understand the kinetics of the process. The kinetics of the process characterizes the rate at which it occurs, thus enabling some prediction of the dimensions required for a given reactor type, flow rate, composition, and phosphorus reduction target.

Some recent studies have reported on kinetics of struvite precipitation in the crystal-growing mode. The studies have generally found that the rate of precipitation varied proportionally with the extent of supersaturation expressed in $(mol/L)^3$, and in some cases provide the measured rate constant. Unfortunately, those studies did not measure or did not report the amount of crystal surface area per volume of reacting solution. Knowing this last quantity is crucial in designing a struvite precipitating device because it is not possible to calculate the total precipitation rate, and hence phosphate removal rate, from a known supersaturation degree and volume unless one knows the amount of crystal surface area present and the precipitation rate per surface area.

The size, shape, and amount of crystals have been reported and the quantity held constant through each experimental run, thus enabling a rough estimate of the surface-area-specific rate constant. The rate constant was not reported in the desired surface-area-specific form. Rather, it was reported as the constant of proportionality between the decrease in struvite ionic product per volume of liquid per time and the difference between the product of the total concentrations of the three constituent ions and that product for a saturated solution at that pH. However, from the data in the publication regarding the size, shape, and amount of crystals, it is possible to estimate surface area and thus convert the reported constant into the desired form.

The result is an estimate that places the rate constant in the range of $13 \times 19 \times 10^{-6}$ $(mol/L)^3$ decrease in struvite ionic product per hour per $(mol/L)^3$ of supersaturation and per square millimeter (mm) of surface area per L of reacting solution. Canceling units where possible yields 0.13 to 0.19 decimeters (dm) per h as the estimate for the surface-area specific rate constant. While this estimate is uncertain because several assumptions were used in the conversion, it serves as a starting point because no reports of the surface-area-specific rate constant were found in applicants' research.

II. Representative Struvite Crystallizers know to be in use

Various versions of struvite crystallizers have begun to be tested and applied in practice in other environments that are known to the applicants.

A lab-scale (1-meter-high) struvite crystallizer was tested with sludge storage basin liquid from the Sacramento Regional Wastewater Treatment Plant. The unit successfully crystallized struvite from the wastewater. The intent in this case was to crystallize enough struvite to prevent scaling by the material in pipes and pumps, rather than to reduce phosphorus content for environmental reasons. The crystallizer was not designed for practical use; it had no means for removing the struvite crystals.

At least three sewage works in Japan have full-scale struvite crystallization units for removal of phosphorus. The units range in capacity from about 40,000 to about 120,000 gallons per day, likely much larger than what would be required at a swine-producing site in North Carolina. Struvite granules are removed from the reactor, then separated by size, and the smaller ones returned to the crystallizer. Water to be treated contains 30 to 150 ppm phosphorus, and up to 90% of the phosphorus is removed by the struvite crystallizers.

A Ube Industries plant in Sakai, Japan has a struvite crystallizer that has been running since 1995 and treats about 11,000 gallons of industrial effluent per day. The crystallizer is on the order of 15 feet tall and 5 feet across at the top.

At a calf production site in Putten, the Netherlands, 700,000 tons per year of calf manure are treated for phosphorus reduction in a struvite crystallization process that has been running since early 1998. The potassium form (magnesium potassium phosphate) rather than the more common ammonium form of struvite is produced. The system includes three cylindrical stirred tank crystallizers, each about 15 to 20 feet tall and about 10 feet in diameter.

At a food industry plant in De Krim, the Netherlands, a struvite crystallization system treats 30,000 to 35,000 gallons per hour of wastewater. The main crystallizer is 20 to 30 feet tall and about 10 feet in diameter at the top.

At a swine production site in Missouri, a pilot plant includes a wastewater treatment vessel that is approximately 20 feet tall. The vessel is used to precipitate nutrients from the water in the form of struvite, among other substances. The precipitation is conducted in batches that include addition of chemicals into the vessel and end with the removal of a sludge from the bottom of the vessel. The sludge, which consists primarily of water, is further treated to produce fertilizer granules.

SUMMARY OF THE INVENTION

An apparatus and method are provided for the crystallization of phosphate salts, principally Mg, $NH_4$, $PO_4$, $6H_2O$ (Struvite), in a fluidized bed to reduce phosphorus content of a wastewater stream passing through the bed. The improved apparatus and method for removing phosphorus content from a wastewater stream comprise providing an inverted preferably cone-shaped cylindrical vessel to serve as the main crystallizer chamber so as to retain in fluid a wider particle size distribution across a wider flow rate range as wastewater flows from the bottom to the top of the vessel. Also, a cone-shaped check valve is provided at the bottom of the crystallizer chamber to enable retaining the fluidized bed during shutdown or purging of the fluidized bed during operation of the crystallizing apparatus by manipulating the cone-shaped check valve.

Finally, the improved apparatus and method for reducing phosphorus content of a wastewater stream comprises magnesium supplementation by carbon dioxide acidification of field grade magnesium to provide a suitable magnesium supplementation which does not introduce new ions that would be problematic to the environment when the cleansed wastewater stream is returned to the environment.

The apparatus and method of the invention contemplates providing a crystallizer for removing phosphorus from wastewater which is capable of removing up to about 70% of the total phosphorus in swine lagoon effluent and converting it to a granular, easy-to-dry product. The apparatus and method of invention are designed primarily for use at live stock waste lagoons where new environmental rules will lead to a need for some if not most of the phosphorus in swine lagoon effluent to be removed from the lagoon water before irrigating it onto crops. The apparatus and method of the invention uses a crystallizer that is small and economical in construction and occupies only a small amount of space.

Therefore it is an object of the invention to provide an apparatus and method for the crystallization of phosphate salts, principally struvite, in a fluidized bed to reduce the phosphorus content of a wastewater stream passed upwardly through the fluidized bed.

It is another object of the present invention to provide an improved apparatus and method for removing phosphorus from swine lagoon effluent in an efficient and economical manner and to convert the phosphorus into a granular, easy-to-dry product.

It is still another object of the present invention to provide an apparatus and method to efficiently remove phosphorus from swine lagoon effluent before the effluent is sprayed as an irrigant onto crops.

Some of the objects of the invention having been stated, other objects will become apparent with reference to the drawings and description set forth hereinbelow.

DETAIL DESCRIPTION OF THE DRAWINGS

DETAILED DESCRIPTION OF THE INVENTION

I. Experiments in Batch Mode and Resulting Design Elements for Struvite Crystallizer Experiments in batch mode were conducted on locally obtained lagoon effluent to observe its behavior as it relates to several aspects of struvite precipitation. The observations enabled better-informed formulation of the basic design elements of a struvite crystallizer for removing phosphorus from that liquid. The experiments included (1) nutrient removal tests; (2) nutrient partitioning tests; (3) Mg supplementation tests; (4) pH enhancement tests; and (5) rate tests. Each of the five groups of tests are discussed below, followed by a summary of the crystallizer design elements. Methods of analysis for OP, TP, TAN, and Mg are summarized in the "Analysis of Liquid Samples" subsection of "Experiments with Laboratory-Scale Continuous Crystallizer" below.

EXPERIMENTS

Nutrient Removal Tests

These tests were performed to check whether literature review information on struvite solubility had been interpreted properly for lagoon waste. Applying the equilibrium solubility product and conditional solubility product data from the review to analyses of typical lagoon effluent, the effluent should be near saturation and therefore an increase in concentration of the product of the three ions (Mg, ammonium, or phosphate) should tend to precipitate struvite. The precipitation, unless caused by an increase in total OP, should reduce dissolved OP and dissolved TP. To test this, effluent from one anaerobic lagoon near Rocky Mount, N.C. and effluent from a covered, ambient temperature in-ground digester near Clayton, N.C. were treated by adding magnesium bicarbonate solution to increase the Mg ion concentration and adding ammonia to increase the pH. The Rocky Mount lagoon effluent had a pH of 7.8 and contained 62.2 ppm TP, 55.8 ppm OP, 552 ppm TAN, and 30.1 ppm Mg. The Clayton digester effluent had a pH of 7.6 and contained 46.8 ppm TP, 45.4 ppm OP, 1,087 ppm TAN, and 18.5 ppm Mg.

Figure 1:
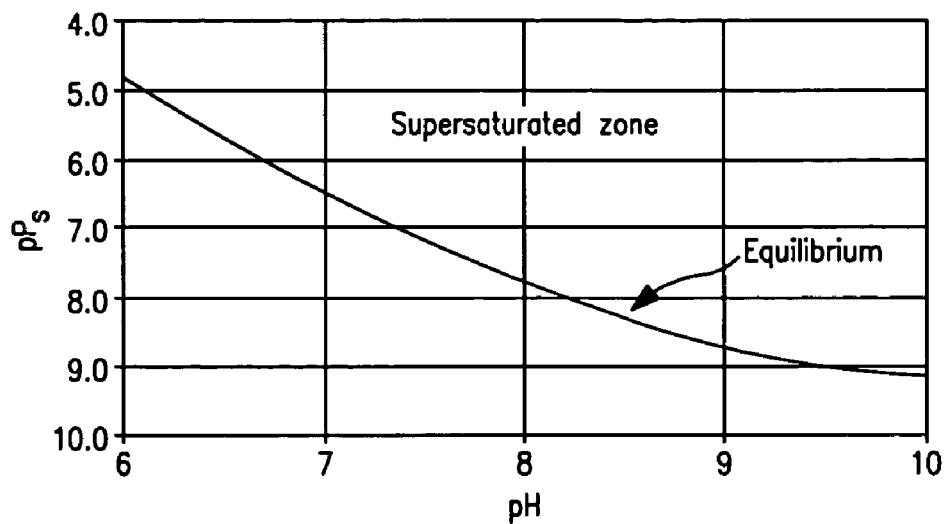
FIG. 1 is a chart showing variation of equilibrium conditional solubility verses pH for struvite.
Figure 2:
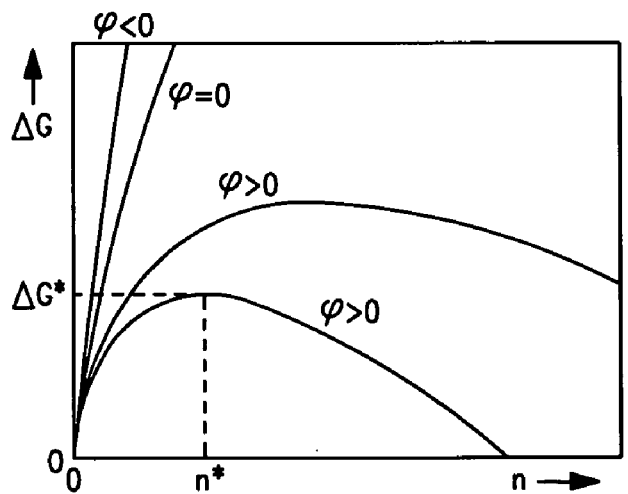
FIG. 2 is a graph showing free energy versus the number of particles in a precipitating crystal.
Figure 3:
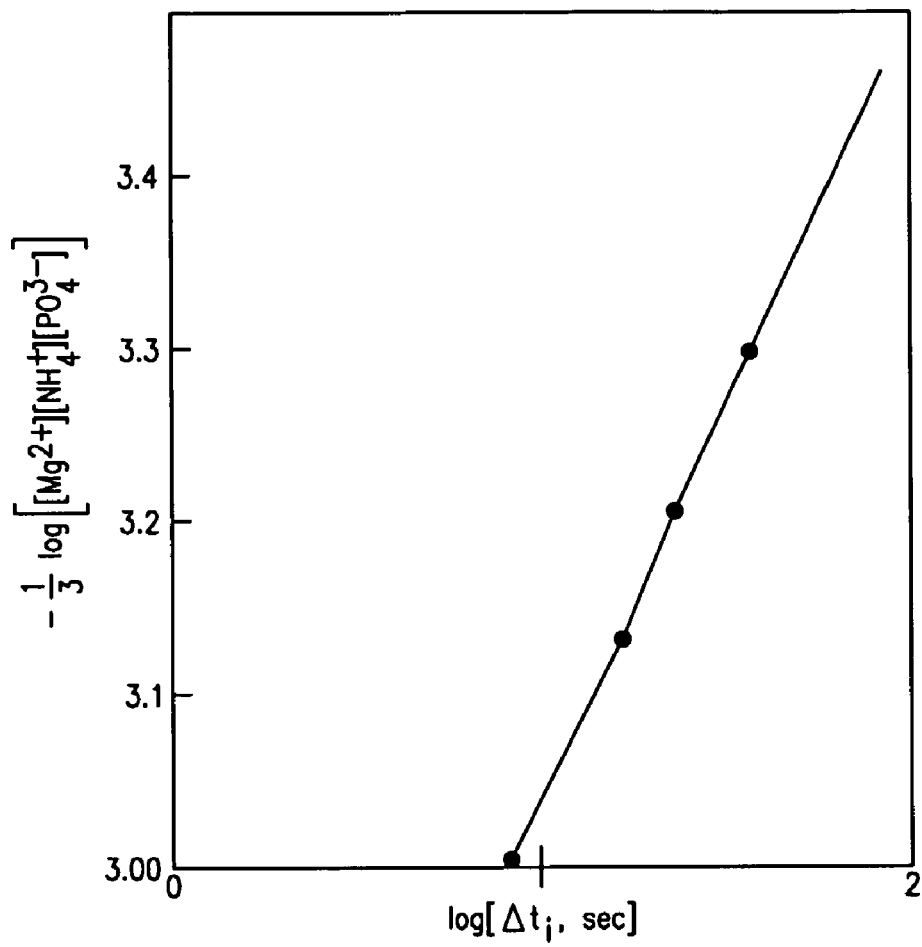
FIG. 3 is a graph showing concentration versus induction time for struvite precipitation.
Figure 4:
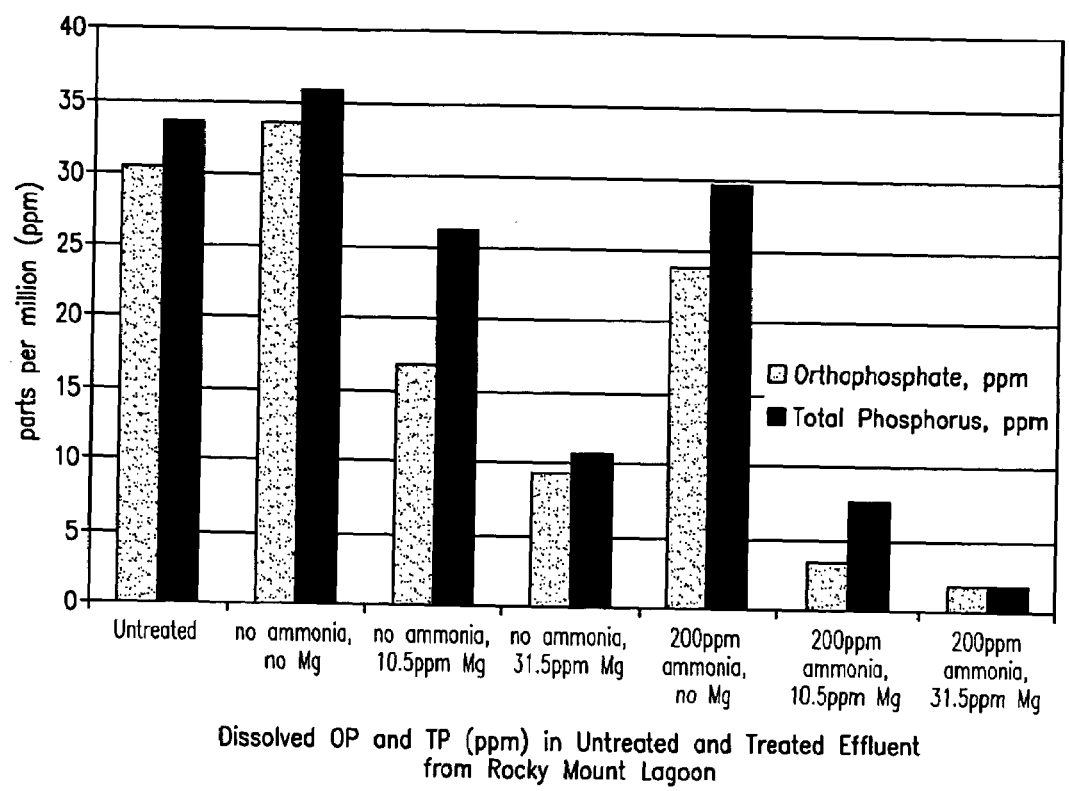
FIG. 4 is a chart showing dissolved OP and TP in untreated and treated effluent from a Rocky Mount, N.C. lagoon.
Figure 5:
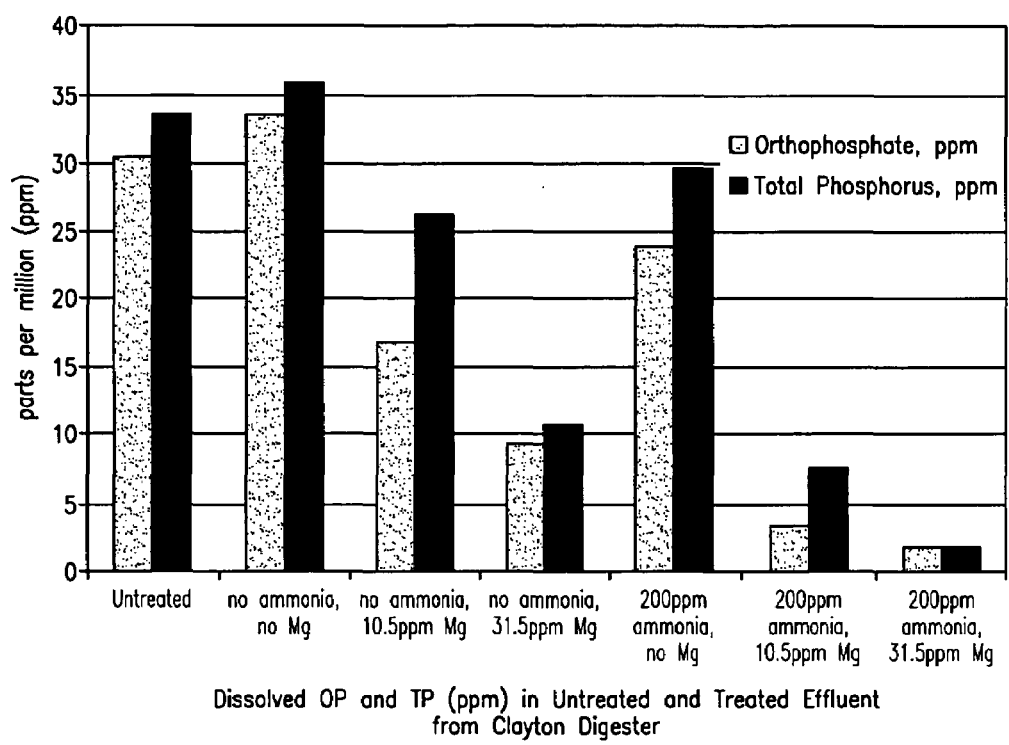
FIG. 5 is a chart showing dissolved OP and TP in untreated and treated effluent from a Clayton, N.C. digester.

The treatments consisted of the six combinations of two levels of ammonia addition (0 and 200 ppm) and three levels of Mg addition (0, 10.5 and 31.5 ppm). After the additions, the effluent was stirred for 20 minutes and then allowed to stand, covered, overnight. Then, samples of the untreated and treated liquids were centrifuged to remove suspended, i.e., non-dissolved material. The clear, brownish yellow centrifugate was poured off the grayish pink sediment and analyzed for TP and OP content and comparison against TP and OP content of centrifugate from untreated liquid from the lagoon and digester. The results for the Rocky Mount lagoon are depicted in FIG. 4, and FIG. 5 shows the results for the Clayton digester. For effluent from both sources, increasing Mg content or ammonia (thus raising pH approximately 1.5 points), whether individually or jointly, reduced phosphorus content of the liquid. The greater the Mg addition, the greater was the reduction in phosphorus. The greatest reductions occurred with the highest level of Mg combined with ammonia addition. The trends held true regardless of whether the reduction was based on OP or TP. While these observations do not prove that struvite precipitated, they are consistent with expectations built upon the equilibrium solubility data from the literature.

Nutrient Partitioning Tests

These tests sought to determine how various species in lagoon effluent are partitioned between the liquid phase and the suspended solid phase. Of primary interest are phosphorus, Mg, and TAN. Amounts of these species in lagoon liquid have been reported, but no data could be located on how they are distributed between the two phases.

To be removed by struvite precipitation, phosphorus must exist as liquid-phase OP. Conceivably, conversion to this form from liquid-phase non-orthophosphate phosphorus or from phosphorus in the suspended phase could occur to partially replenish liquid-phase OP being depleted by struvite precipitation. However, such conversion seems unlikely under thermodynamic conditions created specifically to precipitate OP, and therefore the dissolved OP as a fraction TP was viewed in these tests as an indicator of phosphorus potentially removable by struvite precipitation.

Likewise, only the dissolved form of Mg and TAN would participate in the precipitation. Therefore, to determine the degree of stoichiometric excess or shortfall for either, the fraction that is dissolved would have to be applied to its overall content in the analysis of the effluent.

Figure 6:
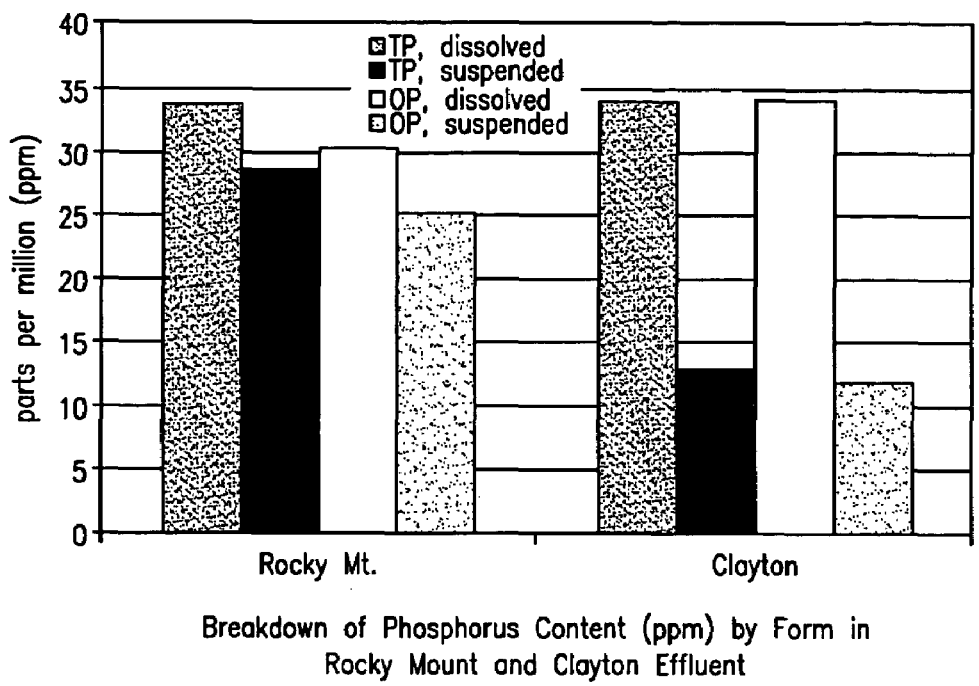
FIG. 6 is a chart showing a breakdown of phosphorus content by form in Rocky Mount, N.C. and Clayton, N.C. effluent.
Figure 7:
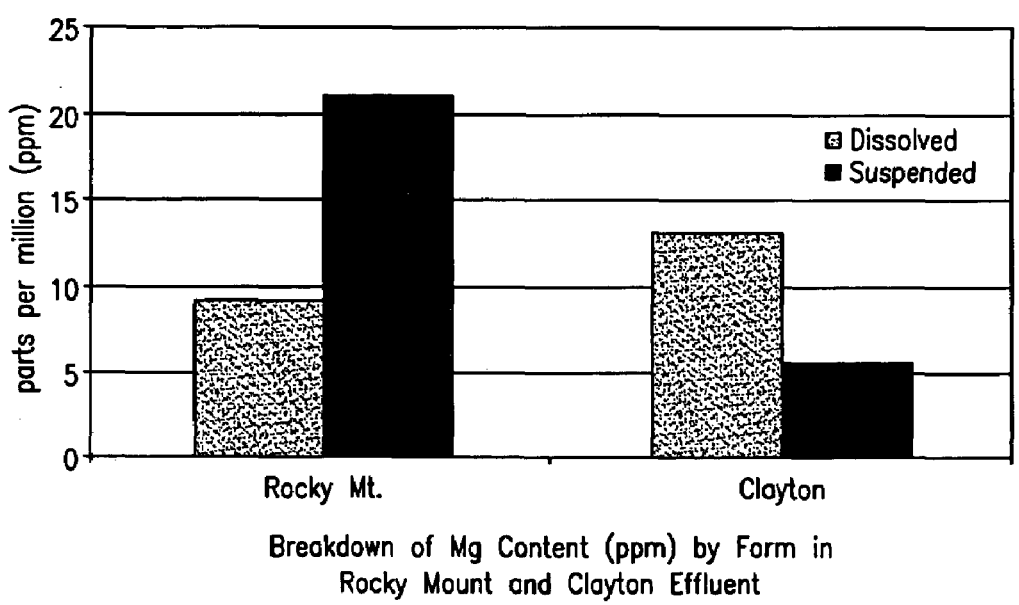
FIG. 7 is a chart showing a breakdown of magnesium content by form in Rocky Mount, N.C. and Clayton, N.C. effluent.
Figure 8:
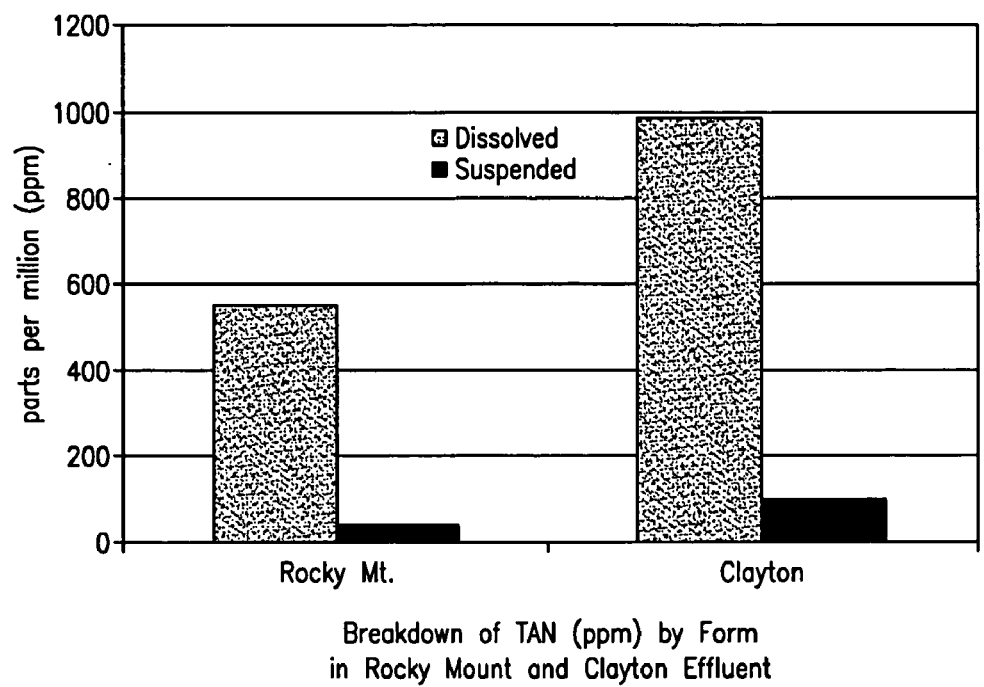
FIG. 8 is a chart showing a breakdown of TAN by form in Rocky Mount, N.C. and Clayton, N.C. effluent.

To estimate the partitioning among phases, samples of effluent from the Rocky Mount and Clayton sources were centrifuged. The clear centrifugate and the sediment, resuspended to the original volume, were analyzed for TP, OP, Mg, and TAN. The results of the analyses are shown in FIGS. 6, 7, and 8.

The analyses indicated that of all the phosphorus in the effluent sample from Rocky Mount, 49% was in the dissolved OP form and thus is potentially removable by struvite precipitation. In the effluent sample from Clayton, 73% was in the dissolved OP form. Dissolved Mg content fell short of stoichiometric equivalence with dissolved OP in both samples. The content in Rocky Mount effluent would need to be nearly tripled to reach equivalence, and the content in Clayton effluent would need to be doubled. The analyses showed that TAN content in samples from both effluents far exceeded stoichiometric equivalence with dissolved OP. The TAN content in the Rocky Mount sample exceeded equivalence with OP by nearly 50 times, and that in the Clayton sample by nearly 80 times.

Magnesium Supplementation Tests

These tests explored means for producing a liquid that can be added to the lagoon effluent for supplementing its dissolved Mg content. The tests focused on magnesium carbonate and MgO, which converts to Mg ion and two hydroxide ions when dissolved in water. The anions (hydroxide, carbonate, and bicarbonate) that these substances impart to water when they dissolve in it are already present in natural water, and thus the substances pose less environmental concern than do magnesium sulfate and magnesium chloride, which are commonly used for Mg supplementation.

The drawback in using MgO or magnesium carbonate is that they do not dissolve easily in water, and to the extent they do, the pH is raised in the process. Raising the pH is undesirable both because little Mg can dissolve in water above a pH of 10, and because higher pH decreases solubility of struvite, thus potentially interfering with dissolution of the Mg solid and/or creating unwanted suspended particles. In a solubility test, excess MgO was added to deionized water. The pH rose to around 10, and magnesium content in the water rose to only 5 ppm or less, too low for using as a supplementing solution.

A review of Mg solubility data indicated that Mg solubility is greater in solutions containing species that will lose protons before pH rises as high as 10. Ammonium ion, which has a pKa of 9.2, fits this description and is of interest because it is present in concentrations of 400 to 1000 ppm in lagoon effluent. Boric acid has the same pKa as ammonium ion and thus should behave similarly in augmenting Mg solubility.

In a test conducted to explore this phenomenon, excess MgO was added to five kinds of solutions. The solutions were then centrifuged and the clear centrifugate was withdrawn and analyzed for Mg content. A control (no MgO added) was also performed for each solution. The five solutions were (1) centrifuged digester effluent; (2) solution of ammonia in water to approximate the TAN content of digester effluent; (3) same as #2 except neutralized with acetic acid; (4) same as #2 except neutralized with sulfuric acid; and (5) solution of boric acid in water to approximate the same molar strength of the other solutions. The results, shown in Table 1, confirm that presence of ammonia makes solution of more than 100 ppm Mg from MgO addition. Consistent with expectations, the ammonia made possible the increased Mg solution only when the ammonia was neutralized, i.e., in its protonated form.

This effect suggests that the enhancement in magnesium solubility results from protonation of hydroxide ions by ammonium ions before the pH rises to 10, around which point the Mg solubility would drop to near zero. Ammonium ions will give up their protons to hydroxide ions when the pH rises to the ammonia pKa, which is 9.2. The similar result with boric acid, which has the same pKa, is consistent with this explanation.

TABLE 1

Table of Mg Content (ppm) Achieved in Five Liquids

|  | Lagoon effluent | Ammonia water | Ammonia water neutralized with acetic acid | Ammonia water neutralized with sulfuric acid | Boric acid |
|---|---|---|---|---|---|
| Control | 9.6 | 0.0 | 0.2 | 0.1 | 0.0 |
| With MgO added | 106 | 0.6 | 102 | 132 | 103 |

These results indicate that lagoon effluent can be used with MgO to produce a supplementing solution of a little over 100 ppm Mg. However, if supplementation levels of up to, say, 60 ppm are required, a supplementing solution of greater strength is desired in order to decrease the volume of supplementing flow in relation to the main flow of effluent being supplemented. Therefore, another proton-providing substance would have to be added to increase Mg solubility further. Carbon dioxide ($Co_2$) is a good candidate because it is already produced by biological lagoon activity and is sometimes collected as a component of biogas, and because it adds no ions of environmental concern. In addition, even if $CO_2$ is not captured from the lagoon, it can be purchased in pressurized cylinders and fed into the system with no need for any other storage or pumping equipment. Finally, because its pKa is only 6.2, $CO_2$ offers the potential of producing effluent-based supplementing solutions that are low enough in pH to prevent unwanted struvite precipitation despite elevated Mg content.

To test whether $CO_2$ addition would increase Mg solubility, $CO_2$ was bubbled via a tube from a chemical $CO_2$ generator for 45 min. into a suspension of MgO in deionized water. The suspension was then centrifuged and the clear centrifugate poured off and analyzed. The experiment was performed three times, and Mg concentrations of 608, 931, and 769 ppm were achieved, demonstrating that the $CO_2$ does in fact increase MgO solubility.

The least expensive form of MgO for field use that could be identified was calcined magnesite ore. Magnesite ore is predominantly magnesium carbonate, and calcining drives off $CO_2$, leaving MgO. It was envisioned that, in the field, $CO_2$ would be admitted under pressure into lagoon effluent in contact with calcined magnesite.

Equipment limitations in the laboratory prevented testing of this process. To approximate it, carbonated water for beverage use was first purchased, as it was considered to approximate the amount of carbonation that could be achieved in the field because the $CO_2$ cylinders in the field provide the same pressure as those used for carbonating beverages. The purchased water was titrated with 0.1 normal sodium hydroxide to pH 7 (about the maximum allowable without risking precipitation of pH when Mg content is high) to determine the amount of acidity it contained due to the carbonation. The titration showed carbonation of about 2900 ppm $CO_2$. This acidity should permit about 800 ppm of Mg to dissolve, assuming each molecule of $CO_2$ provides one proton and each molecule of MgO abstracts two protons upon dissolving. These approximations appeared valid when supplementing solutions were synthesized later for laboratory use. In the syntheses, calcined magnesite was dissolved with dilute hydrochloric acid. The acid was intended to substitute for $CO_2$, and thus was added in an amount providing the same acidity as 2900 ppm $CO_2$. The Mg concentrations reached 700 to 900 ppm, and the pH ranged from 6.7 to 7.3.

Magnesium carbonate was found not to dissolve appreciably in water, even when acidified with $CO_2$. Low solubility was observed whether the magnesium carbonate was in the form of magnesite gravel or powder. Due to the lack of promising results, no further testing was conducted with magnesium carbonate.

pH Enhancement Tests

These tests explored means for increasing pH in lagoon liquid. Rises of 0.5 to 1.5 pH points will likely be required for stimulating adequate precipitation of struvite. Ammonia was the focus of the tests, because it offers three potential advantages. First, it may be possible to obtain ammonia onsite by stripping it, possibly by vacuum alone, from a lagoon liquid stream other than that flowing to the struvite precipitation system. Second, its pKa appears ideal for achieving adequate pH rise while at the same time minimizing the possibilities for localized areas or brief episodes of pH so high that struvite solubility actually decreases or becomes uncontrolled. Finally, unlike most other additives commonly used to raise pH, ammonia would add no ions of environmental concern not already being addressed. While ammonia itself is of environmental concern because it increases nitrogen content, crop uptake is used for removing it. However, any additional ammonia may require expanded acreage if nitrogen is already being applied to the soil at its maximum loading given the rate of uptake 36 by the crop. Lime could also be considered because it adds no worrisome ions; however, the increased calcium could promote unwanted calcium phosphate precipitation in lieu of struvite.

Two means for using ammonia to increase pH were tested: pressure manipulation and simple addition.

Pressure Manipulation

The tests aimed to determine whether pH of digester effluent could be increased by exposing it to vapors stripped by vacuum alone from other effluent. Two methods were used in the tests. In one method, vacuum was produced by pumping liquid, and in the other method it was produced by pumping gas.

In the liquid-pumping method, a peristaltic pump withdrew liquid from near the bottom of a sealed flask. At the beginning, the flask was 90% filled with effluent, the remaining 10% being an air space at the top. The withdrawing of the liquid produced vacuum in the flask, and effervescence of the liquid in the flask was observed. The strength of the vacuum increased as more liquid was withdrawn. Five sample bottles received the liquid from the pump discharge, one bottle at a time. The first bottle contained the first liquid withdrawn, which had been exposed to the weakest vacuum. The last bottle contained the last liquid withdrawn, which had been exposed to highest vacuum. Once the flask had been pumped as nearly empty as possible, the liquid outlet to the pump was closed and a valve on another flask port was opened to allow fresh effluent to flow into the flask from a beaker open to the atmosphere. The effluent, which was from the same source as the effluent withdrawn from the flask, was propelled by atmospheric pressure and filled the flask to near the 90% level. The newly admitted liquid was allowed to sit for 30 min to absorb vapor and then was agitated for 2 min to further vapor absorption. The untreated effluent, the five bottles of effluent exposed to increasing degrees of vacuum, and the effluent admitted to the evacuated flask to re-absorb the stripped vapors were all analyzed for TAN and pH. Table 2 presents the results.

TABLE 2

Results from Liquid-Pumping Method of Increasing Ammonia and pH

|  | Untreated effluent | Bottle 1 (very mildly stripped) | Bottle 2 (mildly stripped) | Bottle 3 (moderately stripped) | Bottle 4 (strongly stripped) | Bottle 5 (very strongly stripped) | Re-absorbing effluent |
|---|---|---|---|---|---|---|---|
| pH | 7.43 | 7.44 | 7.4 | 7.48 | 7.47 | 7.54 | 7.46 |
| $NH_3$—N (ppm) | 1053 | 1020 | 1010 | 1024 | 1016 | 1016 | 1069 |

In the gas-pumping method, the flask was again filled to 90% full with untreated effluent and then sealed. However, the tube leading to the suction of the peristaltic pump was connected to the top of the flask so that gas was withdrawn rather than liquid. The gas discharged from the pump was fed though another tube to the bottom of a graduated cylinder, which was nearly full and contained one-fifth the volume of untreated effluent as was charged to the flask. The pump speed was adjusted to obtain slow bubbling of the gas into the liquid in the cylinder. At the beginning the pump speed was low, and the speed had to be gradually increased to maintain the bubbling. Finally, no bubbling could be obtained even at high pump speed, and effervescence of the liquid in the flask, which had begun soon after the pump was started, had slowed. The experiment was ended at this point. The untreated effluent, the effluent in the flask, which had been exposed to vacuum, and the effluent in the cylinder, which had been exposed to the stripped vapors to absorb them, were all analyzed for pH and TAN. Table 3 shows the result.

TABLE 3

Results from Gas-Pumping Method of Increasing Ammonia and pH

|  | Untreated effluent | Stripped effluent | Re-adsorbing effluent |
| --- | --- | --- | --- |
| pH | 7.43 | 7.5 | 7.55 |
| $NH_3$—N (ppm) | 1053 | 1047 | 1073 |

Results suggest that, in both methods, some ammonia was stripped from the effluent under vacuum and absorbed by the effluent at atmospheric pressure. Evidence for this conclusion is that, in both methods, TAN content of vacuum-treated effluent was lower than untreated effluent, though in the gas-pumping method the difference in slight. The TAN content of absorbing effluent, which in both methods was higher than TAN content of untreated effluent, provides more evidence for the conclusion.

The pH results are less clear. In the gas-pumping method, the pH of the absorbing effluent was measured as higher than that of the untreated effluent. Although this difference comports with the hypothesis that ammonia was transferred, the pH difference is small. In addition, the pH of the stripped effluent was measured as slightly higher than that of the untreated effluent, a result apparently inconsistent with the hypothesis. In the liquid-pumping method, the difference between the pH of the absorbing effluent and untreated effluent was again small but consistent with the hypothesis. However, the five samples of stripped effluent in this method exhibit a range of pH from slightly below the untreated effluent to slightly above the absorbing effluent. There appears to be a trend with respect to sample number, with the first two (and least vigorously stripped) samples having the lowest pH, the next two having intermediate pH, and the last having highest pH. This pH behavior may signal that ammonia transfer was accompanied by transfer of acidic gases ($CO_2$, for example), which limited, or even reversed, the pH fall of the stripped effluent and the pH rise of the absorbing effluent.

In any event, the magnitude of the pH rises observed in these experiments fell short of the required range. Pressure manipulation for pH rise was thus pursued no longer.

Direct Addition of Ammonia

An experiment was conducted to determine how much the pH is increased by adding ammonia in various quantities to lagoon effluent mixed with varying amounts of Mg-supplementing solution. This information is needed to plan how much ammonia will be required for adjusting the pH, whether the ammonia is purchased or obtained from lagoon liquid by vacuum stripping with alkali addition.

In the experiment, a liter of lagoon liquid was stirred in a large beaker with a pH meter suspended into it. Water containing 18,000 ppm (as N) ammonia was pipeted into the beaker in increments. After each increment was added and the pH stabilized, the pH and the volume of the increment were recorded. Successive increments increased in size as the effect on pH decreased with accumulated ammonia addition.

This procedure was repeated four more times, each with an increased amount of Mg supplementing solution added to the effluent. The supplementing solution contained about 200 ppm Mg and was prepared by mixing calcined magnesite into lagoon liquid, settling, and pouring the Mg enhanced liquid off the settled, excess solid that did not dissolve.

Figure 9:
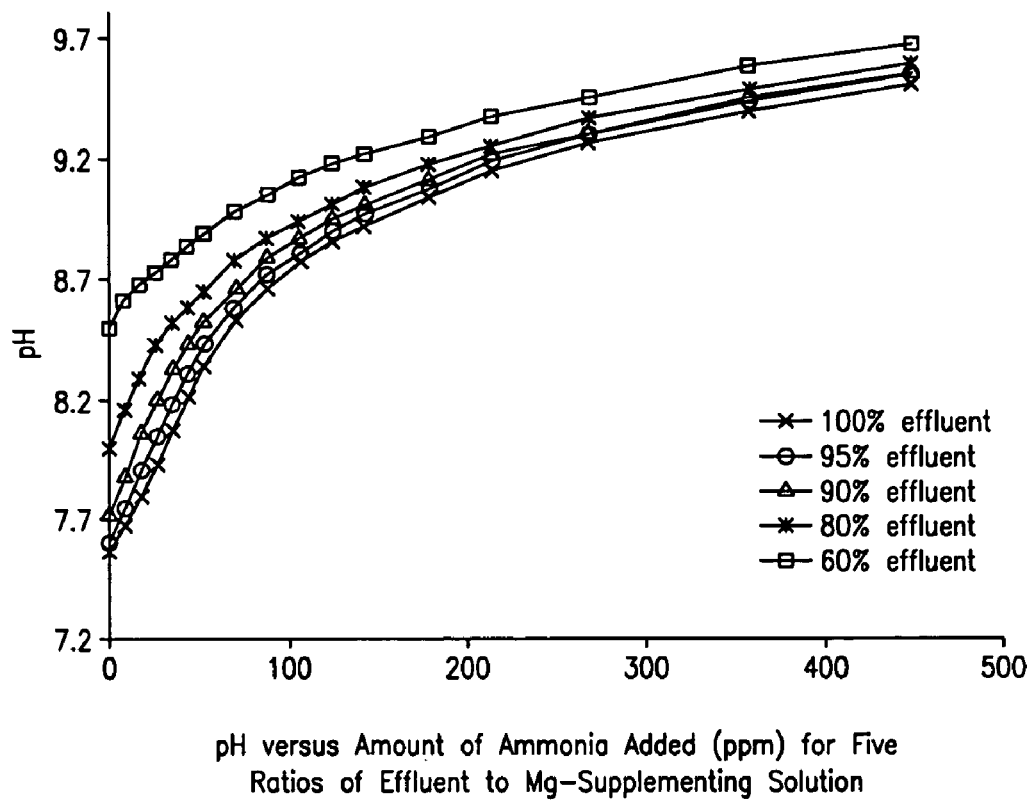
FIG. 9 is a chart showing pH verses the amount of ammonia added for five ratios of effluent to Mg—supplementing solution.

The results are shown in FIG. 9. For pure effluent, approximately 40 ppm ammonia addition was required for a 0.5-point rise in pH, and 80 ppm for a one-point rise. For the mixtures of effluent with Mg-supplementing solution, the initial pH depended on how much Mg solution was used, being greater for greater proportions of Mg solution. However, for all mixtures except the one richest in Mg, the amount of pH rise achieved with a given amount of ammonia addition was nearly the same as that for pure effluent. The richest mixture (60% effluent, 40% Mg-supplementing solution) required about twice as much ammonia to raise the pH a half point, and 300 ppm or more to raise the pH one point.

Rate Tests

Tests were conducted to estimate the rate of precipitation as related to available surface area per volume of liquid and to driving force. The goal was to estimate the reaction constant for the rate equation proposed for the reaction. In the equation, the reaction rate, in decrease of molar product (P) per time (t), is equal to the reaction constant (k') times the surface area available per liquid volume (m), times the driving force expressed as excess molar product above the equilibrium ($P_e$):

$$-\frac{dp}{dt} = mk'(P - P_e) \qquad (1)$$

This information is critical in creating a design for a crystallizing system, because both the choice of reactor type and its dimensions will be influenced by the rate of reaction.

The tests were set up in a manner to allow monitoring of the disappearance of OP, Mg, and TAN from solution as time elapsed. This information allowed calculation at each time increment of the excess molar product, which is the product of total Mg, TAN, and OP molarities minus the equilibrium product at the observed pH. The set-up also allowed calculation of the surface area available per liquid volume at each increment. The surface area was held constant, and the amount of liquid could be calculated at each increment by adding up the total volume of liquid samples removed by that point in time. Thus, all variables needed for estimation of the rate constant were tracked. A more detailed description of the procedure used is presented below, followed by the results.

Procedure

To provide the surface for reaction, 100 grams (g) of struvite grains of 1.68 to 2.00 mm diameter were prepared by gently grinding large struvite crystals and then using a Tyler screen and shaker assembly to select that range from the ground crystals. The surface area of the grains was estimated, using the assumption the grains were roughly spherical. Several gallons of Rocky Mount lagoon effluent was obtained, and a sample submitted for Mg, TAN, OP, and TP assays.

Mg-supplementing solution was prepared by adding 250 g of Mg ore gravel (washed) to 250 ml of Rocky Mount lagoon effluent, stirring, and allowing to soak overnight in refrigerator. Then the solution was filtered to remove any ore powder and other particulates. A sample was analyzed for OP, Mg, and TAN.

The apparatus was set up for conducting the crystallization reaction. It consisted of a 500-ml beaker, magnetic stirrer, and pH probe mounted in the beaker. Sample bottles marked "1" through "10," each containing the dilute HCl to ensure dissolution of suspended struvite, were prepared. Then, 20 g of the prepared struvite grains were spread and immobilized in a flat stainless steel wire cage. The cage was inserted into the beaker and positioned in such a way to allow the stirring liquid to circulate rapidly through it.

A known volume of lagoon effluent, ranging from 250–350 ml, was placed into the beaker with stirrer. Enough Mg-supplementing solution to provide 50 ppm additional Mg to the lagoon effluent, calculated according to Mg assay of the solution, was prepared, as well as enough ammonia water (3% ammonia as ammonium hydroxide) to add 200 ppm additional TAN. This amount of ammonia served to raise the pH by approximately 1.3 points. The Mg-supplementing solution, ammonia water, and struvite were placed in the beaker quickly and a stopwatch simultaneously turned on. Immediately, a 10-ml sample was pipeted and put into the first sample bottle. Three more samples were taken in succession as quickly as possible. Two more samples were taken, aiming for 4 minutes between samples, and for the remaining samples approximately 6 minutes was allowed. At the time of pipeting each sample, the time was noted from the stopwatch and the pH of the reacting effluent was also recorded.

After the reaction sequence, the basket holding the grains was removed and the grains allowed to air-dry. The grains were then weighed and found not to have changed in weight perceptibly, thus ensuring that the surface area had remained essentially constant.

The experiment was run a second time, this time augmenting the OP content instead of the Mg content. The OP augmentation was achieved by adding enough potassium dihydrogen phosphate to add 50 ppm OP to the liquid. As in the first run, the pH was raised approximately 1.3 points by adding enough ammonia water to raise TAN by 200 ppm.

The experiment was run a third time, reverting to 50 ppm Mg augmentation with no OP augmentation. Ammonia water equivalent to 200 ppm TAN addition was used as in the other runs to raise pH by approximately 1.3 points. However, in this run, TAN was further increased by 400 ppm (bringing total TAN augmentation to 600 ppm in this run), with no further effect on pH, by adding ammonium chloride.

Results

Figure 10:
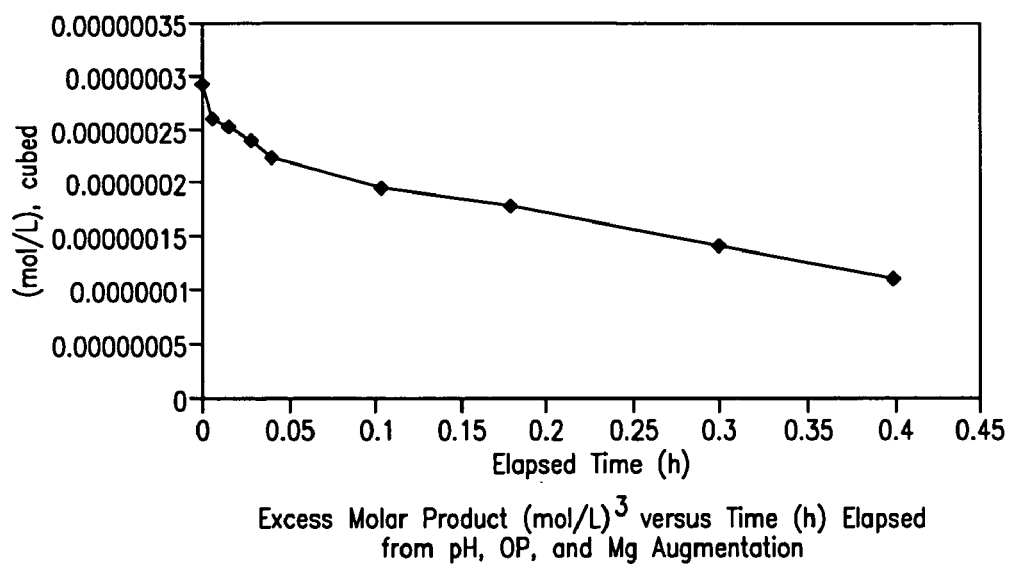
FIG. 10 is a chart showing excess molar product versus time elapsed pH, OP, and Mg augmentation.

FIG. 10 shows the results for the second run of the experiment. First and third run results are not shown because they were erratic, possibly resulting from contamination or sample mix-ups. The rate constant estimated by averaging its calculated value over the second run is 0.3 dm/hr, roughly twice the estimate drawn from literature and cited in the introductory section on kinetics.

A careful review of the results and observations made during the run led to the hypothesis that even the 0.3 dm/hr estimate may be low. The hypothesis stems from three ideas.

First, a slight clouding of the solution was observed early in the experiment, perhaps 10 to 20 s into the run. This suggests that precipitation may have been occurring by self-nucleation in the bulk of the liquid rather than onto the grains provided. Self-nucleation could occur if the liquid is so highly supersaturated for a long enough period that its self-nucleation time falls short of the average time elapsed before all of the liquid can contact the surface of the provided grains. Precipitation onto nuclei in the bulk liquid would decrease the apparent reaction rate, because the precipitated struvite would be accounted as struvite remaining in the liquid. In fact, precipitation might occur preferentially on the suspended nuclei, because they would be distributed throughout the liquid and thus be more accessible, and also because their surface-to-volume ratio would be high due to their small diameter.

Second, the calculated rate constant during the first time increment, 2.5 dm/hr, was more than eight times greater than the average over the run. For the remaining increments, the calculated constant varied from 0.15 to 0.5 dm/hr in random fashion. Inspection of FIG. 10 reveals the reduction in observed rate at the beginning of the second increment. This rate pattern is consistent with the self-nucleation concept. If some substantial part of the first increment elapsed before nucleation occurred, then precipitation would have had to occur onto the provided grains for that part of the increment, thus removing OP, Mg, and TAN from the liquid. Once nucleation occurred, much of the precipitation could occur on the suspended nuclei, thus reducing the apparent rate.

Third, the amount of OP observed to have been removed from the liquid was only about 20% by the end of the experiment. At the supersaturation achieved, more than half of the phosphorus should have been removed. The shortfall in phosphorus reduction is also consistent with the self-nucleation idea. The phosphorus may actually have been removed from solution, but in the fine, suspended form, thus being included as part of the liquid in the analyses.

To deal with this result and its uncertainty, a safe approach is to design the system with the assumption that the rate constant may really be as low as 0.3 dm/hr, but recognize that the resulting system may be over-designed in the event the rate constant is in fact much higher.

Crystallizer Design Elements

The basic design elements for the system were set forth, drawing on information and ideas developed through the literature review, batch tests, and original thought. The elements are summarized below.

Mode of Reaction. The reaction should take place in the continuous mode rather than batch. Continuous mode systems are generally preferable to batch systems because size, and hence capital cost, is limited. Batch systems may be better if the reaction rate is slow, but that is not the case here.

Type of Reactor. The reactor should be a fluidized bed crystallizer. The reaction rate is high enough that a fluidized bed will work well, and a packed bed reactor would be difficult to manage in the farm environment. However, the nucleation time is so quick, especially at higher levels of supersaturation, that time between chemical adjustment and extensive contact with struvite surfaces must be minimized. Thus, Mg addition and pH enhancement should occur immediately prior to contact with the fluidized bed.

Shape of Reactor. The reactor should increase in cross-sectional area with height, so that the upflow velocity at the bottom is several times greater than that at the top. This will prevent the current from sweeping very small bed particles up and out with the exiting liquid, yet provide enough velocity at the bottom to maintain larger particles in a fluidized state.

Product Removal. Some sort of product collection chamber should be provided at the bottom of the vessel so that product can be removed by gravity, with a simple valve or removable separator between the vessel and the collection chamber to allow movement of bed particles into the chamber when desired. To keep labor cost low, simplicity is key.

pH adjustment. The pH should be augmented by adding ammonia. Batch tests indicated as little as 40 ppm ammonia may be needed. In addition, in the future, ammonia may be available at the site from ammonia stripping operations. Its pKa is ideal for raising pH without risking excessively high pH, and farm waste systems are already designed to remove ammonia. If purchased in pressurized, portable vessels, ammonia can be added through small tubes, without need for pumping equipment or pipes. Finally, ammonia is a common commodity in agriculture and thus should be readily available.

Ammonia addition. The addition of ammonia reflects other positive benefits in certain agricultural industries. For example, in the dairy industry, dairy farmers tend to seek additional nitrogen for crops irrigated with wastewater. When they remove phosphorus from wastewater through various treatment processes, the level of nitrogen also drops and must be supplemented by the addition of nitrogen fertilizer on to the crops. Wastewater phosphorus removal, such as that described in the present invention, involves the addition of ammonia to the wastewater stream such that while phosphorus is removed, the addition of ammonia raises nitrogen levels in the treated effluent to levels where the need for additional nitrogen fertilization is reduced significantly or eliminated.

Mg supplementation. Mg should be added by dissolving calcined magnesium carbonate into lagoon effluent with the aid of $CO_2$. Batch tests indicate this technique will succeed in achieving adequate Mg supplementation. It adds no worrisome cations. This form of magnesium is currently used as a livestock feed supplement, so it also should be readily available. Finally, $CO_2$ may in the future be available from biogas captured from the lagoon. If purchased in pressurized cylinders, it can be fed to the system through small tubes, thus avoiding need for pumping equipment or piping.

II. Experiments with Laboratory-Scale Continuous Crystallizer Overall Design of Experiments The experiments sought to reveal how the behavior of the crystallizer varies with respect to variations in operating conditions. The organization of the experiments reflects a balance between the need for efficiency in time and materials use and the need for data yielding useful, sufficiently confident conclusions about the effect of the variations upon performance. To strike this balance, it was necessary to recognize the time required for crystallizer performance to achieve steady state after a set of conditions is put in place and the practical demands resulting from this time requirement.

Steady state is achieved for a given set of conditions (liquid entering at a given constant flow rate and composition, and seeds, if any, being added at a given constant size and number per hour) when the liquid flowing out of the crystallizer is constant in composition, and the bed is constant in total weight and particle size distribution. By deduction, the net rate (number per time) of generation of bed particles by seeding and other mechanisms must equal the net rate of removal by product outflow and other mechanisms.

Evolution in behavior of the crystallizer toward steady state can be viewed as occurring in two parts. The first part is the relatively fast change (within 10 min) in behavior that results when the overall liquid flow rate, ammonia addition rate, or Mg addition rate is changed. These changes occur primarily because of the changing driving force in the liquid phase for the reaction, and are completed as soon as the new concentrations work their way through the liquid in the bed. The second part is the relatively slow change (requiring thirty to fifty hours, for example) that results from the change in bed characteristics that can result when the liquid flow rate, ammonia addition rate, Mg addition rate, seeding rate, seeding size, or product removal manner is changed. This type of change is slow because the amount of phosphorus available for crystallization, and thus also the crystal growth necessary to change bed characteristics, in the liquid passing through the crystallizer each hour is equivalent to only a few percent of the weight of the bed. Therefore the bed changes toward steady state only over a period of hours.

In an ideal experimental design, with "ideal" here meaning "without regard to practical laboratory constraints," the crystallizer would be allowed to come to steady state at each condition set by passing through both the fast and slow changes after that condition set is put in place. A series of runs is required for the crystallizer operation to pass through the fast and slow changes to reach steady state for one condition set. A single, long run is impossible because the crystallizer cannot be operated continuously for more than about four hours at a time because it must be shut down to remove product when the product collector fills. Also, to monitor adequately the progress of the bed toward steady state, a sieve analysis needs to be performed on the bed every few hours. For time efficiency, this analysis is best performed after each product removal shutdown. The sieve analysis requires removal, drying, sieving, and weighing of the bed, all of which requires at least one extra day. Therefore, runs cannot be spaced closer than alternate days. If about 40 hours of operation are required for passing through both the fast and slow changes, ten four-hour runs are needed, spanning twenty laboratory days or about four work weeks.

Also, the ideal experimental design would prescribe that a variety of condition sets be selected and repeated in a manner yielding data sufficient to support confident conclusions about the effects of the conditions upon the performance. A randomized complete block design, with blocks corresponding with samples of lagoon liquid to adjust for its sample-to-sample variation, would efficiently produce data suitable for a factorial-style statistical analysis that would reveal the nature of the effects of the conditions upon performance. A set of experiments in this design, using three blocks and testing five factors (e.g., ammonia addition, Mg addition, liquid flow rate, seeding rate, and product removal means) at only two levels each would require 3×2×2×2×2×2, or 96, series of runs. With four work weeks required for each series, at least 384 weeks would be needed. Nearly eight years would therefore be required to complete all the series, and major components of the system would likely wear out and need to be replaced during this time, introducing changes that would muddle the statistical analysis. Operating multiple crystallizers simultaneously would reduce elapsed time for a given number of series, but would introduce a new variation source that would result in the need for more series of runs and also require more laboratory space and personnel.

The ideal design would also require large volumes of lagoon liquid samples. A single mixed sample of lagoon liquid for each series is needed for properly blocking out the sample-to-sample variation. With an average flow rate of 13 gallons per hour (gal/h), or 49.3 L/h, of lagoon liquid, each of the 96 series would require that a tank containing 520 gal (1,970 L) be brought from a lagoon to the laboratory. This quantity of liquid would weigh about 2.5 tons, or about 2,300 kilograms (kg). Quantities above one-half ton (454 kg), however, become challenging to manage in the laboratory because they are difficult to move on hand trucks.

To reduce the time and lagoon liquid requirements to levels achievable in the laboratory, the experiments were organized into two stages, summarized in Table 4. The first stage, here called the fixed-condition runs (FCRs) aimed to reveal the behavior of the crystallizer for two condition sets after achieving steady state, i.e., after passing through both the fast and slow changes, for each set. (In practice, the second set did not lead to steady state and was therefore modified, resulting in a third series of FCRs.) The behavior observed included the performance, as indicated by reductions in TP and OP between raw and treated liquid; the TP and OP reduction at four different positions within the crystallizer; weight and particle size distribution of the bed; production rate; and particle size distribution of the product.

The second stage, here called the multivariate runs (MVRs), set the bed characteristics at those achieved in the near-steady state period observed during series #3 in the first stage. The second stage explored the effects of eighteen operating conditions resulting from factorial arrangement of three operating parameters, after allowing the fast changes in performance to occur. The three parameters were ammonia addition, at three levels; Mg addition, also at three levels; and total liquid flow rate, at two levels. The range in the level of each parameter centered on the value at which that parameter was set in the FCRs when the crystallizer reached the steady state condition that yielded the bed characteristics used in the MVRs. Only one series of runs was conducted in this stage, and this series is denoted as # 1 in Table 4.

The two-stage approach thus showed the steady state behavior for two condition sets and the effects of variations in three parameters when allowing time for the fast changes to occur. The main advantage with this approach is that it reduces the time required for testing the effects of the three parameters. The main drawback is that the effects observed in the MVRs are not necessarily the same as the effects that would be observed if the crystallizer were allowed to reach steady state for each set of conditions. It is conceivable, for example, that a combination of parameters different than that used to produce the bed characteristics used in the MVRs could, if time were allowed for reaching steady state, produce bed characteristics so different that performance would also be changed materially beyond the fast changes. It was to minimize this risk that the ranges tested in the MVRs centered upon the values used in the FCRs to produce the bed characteristics used in the MVRs.

TABLE 4

Organization of Experiments with Continuous Laboratory-Scale Crystallizer

| STAGE | SERIES # | NUMBER OF RUNS | DESCRIPTION | CONDITIONS |
| --- | --- | --- | --- | --- |
| 1: FCRs (Fixed Condition Runs) | #1 | 16 | Reached goal of attaining near-steady state at the first set of conditions | Liquid rate: 13 gal/h (49.3 L/h Ammonia addition: 100 ppm TAN Mg addition: none Seeding: 18 seeds per s Product removal mode: continuous by gravity during operation |
| | #2 | 16 | Attempted, but failed, to reach near-steady state at the second set of conditions | Liquid rate: 13 gal/h (49.3 L/h) Ammonia addition: 100 ppm TAN Mg addition: 30 ppm Mg Seeding 29 seeds per s, dropping to zero through the series Product removal mode: continuous by gravity during operation |
| | #3 | 15 | Reached goal of achieving near-steady state at the modified second set of conditions | Liquid rate: 13 gal/h (49.3 L/h) Ammonia addition: 100 ppm TAN Mg addition: 30 ppm Mg Seeding: zero Product removal mode: periodic rapid removal to maintain bed height |
| 2: MVRs (Multi-Variate Runs) | #1 (only one series of runs) | 3 | Each run tested 18 condition sets for factorial-style statistical analysis. The range in conditions centered on the conditions in series #3 of the FCRs. | All eighteen combinations of: Ammonia addition (0, 100, and 200 ppm TAN), Mg addition (0, 30, and 60 ppm Mg), and Liquid rate (11 and 15 gal/h, or 41.7 and 56.8 L/h) All runs maintained, throughout: No seeding Product removal by periodic rapid removal to maintain bed height. |

The two condition sets chosen for the FCRs were two that the PLCB model predicted would result in stable operation. The condition sets were similar; however, only one of them calls for Mg addition. Also, the seeding rate was set higher in the set that included Mg; otherwise, the model predicted that the bed would fall at the bottom due to larger particle size resulting from the greater mass of struvite precipitated. The model does not take ammonia addition directly as an input, but rather pH. The results of the tests measuring pH rise versus ammonia addition, described under "Direct Addition of Ammonia" in "Experiments in Batch Mode and Resulting Design Elements for Struvite Crystallizer," were used to set the ammonia addition to approximate the pH rise used as input for the model runs. The condition sets for the MVRs centered around the FCR condition set that used Mg addition.

Equipment, Materials, and Procedures Used
Equipment

Figure 11:
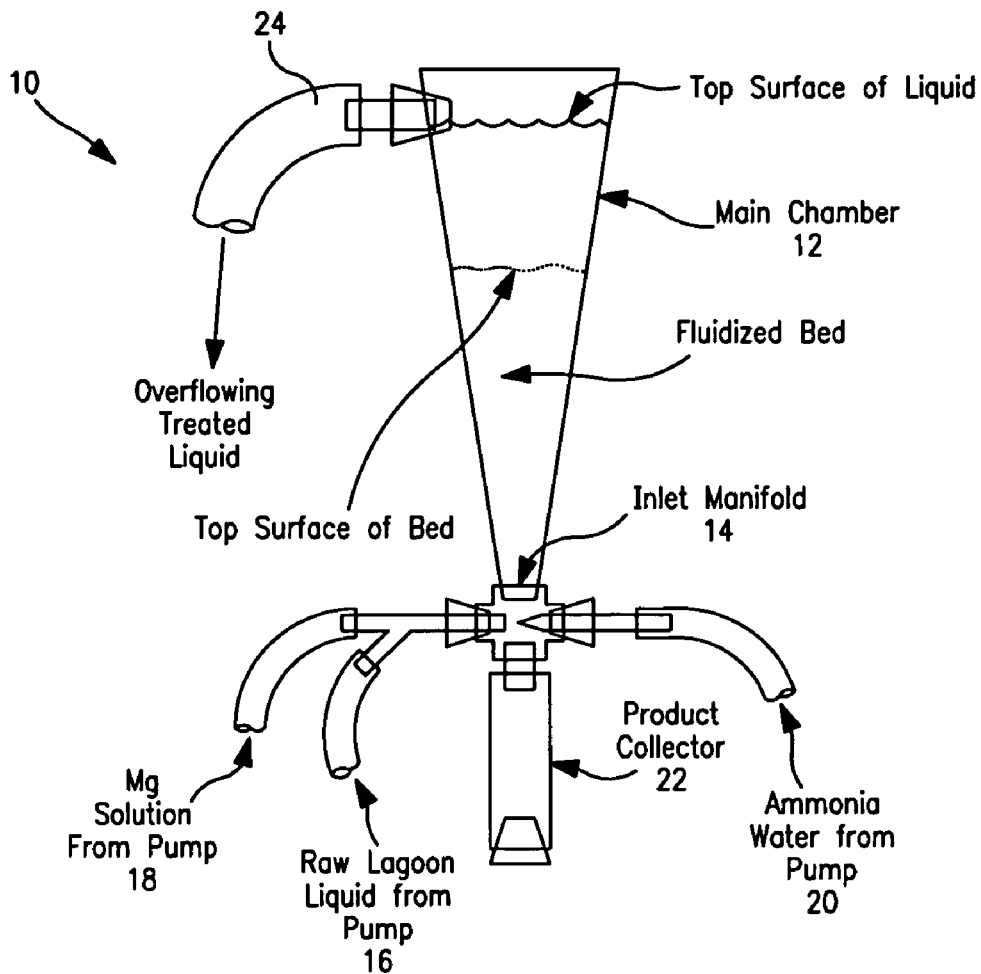
FIG. 11 is a schematic drawing of a laboratory-scale continuous crystallizer according to the present invention.

Referring now to FIG. 11, the system used for continuous crystallization in the laboratory, generally designated 10, consisted of a main crystallizer chamber 12; an inlet manifold 14 at the bottom of the chamber, with connections for raw lagoon liquid 16; Mg solution 18 and ammonia water inputs 20; a product collector 22; an overflow at the top of the main chamber 24 with a connection for exit of treated lagoon liquid; and hoses, tubes, pumps, and storage vessels for the inputs and output. Drawing 11 shows the main chamber 12, inlet manifold 14 and connections, product collector, and overflow.

The main chamber or funnel 12 of the crystallizer 10 was made from a one-liter Imhoff funnel, composed of transparent plastic and normally used for measuring sedimentation rates. The bottom of the funnel was sawn off at the height required to provide an inner diameter of 0.5 in. (1.27 cm) at the bottom of the remaining funnel. The sides of the funnel were straight, forming a cone with diameter increasing at a constant rate with respect to height. The inner diameter at the top of the cone was 4 in. (10.2 cm), and the cone was 15 ⅝ in. (39.7 cm) high.

The preferred inverted cone-shape of main chamber 12 is very important since it serves to keep the very fine struvite particles from being swept out of the bed and lost with the liquid flowing over the top of chamber 12, and at the same time keeps the largest struvite particles in the bed and growing. By keeping the small particles, there is provided a high surface area per volume which allows the precipitator to be much smaller than it would otherwise need to be if an inverted cone-shaped chamber 12 were not utilized. Keeping the larger struvite particles is important so that they may keep growing and therefore result in a more granular product which is easier to handle, de-water and dry.

A polyvinyl chloride (PVC) pipe nipple of 0.5 in. (1.27 cm) nominal diameter, with barb connections, initially was attached vertically downward from the funnel bottom by slipping the ends of both tightly inside a section of rigid, clear, vinyl hose until the ends of the nipple and funnel butted together within the hose. The bottom end of the nipple was pressure fit into the top connection of the inlet manifold 14, which consisted of a PVC cross (four-way tee) of three-quarter-in. (1.91 cm) nominal diameter with socket-type connections. The nipple and hose were removed after the tenth run in the first series of FCRs to ease flow of product from the main chamber 12 into the product collector 22. For the remainder of the FCRs and for the MVRs, the inlet manifold 14 was bonded directly to the bottom of the funnel with silicone sealant. FIG. 11 depicts the apparatus after removal of the nipple and hose and therefore does not show them.

A nipple identical to that initially used above the manifold 14 was attached to the bottom manifold connection, also by pressure fitting, to accommodate the product collector 22, which consisted of a six-inch (14.2 cm) length of the same rigid hose used on the funnel bottom. The top of the collector was slipped around the bottom of the nipple, and a rubber stopper was pushed up into the bottom of the collector to close it. A one-hole rubber stopper was inserted into each of the two side connections of the inlet manifold. One of the side connections served as the inlet for lagoon water and Mg solution. Through the hole in the stopper in this connection was pushed, for the second and third series of runs, the non-bifurcated end of a Y-shaped laboratory glass tubing section with outer diameter of about ⅜ in. (0.95 cm). For the first series of FCRs, in which no Mg was used, a section of glass tubing, approximately 2 in. (5.1 cm) long and ⅜ in. (0.95 cm) outer diameter, was pushed through the stopper in this connection. The other connection served as the inlet for ammonia water. Through the hole in the stopper on this connection was inserted, with the tip inwards, a stub from the bottom of a one milliliter (mL) glass pipet, formed by cutting the pipet about 2 in. (5.1 cm) above the tip.

For introducing the ammonia water, a FISHER SCIENTIFIC Variable Mini-Flow peristaltic pump drew the liquid from a one-liter NALGENE bottle through TYGON plastic tubing of 0.25 in. (0.64 cm) outer diameter, extending from the bottom of the bottle to the pump suction connection. The tubing was slipped through a hole in a rubber stopper inserted into the mouth of the bottle to minimize ammonia evaporation. Another length of the same type of tubing extended from the pump discharge connection to the outer end of the glass stub in the inlet manifold.

For introducing the lagoon water, an IDEX CORPORATION Model 020 variable speed gear pump drew the liquid from a 120-gallon (455 L) plastic tank mounted on a wooden pallet. The liquid was drawn from the tank through a length of 0.5 in. (1.27 cm) diameter TYGON tubing, weighted at one end with a steel clamp to maintain its position about 4 in. (10.2 cm) above the floor of the tank, and attached at the other end to the suction of the pump. From the pump, the liquid flowed through a length of 0.5 in. (1.27 cm) rubber tubing connected at one end to the pump discharge and at the other to one of the two ends of the bifurcated side of the Y-shaped glass section in the inlet manifold.

For introducing the Mg solution, a FISHER SCIENTIFIC Variable Mini-Flow peristaltic pump drew the liquid from a five-gallon (19 L) plastic pail through TYGON plastic tubing of ⅜ in. (0.95 cm) outer diameter, extending from near the bottom of the pail to the pump suction connection. The pail was covered with aluminum foil to minimize evaporation and odors, and the TYGON tubing passed through a small opening in the foil near the lip of the pail. A length of rubber tubing of 0.5 in. (1.27 cm) outer diameter extended from the pump discharge connection to the other end of the bifurcated side of the Y-shaped glass section in the inlet manifold. Each of the three tubes feeding liquid into the crystallizer was provided with a pinch clamp for closing and opening the tube.

To provide an overflow from the main chamber, a hole large enough to accommodate a 1 in. (2.54 cm) rubber stopper was drilled, centered 0.75 in. (1.9 cm) below the top of the funnel. Into the stopper was drilled a hole large enough to accommodate the end of a 0.5 in. (1.27 cm) nominal diameter PVC pipe nipple with barbed connection, which was pressed into the stopper. The inner edge of the hole in the funnel was covered with a bead of silicone sealing and adhesive compound to provide a leak-free fit with the stopper. After the bead was dry, the stopper and nipple assembly were pushed into the hole and secured with tape and/or wire extending around the funnel. This set-up positioned the lowest point at which liquid could overflow; that is, the lowest point of the inside wall of the nipple, at 7/8 in. (2.22 cm) below the top of the cone. A length of the same TYGON tubing used to connect the funnel bottom to the inlet manifold was pressed onto the outer end of the nipple and extended to a sink with drain leading to a system for treating such wastes.

TEFLON tape was used to ensure leak-proof connections at several points in the system. The tape was wrapped around the ends of the two PVC nipples before inserting them into the inlet manifold, around the bottom of the funnel before inserting it into the hose section, and around the suction nozzle of the lagoon water pump before inserting it into the suction hose.

Figure 11A:
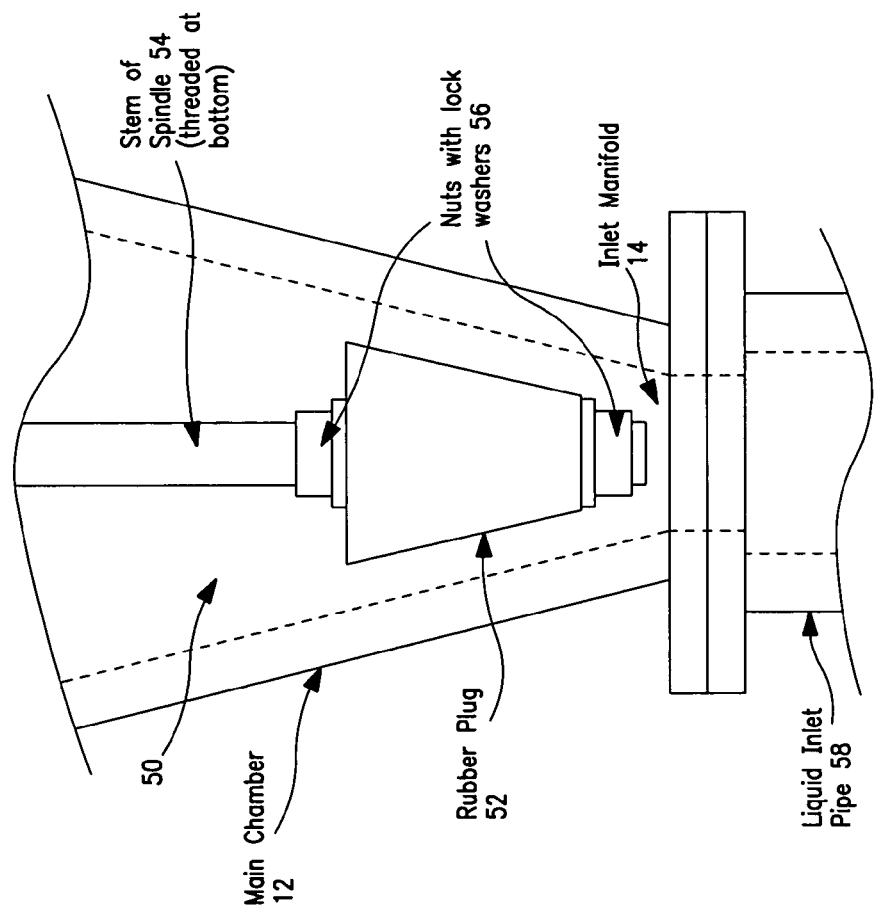
FIG. 11A is a schematic detailed drawing of a plugging device used in the main crystallizer chamber according to the present invention.

Referring to FIG. 11A, a plugging device shown generally as 50, was fabricated for supporting the bed in the funnel while the system was shut down. This device would be inserted from the top of the funnel. For the device, a tapered neoprene stopper 52 was selected to fit smoothly and snugly into the bottom of the funnel at inlet manifold 14. A rigid steel spindle 54 approximately 18 in. (46 cm) long and ⅛ in. (0.32 cm) thick was threaded for about 1 in. at one end. Stopper 52 was pushed onto the threaded end of the spindle and secured with washers and lock nuts 56. The other end of the spindle was formed into a loop for easier grasping (not shown).

Plugging device 50 is designed in such a manner as to be left inside the treatment unit while the unit is operating. In times of unit shut-down, rubber plug 52 of plugging device 50 seals the bottom of main chamber 12 at the position of inlet manifold 14. This sealing action allows the fluidized bed to be retained in the system. Upon start-up of the unit, rubber plug 52 will unseat once fluid flows from liquid inlet pipe 58 into inlet manifold 14 and plugging device 50 will raise upwards to allow fluid to flow into the unit. Plugging device 50 will remain in this unseated position, allowing fluid into the system as long as there is sufficient water flow to keep plugging device 50 suspended. Upon system shut-down, or pump failure, plugging device 50 will return to its sealing position with rubber plug 52 again seating against inlet manifold 14.

The funnel was supported by a ring clamp and a buret clamp, which were in turn clamped to a sturdy ring stand. The intake manifold and product collector were supported by the funnel. The three metering pumps and the container for the ammonia water were placed on the bench top near the funnel. The lagoon water tank and the container for the Mg solution were placed on the floor.

A pH probe was mounted from the ring stand in such a way that its tip extended below the surface of the liquid in the funnel at a point near the overflow. Connecting wires led from the probe to a digital readout indicating the pH in hundredths of a point.

Materials

Ammonia water for the apparatus was produced by diluting laboratory reagent-grade ammonia water, containing 30% ammonium hydroxide (NH4OH) by weight, as necessary with distilled water to achieve 7,500 ppm TAN.

Mg solution for the apparatus was produced by dissolving feed-grade magnesium oxide (MgO), which consists of caustic-calcined magnesite (a Mg ore), in water acidified with concentrated hydrochloric acid (HCl), which contained 38.5% by weight hydrogen chloride. HCl was used in place of compressed carbon dioxide ($CO_2$) in the laboratory to avoid the complication and expense of handling small amounts of compressed gases. The acid-to-MgO ratio, which was 40 milliliters of concentrated HCl to twelve grams of MgO, was set to provide hydrogen ions sufficient to neutralize all the hydroxide ions generated by dissolution of MgO:

$$MgO + H_2O \rightarrow Mg^{+2} + 2\ OH^{-1} \quad (2)$$

The resulting concentrated Mg solution, containing about 16,000 ppm Mg, was stirred into sufficient lagoon water to dilute it to 800 ppm Mg. Preliminary work suggested this concentration could be achieved by passing lagoon water acidified with compressed $CO_2$ through a bed of MgO. On the second series of FCRs and on the MVRs, a sample of the concentrated Mg solution was taken and diluted 1,000 to 1, and the result used to confirm the Mg content before stirring it into the lagoon water. (The first FCR series did not use any Mg, and the Mg content became so consistent by the end of the second series that analyzing the strong Mg solution before each run was judged unnecessary. The MVRs, composing the basis for statistical analysis, required that the Mg content be known, and therefore sampling and analysis of the concentrated Mg solution resumed for these runs.)

The lagoon water was taken from the primary lagoon for swine waste treatment at the Upper Coastal Plain Research Station between Rocky Mount and Tarboro, N.C. The water was drawn by portable pump and hose from the southwest corner of the lagoon, about six feet from shore and one to two feet under the surface.

The particulate solid for the fluidized bed in the crystallizer was produced for the first run by grinding dried crystalline solid with a mortar and pestle. For each subsequent run, the bed used was that recovered from the run preceding it. The crystalline solid was obtained from the farm where the lagoon water was obtained. The solid was taken from a lagoon water recirculation pipe and was dried overnight at 100 to 120 degrees Fahrenheit (° F.), or 38° C. to 49° C., before grinding. The dried solid was dissolved in weak sulfuric acid (aqueous H2SO4) and analyzed for Mg, TAN, and OP, with results as shown in Table 5.

TABLE 5

Results of Analysis of Acid-Dissolved Crystals from Farm

| Species | Expected Concentration if 100% Struvite | Concentration from Analysis | Percent of Expected |
|---|---|---|---|
| Mg | 68.4 ppm | 65.5 ppm | 96% |
| TAN | 40.9 ppm | 36 ppm | 88% |
| OP | 90.1 ppm | 88.6 ppm | 98% |

The results in Table 5 are consistent with 88% of the material being struvite. Or, if it is recognized that ammonia losses may have occurred during oven drying, the results are consistent with a content of 96% struvite (based on Mg results in Table 5).

The dried, ground solid used in the first run was partitioned into various particle size fractions needed for the bed by using a W. S. TYLER Model RX-24 portable sieve shaker and sieve apparatus. The weight of each fraction used to make up the initial bed for the first run was 75% of the weight predicted for that fraction by the PLCB model for the first set of FCR conditions.

Seeds, to serve as nuclei for formation of new crystals to replace those removed from the bed as product, were taken from the #60 sieve to #70 sieve particle size fraction.

III. Operation of Laboratory-Scale Crystallizer

To meter the flows of each of the three liquids, the corresponding metering pump was calibrated by using a stopwatch and graduated cylinder to determine the volume pumped at several settings of the motor speed control dial. The calibration data were then used in setting the dials to achieve prescribed flow rates during operation of the crystallizer. The flow rates were checked periodically during operation and adjusted if necessary to keep the flow rates at the desired values. The flow rates of the ammonia water and Mg solution were checked by tracking the fall of the liquid levels in their containers against the passage of time. The flow rate of lagoon water was checked by measuring the outflow rate from the crystallizer overflow with graduated cylinder and stopwatch, after ensuring that the other two flow rates were correct.

The lagoon water in the tank was kept stirred by circulating it with a submersible centrifugal pump. The pump, which produced a flow of about 500 gal (2,000 L) per h, drew the liquid through the suction on its housing and discharged it through a four-foot (1.2 m) length of tubing approximately 0.5 in. (1.27 cm) in inner diameter. The pump was positioned on the floor of the tank off-center toward one end of the tank, and the discharge tube was positioned toward the other end of the tank and nearer the surface. This conformation aimed to provide maximum rotation and homogeneity of composition within the tank. The end of the suction hose through which the lagoon water metering pump withdrew liquid to feed the crystallizer was positioned near the recirculating pump. This positioning minimized differences between the composition of lagoon water samples, which were taken from the discharge hose of the submersible pump, and that of the liquid actually flowing through the metering pump to the crystallizer. Samples of untreated lagoon water were taken from the submersible pump discharge rather than from the metering pump discharge because withdrawing a sample from the latter would decrease the flow rate to the crystallizer and, as a result, allow the fluidized bed to drop.

Each run lasted 1.5 to 5 h. The duration of each FCR was generally limited by the length of a work day, with set-up and shut-down tasks, including preparation and submittal of samples, occupying about 4 to 6 h in addition to the run time itself. The runs therefore averaged about 3 to 4 h. Some runs were shorter as a result of running out of lagoon liquid, filling up the product collector, or experiencing some difficulty requiring shut-down to resolve. Each MVR lasted 3 h, the time required to complete the 18 segments corresponding with the 18 condition sets. Two or three runs were generally carried out before having to re-fill the lagoon water tank, except in the MVRs, when only one run was conducted with each tank. Before being re-filled, the tank was completely emptied, rinsed with tap water, and allowed to air dry.

The submersible pump was turned on an hour before each run began, and remained on through each run, to homogenize the lagoon liquid in the tank. A sample of the ammonia water was taken and submitted during this period. Also, just before runs using Mg solution, the pH of the solution was checked with the probe normally mounted at the funnel overflow.

To start the run, the clamp was opened on the lagoon water metering pump discharge hose and the pump turned on and adjusted to the desired rate. Before introducing the fluidized bed, the pH of the lagoon liquid passing through the funnel without any treatment was recorded. The solid granules to form the fluidized bed were placed in a beaker, covered with distilled water, and poured from the beaker into the top of the funnel with the aid of a stream of distilled water from a wash bottle. Once the granules sank into the funnel and fluidized, the ammonia water and Mg solution metering pumps were turned on and set to the desired flow rates. A stopwatch for timing the run was started at this point.

During each of the FCRs, the pH of the treated liquid at the funnel overflow and the height of the bed top above the funnel bottom were recorded at 30-min intervals. On runs with seeding, seeds were added at 30-min intervals, by covering the desired weight of seeds in a beaker with distilled water, then pouring them into the top of the funnel, where they settled into the bed. The desired weight of seeds was calculated by multiplying the average seeding rate desired (particles/time) by 30 min to obtain the number of particles required for each addition. Then, the number required was multiplied by the estimated weight per particle. The estimated weight per particle was calculated by multiplying the estimated volume per particle by the density of struvite (1.7 g/cc). The volume per particle was estimated as that occupied by a sphere with diameter equal to the average between the opening sizes of the two screens used to separate the seeds from the ground material.

During all the FCRs, a sample of untreated lagoon liquid was taken in the manner described above. Also, just before the end of each of these runs, five liquid samples were taken. One was taken from the discharge of the overflow hose. The other four were taken from four heights above the funnel boftom: 5 cm (near the bottom of the bed), 12 cm (near the middle of the bed), 19 cm (in the upper portion of the bed, except when the bed top lay below that height, in which case this position was just above the bed), and in the upper portion of the funnel near the outlet into the overflow. The four samples taken from within the funnel were obtained by dipping a 25-ml pipet into the funnel to the desired depth. The tip was covered with a 70-mesh wire screen cut from a shaker sieve to prevent particles from the bed from entering the pipet.

In each of the MVRs, the flow rates of lagoon liquid, Mg solution, and ammonia water were adjusted eighteen times during the run, spaced at 10-min intervals, to produce eighteen different combinations of operating conditions (two lagoon liquid flow rates, three Mg solution flow rates, and three ammonia water flow rates). After making each adjustment, pH and bed top height were recorded. Beginning 5 min (approximately four residence times) after each adjustment, four 50-ml sub-samples were taken at 1-min intervals from the discharge of the overflow hose. Each set of four sub-samples was combined into one blended sample corresponding with one set of operating conditions. Also, four sub-samples of untreated liquid were taken at evenly spaced points in time during the run, in the manner described above. These four sub-samples were combined to form a single blended sample of raw lagoon water corresponding with that run.

To end each run, after all sampling was complete, the pumps for the Mg solution and ammonia water were first turned off. Then, the plugging device was inserted through the bed and pushed into its seated position against the cone bottom as the lagoon water pump was turned off. All the tubes leading into the inlet manifold were closed, using the pinch clamp on each tube.

The product from each run, if any, was removed from the product collector by placing a sieve and glass pan under it, then removing the stopper in the bottom of the collector and washing the product out with distilled water from a wash bottle. The product was retained on the sieve, which was a number 70 sieve (0.21 mm openings) in the first two series FCRs, and a number 230 sieve (0.063 mm openings) for the other FCR series and for the MVRs. The liquid in the product collector drained through the sieve into the glass pan. The product on the sieve was transferred onto a non-stick baking sheet using a spatula and a stream of distilled water from a wash bottle. The product was spread out on the sheet and set out to air-dry at room temperature for at least 24 h.

At the end of each run, the bed was also removed from the crystallizer. To remove the bed, the plugging device was slowly removed and the bed and liquid in the crystallizer allowed to flow slowly down through the product collector and into the sieve and glass pan in the same manner described for the removal of the product. The wash bottle was used to remove any bed material clinging to the plugging device or the sides of the crystallizer, inlet manifold, or product collector. The equipment and method for receiving and drying the bed was the same as that described for the product, except that two baking sheets instead of one were required for spreading out the bed to dry.

Analytical Procedures Dried Bed and Product Evaluations

The dried bed and product from each run were evaluated by conducting a sieve analysis. For this analysis, the dried bed material or dried product was removed from the non-stick baking sheet by gently tapping the sheet and dislodging the dried material with a soft brush. The material was loaded into the top of a stack of TYLER sieves and shaken with the W. S. TYLER Model RX-24 portable sieve shaker for 10 min. The material on each sieve was removed by inverting the sieve and rubbing and tapping the sieve medium on both sides until smooth to the touch, and then the material was weighed on an analytical balance. The number of sieves used generally exceeded the capacity of the shaker, which only accommodates five sieves. Therefore, each analysis was performed in two phases, with the five coarsest sieves being used in the first phase. The fine material falling to the pan in the first phase was then loaded into the top of the stack of remaining finer sieves and loaded into the shaker for the second phase.

Before adopting the above drying and sieving procedure, it was tested, with the exception that the drying surface was a glass baking pan rather than a non-stick surface, to determine whether it changes the particle size distribution. For the test, the particle size distribution of a sample of dry struvite was determined using the sieve analysis procedure. The sample was then covered with water, stirred, left to stand overnight, removed from the water, and spread out in the glass pan to dry. The sieve analysis was performed again, and the results compared against those from the first analysis (see Table 6).

TABLE 6

Results of Sieve Analyses to Test for Particle Size Stability Through Wetting, Drying, and Sieving Again

| Sieve Fraction | Weight Before Wetting, Drying, and Sieving Again | Weight After | Loss |
| --- | --- | --- | --- |
| Larger than 2.000 mm | 12.0 grams | 11.5 grams | 0.5 grams |
| 1.680–2.000 mm | 3.6 grams | 2.8 grams | 0.82 grams |
| 1.000–1.680 mm | 18.0 grams | 18.8 grams | −0.8 grams |
| 0.500–1.000 mm | 20.0 grams | 19.9 grams | 0.1 grams |
| 0.250–0.500 mm | 20.0 grams | 19.9 grams | 0.1 grams |
| 0.125–0.250 mm | 20.0 grams | 18.4 grams | 1.6 grams |
| Smaller than 0.125 mm | 0.0 grams | 1.6 grams | −1.6 grams |
| Total | 93.6 grams | 92.9 grams | 0.7 grams |

The comparison indicated that the procedure changed the particle size distribution only slightly, with the greatest change occurring on the fine end of the spectrum. Based on observations during the procedure, this loss was judged likely to result from adherence of particles to the glass, with some of the particles remaining on the glass despite scraping and others being flung into the air or otherwise missing the receiving vessel during the scraping activity. New, non-stick drying sheets were therefore obtained. The solid slid easily off the non-stick sheets, nearly eliminating the need for scraping. Because the losses had only been slight even when the glass pan and appreciable scraping were used, the procedure using the non-stick sheets was considered adequate with no further testing.

Analysis of Liquid Samples

Before analyzing chemically, some of the liquid samples were split into two parts, and one of the parts then centrifuged to separate suspended solids from the clear, yellow liquid. The clear liquid was poured off, producing another liquid sample. The pellet remaining in the centrifuge vial was then reconstituted to the volume of liquid from which it came by shaking vigorously and adding sufficient distilled water, thus producing a third liquid sample. All of the samples of raw lagoon liquid, treated liquid, and Mg-supplementing solution were treated in this way. Ammonia water samples were not so treated because they contained no suspended phase.

Table 7 summarizes the types of samples taken and the chemical analyses conducted on them. OP analyses were conducted using EPA Test Method 365.1 (1979), with ascorbic acid method for automated analysis. TP analysis was by the same method, except that samples were subjected to persulfate digestion before automated analysis. TAN analysis was by EPA Test Method 351.2 (1979). For analysis of Mg, calcium (Ca), and the other metals, Standard Method 3111 B (1995) was used. Samples were subjected to nitric acid digestion, and introduced to a spectrometer by direct aspiration. Spectroscopy was of atomic absorption type except for copper, zinc, and iron analyses, which used emission spectroscopy.

Results in the FCRs and Discussion Overview of FCR Results and Implications for Future Design This overview summarizes the most important outcomes of the FCRs. Results for each FCR series are presented in more detail and discussed more thoroughly in the sections that follow. Three series of FCRs were conducted, each operating at the condition sets presented in Table 4. The FCRs aimed to find how differently the crystallizer would behave for different condition sets, given sufficient operating time to reflect both the fast and the slow changes.

TABLE 7

Summary of Samples and Analyses

| Liquid Sample Type | TP | OP | TAN | Mg | Ca | Other Metals |
|---|---|---|---|---|---|---|
| FCR Series #1 | | | | | | |
| Raw lagoon liquid (Uncentrifuged, centrifugate, and reconstituted pellet) | X | X | X | X | X | |
| Samples from crystallizer | X | X | X | X | X | |
| Treated liquid (Uncentrifuged, centrifugate, and reconstituted pellet) | X | X | X | X | X | |
| Ammonia water | | | X | | | |
| FCR Series #2 | | | | | | |
| Raw lagoon liquid (Uncentrifuged, centrifugate, and reconstituted pellet) | X | X | X | X | X | |
| Samples from crystallizer | X | X | X | | | |
| Treated liquid (Uncentrifuged, centrifugate, and reconstituted pellet) | X | X | X | X | X | |
| Ammonia water | | | X | | | |
| Mg solution (Uncentrifuged, centrifugate, and reconstituted pellet) | X | X | X | X | X | |
| FCR Series #3 | | | | | | |
| Raw lagoon liquid (Uncentrifuged, centrifugate, and reconstituted pellet) | X | X | X | | | |
| Samples from crystallizer | X | X | X | | | |
| Treated liquid (Uncentrifuged, centrifugate, and reconstituted pellet) | X | X | X | | | |
| Ammonia water | | | X | | | |
| MVR Series #1 (the only MVR series) | | | | | | |
| Raw lagoon liquid (Uncentrifuged, centrifugate, and reconstituted pellet) | X | X | X | X** | X** | X** |
| Samples from crystallizer | X | X | X | | | |
| Treated liquid, uncentrifuged | X | X | X | | | |
| Ammonia water | | | X | | | |
| Mg solution (Uncentrifuged, centrifugate, and reconstituted pellet) | X | X | X | X | X | |

*Sodium, potassium, copper, zinc, and iron.
**These analyses conducted only on the uncentrifuged samples of the first run.

The first series, operating at the previously selected condition set, which did not include Mg addition, moved initially toward an unacceptable steady state. Product did not discharge, leading to growth of bed particles so large and heavy that the bed fluidized improperly and grew so high that overflow of the bed was imminent. A configuration change at the crystallizer bottom then solved this difficulty, and the behavior converged on an acceptable near-steady state in the remainder of the first series. During this period, calculated TP reduction averaged near 27.5%, in the range expected. Careful inspection of the composition changes in the solid and liquid phases suggested that some of the reduction occurred from the solid phase. A balance on the number of particles indicated that spontaneous seeding (4 per s) amounted to no more than one quarter of the total seeding rate (22 per s). The bed developed a channel when it was heaviest and coarsest, but the degree of phosphorus reduction appeared not to be associated with the phenomenon. The bed appeared well mixed regardless of whether there was a channel. A line, demarcating the boundary between lagoon liquid below and water above, was observed moving upward through the bed at the beginning of the first run, when the feed to the main pump was switched over from tap water to lagoon liquid.

The second series of FCRs began with the second selected condition set, which included Mg addition. The series began with the called-for seed addition rate of 29 per s, but the rate was gradually reduced to zero during the first few runs in an attempt to achieve steady state when it became apparent that seeding was also occurring spontaneously. Even when seed addition was discontinued, the spontaneous seeding was high enough that the bed particles were too small to fall by gravity during normal operation, and the bed continued to grow. A balance on the number of particles through the series estimated that 41 seeds per second were being created spontaneously. Channeling developed in the first half of the series and continued to the series end, though the bed appeared well-mixed throughout the series. The bed growth eventually reached the point where it appeared bed particles would soon begin to overflow the crystallizer in the treated liquid stream, and the series was terminated. Total phosphorus reduction ranged from 30% to 65% through the series.

For the third series, the conditions set was the same as that in place at the end of the second series except that the product removal method was changed to periodic rapid removal between periods of normal operation to maintain a bed height of 27.5 cm. This height was chosen during the first run in the series by draining the bed down until it fluidized smoothly, in an apparently well-mixed state without a channel, and was maintained throughout the remainder of the series. An acceptable near steady-state was achieved by the middle of the series. Smooth operation continued until the final run in the series, when an accident led to loss of part of the bed. A particle number balance indicated spontaneous seeding of 52 per s. Total phosphorus reduction during the near-steady state period averaged 64%, in the range expected. Careful inspection of the composition changes in the solid and liquid phases suggested that some of the reduction occurred from the solid phase.

The ammonia addition rate, which was the same for all three FCR series (100 ppm TAN), was observed to raise the pH by 0.7 to 0.9 pH points. The raw lagoon liquid ranged in pH from 7.4 to 7.8.

From the results of the laboratory crystallizer apparatus there emerged several points to help guide future design and operation. First, the overall design concept appears sound, achieving phosphorus reductions in the range expected. Second, if product removal is to occur continuously by gravity during operation, the zone under the cone bottom must be wider than the cone bottom; otherwise, particles that are large enough to be released according to the cone design will not fall through adequately, leading to bed buildup. Third, the bed appears to be mixed, not classified, and the liquid approximates plug flow through the bed, at least when channeling is not occurring. Fourth, the heavier the bed and the larger its particles, the more likely a channel will develop. Fifth, when adding Mg, spontaneous seeding may occur, obviating the need for deliberate addition of seeds. Finally, there may be phosphorus removal mechanism at work in addition to precipitation of dissolved OP. This other mechanism may remove phosphorus from the suspended phase.

Detailed Results from for Series #1 Qualitative Observations

From the start of the series, the bed behavior was observed to vary according to the vertical position within the bed. The behavior can best be described by classifying the volume inside the cone into four vertically stacked zones.

The first zone, called the bottom zone for the present work, occupied the lowest one to two cm in the crystallizer cone. In it, clusters of bed particles swirled occasionally downward from the denser bed above, followed by clearing of the particles from the zone as they were swept upward by the current, and then almost instant re-appearance of clusters of particles swirling in again from above.

The second zone, called the middle zone here, stretched upward then for several cm and was occupied continuously by the bed particles. The particles were closely spaced throughout the zone yet free to swirl in rapid, random eddies.

The third zone, called the top zone, stretched upward several cm from the middle zone. In this zone, bed particles appeared densely packed against the wall of the cone, and were moving slowly downward (no more than 1 cm/s) at all positions around the circumference of the cone except where a rapidly upflowing channel pierced through part of the time. The channel was 1 to 2 cm wide, and carried less densely packed bed particles upward at a speed on the order of 10 cm/s. The channel shape evolved and over a period of several minutes could often be seen to change from straight to sinuous and vice versa. The position also changed slowly, and could be made to move from one side to another by very slightly altering the tilt of the cone. The upper boundary of the zone was marked by the bed top surface, which swayed and waved in approximately the same way as an interface between two non-miscible liquids of differing density. At the bed top, the channel terminated, and the bed particles carried up in it were observed to spread out rapidly from the top of the channel across the bed top.

The fourth zone, here called the headspace, lay above the bed. It stretched from the bed top up to the overflow from the crystallizer cone. Most of the time, few or no bed particles could be seen in it. However, occasionally some solid or solid-like aggregations that appeared softer and lighter than the rest of the bed particles could be seen to rise from the bed top through this zone.

During the first ten runs, only a few grains of product could be seen to exit the bed through the cone bottom from time to time. The zones in the cone were observed to change in ways consistent with product removal rate falling short of the rate of increase in bed mass. The bottom zone shrank, with the boundary between it and the middle zone progressing further toward the cone bottom with each successive run. The top boundary of the middle zone also moved downward; it was not clear whether the height of this zone changed. The top zone clearly expanded, with its bottom boundary sinking and its top boundary rising. The head space continued to shrink, i.e., the top of the bed rose until it appeared likely that continuing the series with no changes in operation would cause the bed top to reach the overflow. A channel developed soon after the series began and remained through the tenth run.

After the tenth run, a short experiment was conducted to determine how large bed particles must grow to be able to fall by gravity out of the bed and thus become product. Struvite samples of varying particle sizes were dropped into the crystallizer cone as lagoon water was pumped through it at the rate being used in the first series of runs. It was found that only particles passing through a #12 sieve, which has opening size of 1.68 mm, could pass through the cone bottom and completely through the nipple and cross at the bottom of the cone to fall into the product collector. Particles as small as those passing through a #20 sieve, which has opening size of 0.841 mm, could sink as far down as the cone bottom and into the top of the nipple. Even though the inner diameter of the nipple matched that at the cone bottom, these smaller particles did not pass through the nipple but instead were always swept upward from some point within the nipple and thus returned to the cone. To allow particles of this size to drop from the bed into the product collector, the nipple was removed, and the cross, which has a larger inner diameter, was adhered directly to the cone bottom with a silicone compound.

In the two runs following the alteration at the cone bottom, bed particles fell through the cone bottom and into the product collector so rapidly that each run had to be interrupted several times to empty the product from the collector. Though there remained a zone near the cone bottom that was sometimes swept clean of particles, some of the particles among the clusters that did occasionally swirl through this zone to the cone bottom did sink through the bottom and settled into the collector. This discharge of product was observed through the transparent collector walls to occur generally in short bursts a few seconds apart, with several particles in each burst. The bursts during the first and second runs after the alterations were frequent and at first nearly continuous. In the subsequent runs, the bursts occurred less frequently, settling to an average of several seconds apart, and the bursts were smaller.

The bed zones were observed after the alteration to change in directions generally opposite to those observed in the runs before the alteration. The bottom zone increased in height, and the boundary of the middle zone moved higher, also. The bed top (boundary between the third and fourth zones) moved lower. The change continued in this manner until the state of the zones approximated their state at the beginning of the series. Then the boundary between the middle and top zones rose as the middle zone grew and the top zone shrank. During the twelfth run, the channel in the top zone disappeared. By the thirteenth run, the zone heights, positions, and appearances were stable.

Regarding the liquid motion, of particular interest was whether the liquid moved in a plug flow manner through the main chamber or more resembled a well-mixed liquid. During normal operation, it was not possible to see any liquid motion because all the liquid was nearly the same color and opacity. However, before the first run, the crystallizer was run briefly with tap water in place of lagoon water to ensure that the system was set up properly. Once all appeared in order, the main pump intake was switched quickly from the vessel containing tap water to the lagoon liquid tank. At the moment the lagoon liquid reached the main chamber, there appeared a line marking the boundary between the two liquids. The line moved up through the bed as the lagoon liquid replaced the water that had previously fluidized the bed. The line became somewhat less sharp as it moved upward, but clearly maintained its visibility until it reached the bed top. Once at the bed top, the line diffused more rapidly, and the liquid space above the bed appeared to darken almost everywhere at the same rate. It should be noted that there was no channel visible at the time these observations were made.

The above observations of the bed behavior, motion, and product discharge in this series are addressed further, primarily in the discussion section following the presentation of quantitative results from the series. Linkages between the observations and the quantitative results are developed. There were a few additional qualitative observations of note from the first series of FCRs. These observations are mentioned because they suggest how a larger, on-site system may behave. No differences in clarity, color, or odor could be observed between the raw lagoon liquid and the treated liquid during any of the first series of runs. A small amount of fouling occurred in the intake manifold (the cross at the cone bottom) and on the inside walls of the lowest one third of the cone. The fouling first became visible as a light transparent film after the second run, and by the tenth had built to a white coating. The coating was cleaned off with a dilute HCl solution mainly to preserve good visibility into the cone. The cleaning made no apparent difference in the nature of the liquid flow, bed movements, or product discharge. At the end of each run, the bed drained easily, and could be easily flushed out through the cone bottom and product collector with a jet of distilled water from a wash bottle. The bed spread easily on drying pans. Seed material, if dropped dry upon the liquid surface in the cone, would not wet quickly enough to sink below the surface before some of it was swept out the overflow. For this reason, seed material was first mixed with distilled water and then poured into the cone. In returning the bed, after being dried and evaluated, to the cone at the beginning of each run, it was also washed with distilled water into the upflowing lagoon liquid in the cone in a manner similar to that used for pouring the seeds in.

Bed Weight, Particle Size Distribution, and Height

Figure 12:
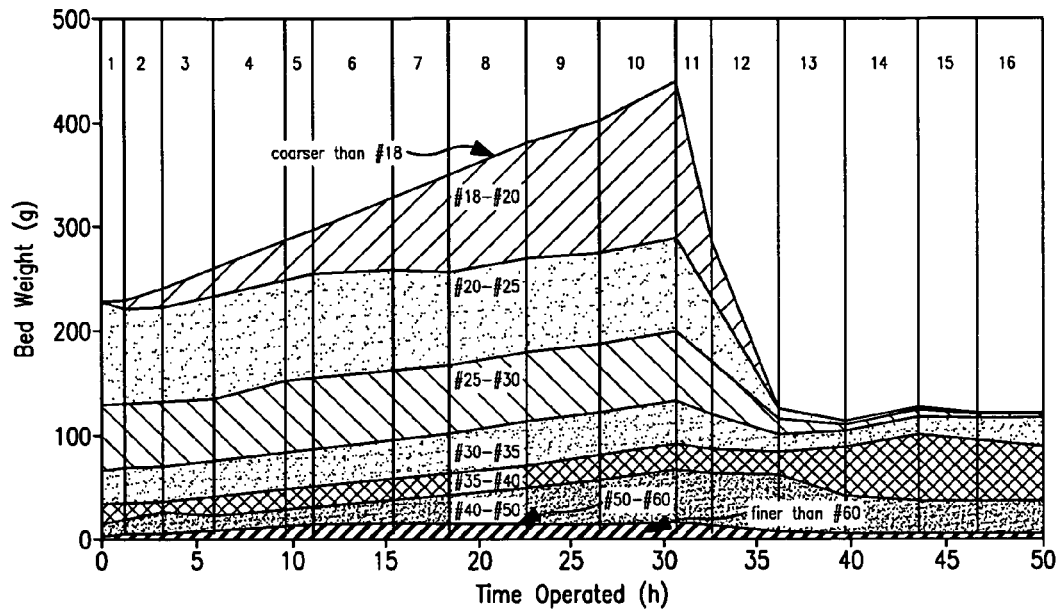
FIG. 12 is a chart for a first series of FCRs showing bed weight broken down by particle size versus time operated.
Figure 13:
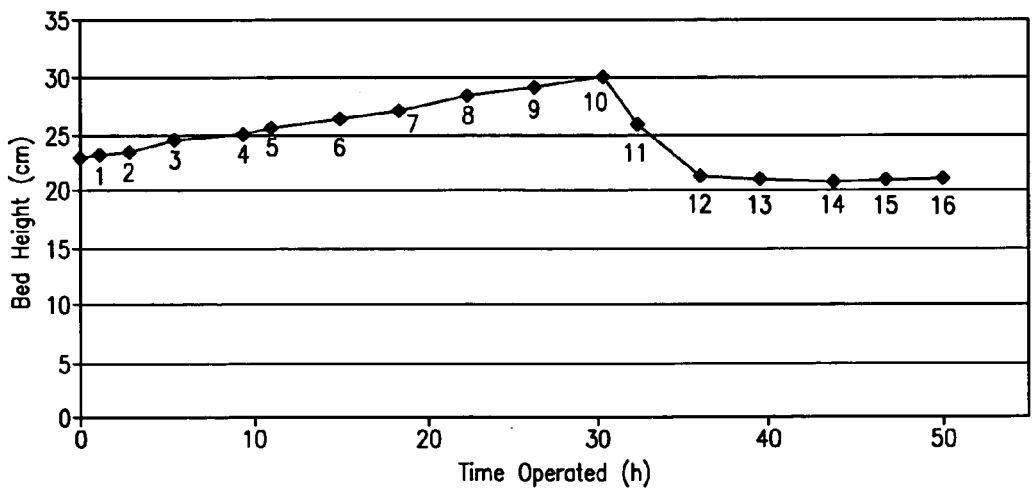
FIG. 13 is a chart for a first series of FCRs showing bed height at end of run verses operating time.

FIG. 12 shows the total weight and particle size distribution of the dry bed at the beginning of the series and after each run in the series. The figure reveals the buildup in bed mass during the runs preceding the alteration made at the cone bottom, rapid decrease following the alteration, and a subsequent leveling off to fluctuate within a narrow range. An increasing preponderance of larger particles (coarser than #18) can be seen as the bed weight increased, and the reverse as the bed weight decreased. FIG. 13, the height of the bed during each run in the series, shows a similar trend as the bed weight though not as pronounced.

Product Weight and Particle Size Distribution

Figure 14:
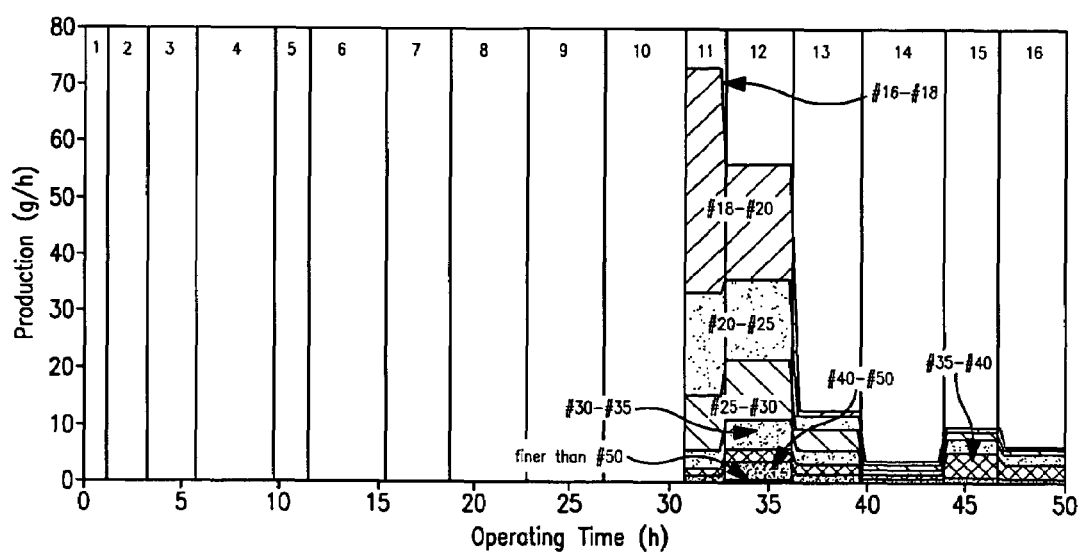
FIG. 14 is a chart for a first series of FCRs showing production averaged over each run broken down by particle size.

FIG. 14 shows the total weight, on an hourly basis, and particle size distribution of the product from each run in the series. The weights shown were calculated by weighing the product and particle size fractions from each run, then dividing the weights by the number of hours in the run. Little or no product was released by the crystallizer on any run until the eleventh run, which immediately followed the alterations at the cone bottom. From that point, product release was rapid at first, then slowed to a rate that fluctuated around 7 g/h. As the product release rate decreased and leveled off, the particle size distribution first rapidly decreased in its content of the largest particles (coarser than #25), then leveled off.

Phosphorus Reduction

Because phosphorus exists in lagoon water both dissolved in the liquid phase and as part of the suspended solid phase, and because it exists both in orthophosphate and in non-orthophosphate forms, the phosphorus reduction fraction can be calculated in several different ways. In the present work, it was decided to calculate it in two ways. First, because the overall goal is removal of as much phosphorus as possible, a calculation of TP reduction was made:

$$TP \text{ reduction} = 1 - \left( \frac{TP \text{ in treated lagoon water}}{TP \text{ in raw lagoon water}} \right) \quad (3)$$

Second, because it is only the OP dissolved in the liquid phase that is hypothesized to be removable by struvite crystallization, a calculation of OP removal from the liquid phase was made:

$$\text{Dissolved } OP \text{ reduction} = 1 - \left( \frac{OP \text{ in centrate of treated lagoon water}}{OP \text{ in centrate of raw lagoon water}} \right) \quad (4)$$

Figure 15:
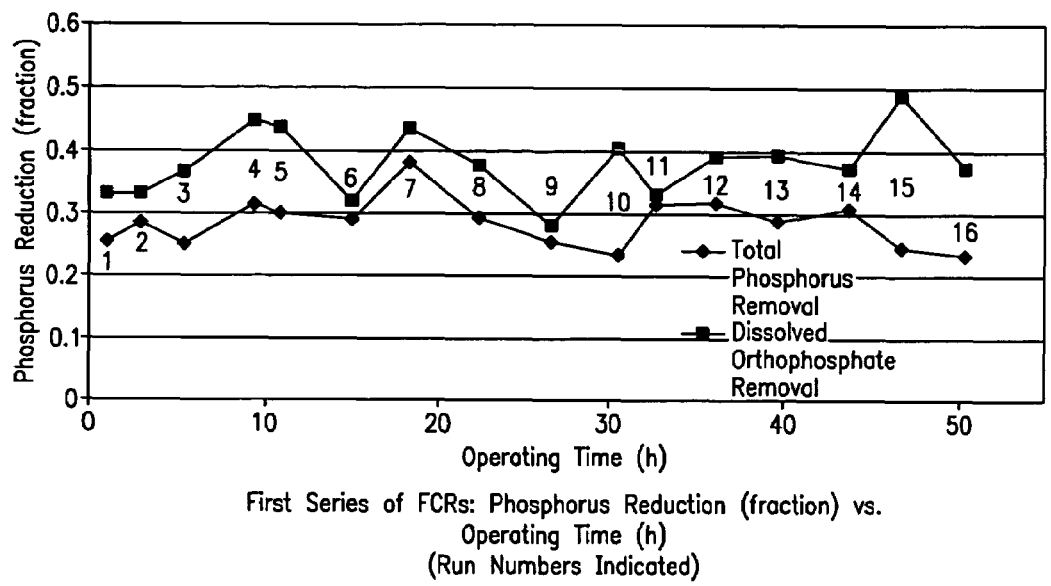
FIG. 15 is a chart for a first series of FCRs showing phosphorus reduction versus operating time.

FIG. 15 shows phosphorus reduction, calculated in both ways, versus elapsed running time during the first series. Each of the two calculations was made once for each run, using the TP and OP results from analysis of the samples from the raw liquid tank and the treated discharge from the overflow.

The fraction of TP reduction varied from 0.23 to 0.38, while the fraction of dissolved OP reduction varied from 0.28 to 0.49. No clear trends appear. Visual inspection reveals no obvious correlation of reduction with bed weight or particle size. Furthermore, the two reduction fractions show no obvious correlation with each other.

Variation of Phosphorus Concentration with Height in Cone

Figure 16:
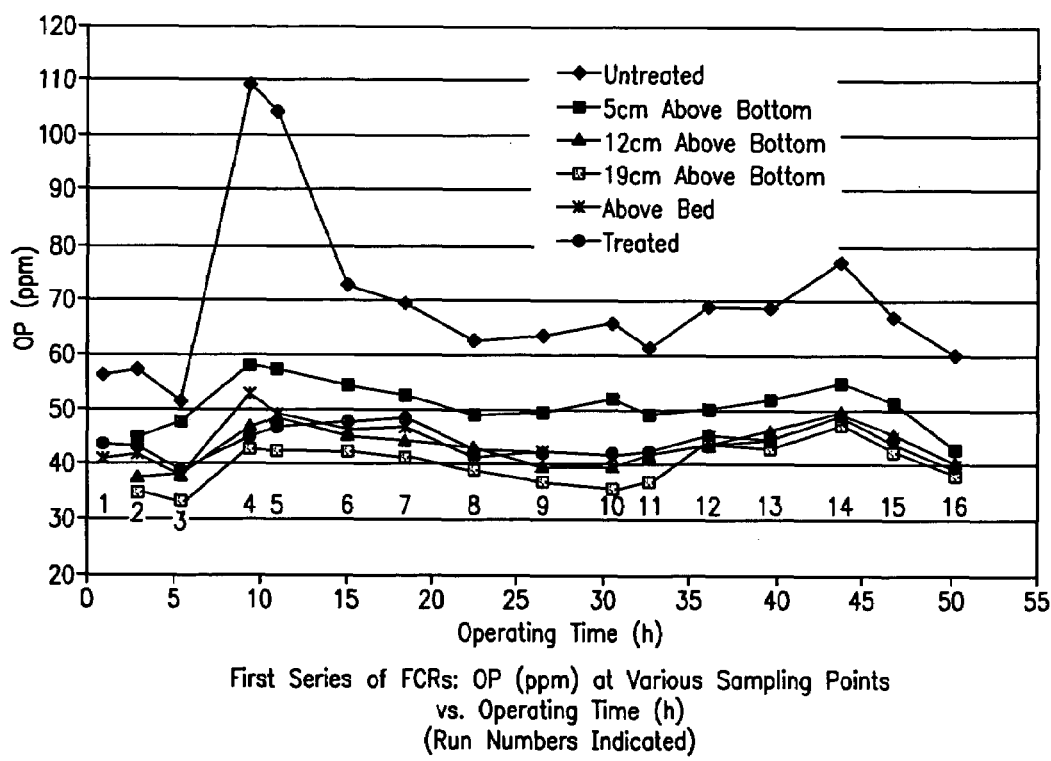
FIG. 16 is a chart for a first series of FCRs showing OP at various sampling points versus operating time.

FIG. 16 shows the OP concentration from the four sampling points in the cone, in the untreated liquid, and in the treated liquid for series one. The untreated liquid sample was taken from the raw liquid storage tank. The treated liquid sample was taken from the outlet of the overflow hose. The concentrations are plotted against operating time. The apparatus for drawing samples from within the bed failed during the first run, and thus those three data points are missing.

The figure shows a pattern in most of the runs. In the pattern, most of the OP reduction has already occurred by the time the upflowing liquid reaches the sampling point 5 cm up into the cone. The OP concentration is reduced again, but not as much, by the time the liquid reaches the next sampling point (12 cm above cone bottom). At the 19-cm point, an additional, but even smaller, reduction has occurred. However, the concentration trend reverses itself, and rebounds a few ppm in the liquid collected above the bed and in the treated liquid flowing from the cone top. The latter two values are roughly the same. Overlying the pattern is a trend in the latter part of the series. The trend is for the rebound to diminish. The rebound, averaging 5 to 10 ppm in the early runs, has decreased to 1-2 ppm by the end of the series.

Discussion of Results in FCR Series #1

A material balance on phosphorus about the crystallizer serves to check the results and to help interpret them. A balance was conducted for the entire series and for the four consecutive runs at the end of the series. The bed weight and particle size distribution remained nearly constant during these four runs and hence crystallizer operation during the period is considered to be near-steady state.

Phosphorus inputs occurred in the lagoon water inflow and the seeding. Multiplying the duration of a run by the liquid flow rate and multiplying the result by the TP concentration of the raw lagoon liquid for that run yields an estimate for the phosphorus input in the lagoon liquid during that run. Adding the estimates for all sixteen runs gives an estimate, 224 g, for the total phosphorus input in the lagoon liquid for the run. Multiplying the weight of seed material used during the run by its phosphorus content (12.5%) as determined by chemical analysis of the material yields an estimate, 7.8 g, for the phosphorus input in the form of seed material.

Phosphorus outputs occurred in the treated liquid outflow and in the solid product removed. Multiplying the duration of a run by the liquid flow rate and multiplying the result by the TP concentration of the treated liquid for that run yields an estimate for the phosphorus output in the treated liquid during that run. Adding the estimates for all sixteen runs gives an estimate, 145 g, for the total phosphorus output in the treated liquid for the series. The phosphorus output in the form of dry product (86.7 g) is estimated by multiplying the total product during the series (473 g) by its phosphorus content, estimated at 18.3% through analysis of bed material at the end of the series. The higher content in the product may result from a second removal mechanism, discussed hereinafter.

The net accumulation of phosphorus in the crystallizer, −6.4 g, was estimated by multiplying the beginning bed weight (229 g) by its estimated phosphorus content and subtracting the product from the product of the ending bed weight (121 g) and its estimated phosphorus content. The phosphorus content of the beginning bed was estimated at 12.5% because it was composed of the same material from which the seeds were made. The ending phosphorus content was estimated at 18.3% from the same analysis used for estimating the product phosphorus content.

For the entire first series, then, the total estimated phosphorus input, which is the sum of that occurring in the seeds and in the lagoon liquid input, is 232 g. Of this, 226 g, or 97.3%, can be accounted for in the sum of that occurring as liquid and solid product output and as net accumulation. The unaccounted for phosphorus may have been lost in dust or small spills during bed removal, drying, sieving, and reloading into the crystallizer. Even if there were zero losses, a material balance could easily show this magnitude of unaccounted for differences due to the margin of error in the phosphorus sampling and analyses. Note that, for samples drawn from the same mixed tank of liquid on subsequent days, analyses commonly indicated differences of 5% or more.

A material balance on TP conducted over the runs in which the crystallizer operated at steady state or near steady-state (runs 13, 14, 15, and 16) shows inputs of 54.5 g TP in raw liquid and 2.3 g in seeds. Outputs were 20.9 g TP in product and 39.5 g in treated liquid, while net accumulation was −1.4 g. Inputs are 105.2% accounted for. That this error is larger than that resulting from the balance on the entire series is not surprising: random error, on a percentage basis, will decrease as the number of runs included in the total increases. That the error is in the opposite direction strengthens a hypothesis that the material balance gaps result from random experimental error rather than material losses. If losses were occurring, then the question would arise as to whether the true phosphorus reductions were not as great as those seen in the results. With random error, the phosphorus reduction result for an individual run may be several percent off the true reduction, but averaged over several runs the result should approach the true reduction.

An average rate of reduction in TP can be calculated from the material balance estimates on the near-steady state portion. The rate is calculated by subtracting the amount of phosphorus in the treated liquid from the total amount input as liquid and dividing the difference by the latter. This calculation yields a result of 27.5% average reduction in TP, which is in the range expected if the reduction mechanism is precipitation of struvite from dissolved OP. This mechanism cannot remove phosphorus once the supply of Mg ions available for precipitating the OP has been exhausted. Given the relative concentrations of the two species in raw lagoon liquid, the expected TP reduction would be in the range of 20% to 30% if the precipitation proceeds to near equilibrium.

The failure of the crystallizer to discharge product and resulting bed buildup in the beginning of the series, followed by fast product discharge immediately after the change in the bottom configuration clearly evidences the effect that the configuration has. It should be noted that the change in configuration did not change the minimum diameter (and hence maximum upflow velocity) through which the settling product had to pass. Rather, the change reduced the distance through which the product had to settle through that velocity and diameter. This observation suggests that a passage through which falling product must settle in opposition to upflowing current should be larger in diameter than the minimum diameter at the bottom of the cone.

The disappearance of the channel when the bed became lighter and finer suggests the channeling behavior is related to the bed characteristic. The rebound in phosphorus concentration between the upper portion of the bed and the overflowing treated liquid occurred most markedly on the runs in which the channel was observed, suggesting a connection. A possible explanation is that the liquid flowing in the channel flows faster and therefore has less time to react and experiences less reduction in phosphorus. In the surrounding, non-channeling areas, liquid flows more slowly upward and therefore undergoes greater reduction. The fast- and slow-moving liquid mix together over the bed, and therefore the reduction seen there and in the treated liquid would be intermediate between that exiting the bed in the slow stream and that in the fast stream. The sample points for the liquid from the bed, however, were away from the walls and thus probably away from the channel, also. Therefore the samples from the bed would reflect only the concentrations in the slowly-upflowing areas. Therefore, the appearance of a rebound pattern would coincide with the channeling behavior.

One might guess the channel would reduce the overall reduction achieved because it partially "short-circuits" the reaction zone. However, no tendency for greater reduction during the non-channeling periods can be seen in the results. Perhaps, if the channel does lead to poorer reduction, the difference is small and thus lost in the run-to-run variations. It could also be that the greater reduction in the slower-upflowing portion compensates for the poorer reduction in the channel, resulting in no change in overall reduction between channeling and non-channeling behavior.

The observed movement of the bed suggests that it is highly mixed rather than classified. The observation that fine and coarse particles can both be seen at all points in the bed, as well as in the product, strengthens the suggestion. However, the fact that the product was richer in coarse particles than the bed, and that occasionally the bed looked richer in fines at the top than at the bottom, argues that the mixing was probably not complete.

The overall tendency for the phosphorus concentrations to drop with height in the bed suggests that the character of the liquid flow in the bed more resembles plug flow than highly mixed flow. In addition, plug flow is consistent with the observance of the line between colorless and dark liquid moving up the cone when the feed was switched from water to lagoon liquid at the start of the series. The character of liquid flow, bed movement, and concentration profiles are discussed more fully in the section comparing results with predictions of the three conceptual models.

Comparing the number of seeds added with the number of particles removed as product at near-steady state should indicate the net rate of creation of crystallization nuclei in the crystallizer. Nuclei may be created by sloughing off larger particles, by spontaneously crystallizing from supersaturated solution, or by capture by the crystallizer of particles suspended in the entering lagoon water. Nuclei may be lost by suspension in the treated liquid flowing out through the overflow, by dissolution into the liquid, or by agglomeration with other particles. The difference between the number created and the number lost is the net creation.

The average rate of adding seeds to the crystallizer during the four runs constituting the near steady-state period was estimated at 18 per second by multiplying the weight-rate of seed addition by the estimated number of seeds per g of seeds, following the technique described under "Operating Procedures." The number of seeds per g was estimated by assuming the particles were spheres of density 1.7 g/cm (the density of struvite) with diameters at the average of the opening sizes of the two sieves (#60 and #70) used to separate the seed material from the crushed bulk material. The average rate of particle removal from the crystallizer was estimated at 22.4 per s by dividing the weight of each fraction removed during the four runs by the estimated number of particles per g for that fraction, and dividing the result by the total duration of the four runs. The estimated number of particles per g for each fraction was calculated in the same way as that used for the seeds.

The number balance on particles should be regarded as a rough approximation because of the assumptions required in the calculations. Nevertheless, the balance suggests that the net rate of creation of nuclei is somewhat small compared with the seeding rate. In other words, nuclei for most of the particles, at least, discharged as product can be accounted for by the particles in the seed material that was added. The uncertainty in the calculation prohibits a firm conclusion that there was net creation of nuclei other than the seeding, but if taken at face value the numbers suggest that about one additional nucleus is being generated in the crystallizer for every four added as seed. It impossible from this analysis to say which processes might be involved in any net creation.

Comparing the Mg, TAN, OP, and TP concentrations in the treated water with those expected at equilibrium after struvite precipitation helps in understanding how complete the reaction is in the crystallizer. The comparison also provides evidence as to whether the proposed reaction is in fact the means by which phosphorus has been reduced. Table 8 shows the concentrations in the raw and treated liquid for each of the runs in the near-steady state portion of the series.

The concentration of TAN in the centrifugate of the raw liquid includes the amount added for pH enhancement. The numbers shown for each "sediment" fraction result from analyses on a suspension prepared by briskly shaking the sediment into enough distilled water to prepare a total suspension volume equal to the volume of liquid from which the sediment was centrifuged. Thus, the figures shown for any species can be interpreted as the parts of that species, suspended, per million parts of the original, uncentrifuged liquid. This technique allows adding the centrifugate ppm to the sediment ppm for a given species to estimate the total ppm of that species in the uncentrifuged liquid.

TABLE 8

Concentrations for Near-Steady State Portion of First FCR Series: Raw Liquid, Treated Liquid, and Expected in Treated Liquid at Equilibrium

| Material Sampled | Sample fraction | Species | Average ppm | Average ppm expected | Divergence from expected (ppm) |
|---|---|---|---|---|---|
| Raw Liquid | Centrifugate | OP | 54.8 | | |
| | | TP | 55.9 | | |
| | | TAN | 602 | | |
| | | Mg | 24.6 | | |
| | Sediment, reconstituted to original vol. | OP | 15.2 | | |
| | | TP | 27.0 | | |
| | | TAN | 67.3 | | |
| | | Mg | 9.6 | | |
| Treated Liquid | Centrifugate | OP | 34.4 | 28.5 | +5.9 |
| | | TP | 41.9 | 29.6 | +12.3 |
| | | TAN | 593 | 595 | +2 |
| | | Mg | 12.8 | 3.9 | +8.9 |
| | Sediment, reconstituted to original vol. | OP | 10.5 | 15.2 | −4.7 |
| | | TP | 21.2 | 27.0 | −5.8 |
| | | TAN | 60.6 | 67.3 | −6.7 |
| | | Mg | 5.1 | 9.6 | −4.5 |

The expected values at equilibrium for the centrifugate were produced by subtracting an equal amount, in moles per liter, from the OP, Mg, and TAN from the concentrations of those species in the centrifugate from the raw liquid. The amount subtracted was that amount needed to reduce the concentrations to the point where their product would just equal the conditional solubility product at the average pH of the crystallizer for the runs (8.32). It was assumed that non-orthophosphate phosphorus would not participate in the reaction, therefore the expected TP at equilibrium was calculated by adding the difference between the OP and the TP in the raw liquid to the expected OP at equilibrium; i.e, the non-orthophosphate phosphorus was held constant. The concentrations of all species in the sediment were held constant because it was assumed that the suspended solid would not participate in the reaction.

The table shows that all the concentrations moved more than half-way toward levels that would be expected at struvite equilibrium. OP, TP, TAN, and Mg dropped, respectively, 78%, 53%, 78%, and 57% of the way toward their expected values. These concentration drops are consistent with the precipitation of struvite from the liquid phase occurring but not proceeding completely to equilibrium.

The table also shows that the concentrations of the species in the sediment have all decreased by several ppm. This unexpected result suggests that another mechanism is at least partly responsible for the phosphorus reduction achieved by the crystallizer. Perhaps the decrease results from trapping of some of the suspended particles in the bed by gravity or by agglomeration with particles already the bed. (Trapping by either mechanism would reduce the amount of phosphorus suspended in the treated liquid and increase the amount of phosphorus in the bed and in the solid product.) Another possible explanation is that those species dissolve into the liquid from the suspended particles, thus liberating Mg and phosphorus to precipitate as struvite. Evidence supporting the latter theory is that the total drop in phosphorus in both phases (19.8 ppm) is equal to 1.21 times the total drop in Mg (16.3 ppm) in both phases, quite close to the 1.28 phosphorus-to-Mg weight ratio in struvite. The total TAN drop in both phases is 0.96 that of Mg, which substantially exceeds the 0.58 nitrogen-to-Mg ratio in struvite. However, one must take care in drawing conclusions from changes in nitrogen because expected drops are small in comparison with the total amount of TAN present, with the result that normal experimental error in sampling and analysis approaches the magnitude of the changes in concentration. In addition, nitrogen can escape to the air, though at pH values below 9.2 the ammonia is primarily in non-volatile form and evaporation is therefore slow.

Detailed Results from FCR Series #2 Qualitative Observations

From the first through the seventh run in the series, the bed grew in height, with little discharge of product. The boundary between the bottom zone and middle zone sank and by the seventh run, the bottom zone disappeared. The middle zone moved lower in the cone as both its upper and lower boundaries sank. The top zone grew larger as its lower border sank and upper border rose, and a channel was observed in it from the third run on. By the fourth run, it was noticed that the bed was becoming increasingly fine and dusty after drying. The material also began to adhere lightly to the drying pans, and it became necessary to push the dried material with the brush to move it off the drying pans and into the sieve analysis apparatus. Reasoning that spontaneous seeding was occurring, the seeding rate was reduced and then terminated. However, the amount of fines and dustiness continued to increase even after seeding was terminated. Reinforcing the suspicion of spontaneous seeding was the observation of grayish particles in the glass tube admitting the lagoon water and Mg solution. The particles ranged in size from barely visible to that of fine sand particles. Some of the particles were collected and analyzed and found to consist of Mg, TAN, and OP in nearly the same amounts as would pure struvite.

Between the seventh and eighth runs, the glass tube admitting the lagoon water and Mg solution into the inlet manifold was observed to have slipped about 0.5 in. farther into the manifold than originally positioned, possibly interfering with the release of product from the cone through the manifold to the collector. The tube was pulled back to the original position and, on the eighth through twelfth runs the bed shrank and product was released while the zone boundary trends were approximately the reverse of those noted on the earlier runs. However, the channel did not disappear and the rate of product release and bed shrinkage slowed until, by the twelfth run, little product was being released and the bed stopped shrinking. On the tenth and eleventh runs, the top surface of the bed split into two surfaces. The upper surface lay between the particle-free headspace and the bed. Below it lay a zone of very fine and less dense bed. At the bottom of this zone lay the lower of the two surfaces, and below this lower surface lay the rest of the top zone with its usual appearance. The vertical distance between the two surfaces increased to about 1.5. centimeters by the end of the twelfth run. The bed continued to increase in dustiness after drying.

From the thirteenth through sixteenth runs, the bed grew again and discharged little product. The bed top split that developed in the eleventh run disappeared during the thirteenth run. The zone boundary trends reverted to those observed in the first seven runs, and channeling continued. Dried product continued to increase in dustiness. The series was terminated when the bed top rose high enough that it appeared likely bed particles would begin to overflow the crystallizer with the treated liquid stream.

As in the first series, no color or clarity difference between the raw and treated lagoon liquid could be detected. However, the color of the lagoon liquid used for making up the dilute Mg solution shifted toward dark pink after the concentrated Mg solution was stirred into it.

Bed Weight, Particle Size Distribution, and Height

Figure 17:
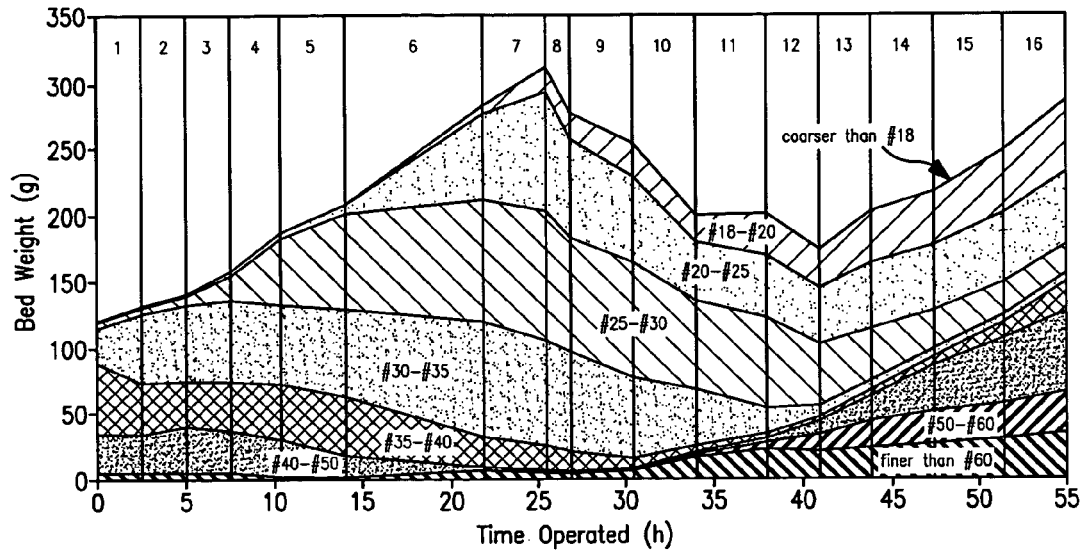
FIG. 17 is a chart for a second series of FCRs showing bed weight broken down by particle size versus time operated.

FIG. 17 shows the total weight and particle size distribution of the dry bed at the beginning of the series and after each run in the series. The increase in total bed weight to the end of the seventh run, when the correction in the input manifold was made (around 25 h), can clearly be seen, as can the subsequent decrease until the end of the twelfth run (about 40 h) and re-growth thereafter.

The trends in particle size distribution do not directly parallel the bed weight trends. Consistent with the observation that dried bed dustiness increased from the fourth run on, the figure shows the increase in the amount of the finest particle size fraction (smaller than #60 mesh) from the fourth run on. The next finest fractions, from #60 to #35, show a decrease early in the series, followed by an increase in the later runs. The intermediate-sized fractions, from #35 to #25, first increase, then decrease. The rather coarse fractions of #25 to #18 increase then seem to hold rather steady, while the coarsest fraction (larger than #18 sieve) gradually increases but remains low.

Figure 18:
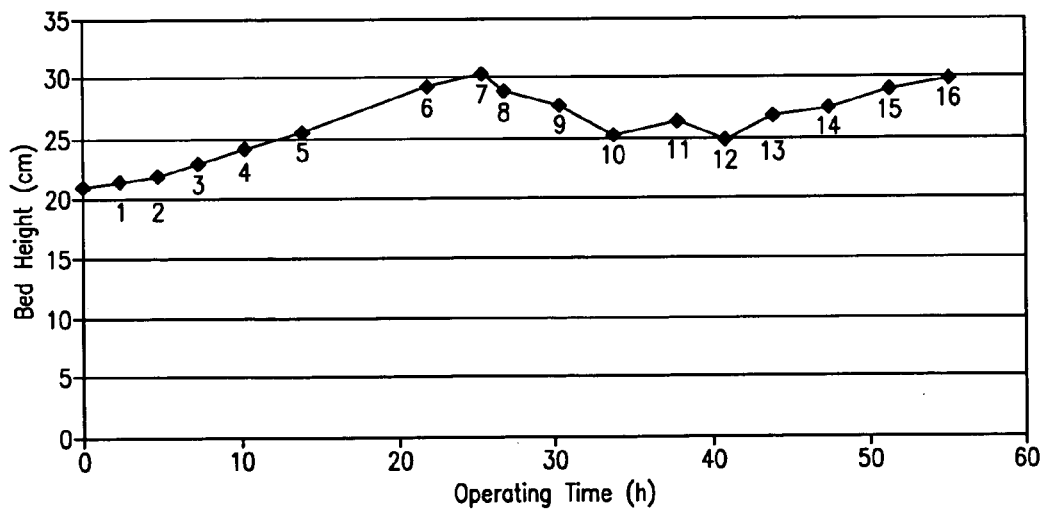
FIG. 18 is a chart for a second series of FCRs showing bed height at end of run versus operating time.

FIG. 18, the height of the bed during each run in the series, shows a similar trend as the bed weight, peaking at around 25 h of operating time, falling to a minimum around 40 h, then again rising for the remainder of the series.

Product Weight and Particle Size Distribution

Figure 19:
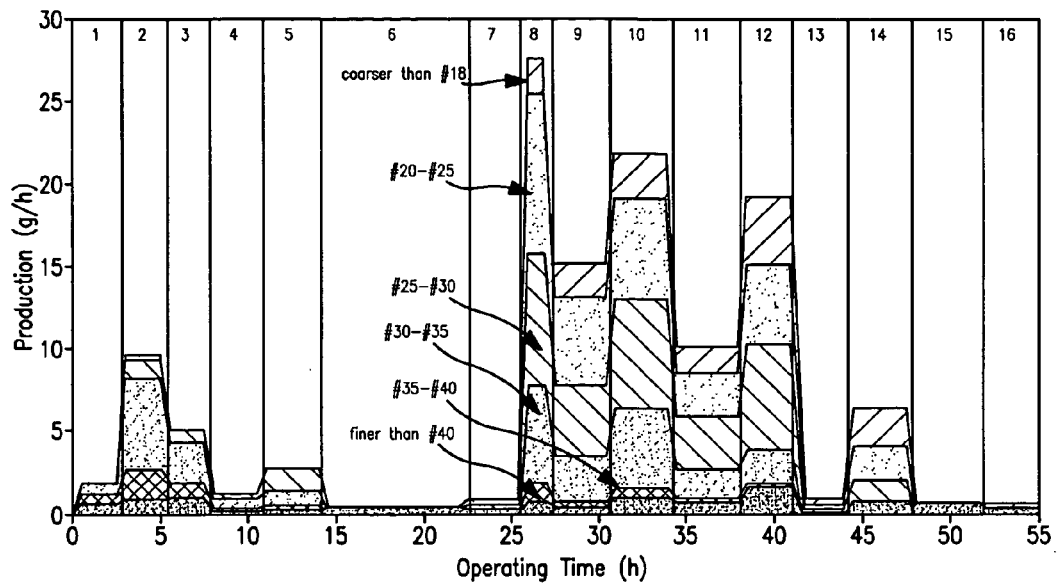
FIG. 19 is a chart for a second series of FCRs showing production averaged over each run broken down by particle size.

FIG. 19 shows production, averaged over each run and broken down by particle size, for the second series. Production remained low up through 25 h of operating time, with only one run during this time averaging greater than 5 g/h, and most averaging much less. Production leapt to an average of more than 27 g/h for the first run following the correction of the inlet manifold configuration, and thereafter fluctuated from run to run but trended quickly down, reaching near zero by 48 h. A trend toward coarser product can be seen in the figure, also. Little of the product was coarser than #25 sieve before 25 h operating time. The proportion rose to around half for runs between 25 and 40 h, and then to greater than half after 40 h. This trend runs counter to the observation that the bed grew finer in appearance throughout the run, but comports with the trend of increasing weight of particles coarser than #25 sieve in the bed.

Phosphorus Reduction

Figure 20:
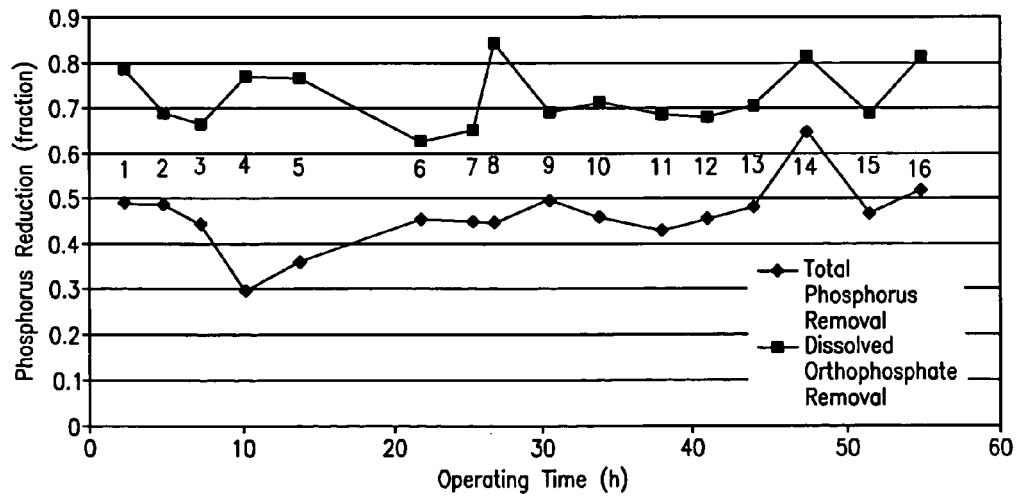
FIG. 20 is a chart for a second series of FCRs showing phosphorus reduction versus operating time.

FIG. 20 shows reduction in phosphorus during the second series. Reductions were greater in this series than in the first.

TP reduction ranged from 0.30 to 0.65, and dissolved OP reduction ranged from 0.62 to 0.84. No trends or correlations are apparent from visual inspection of the figure.

Variation of Phosphorus Concentration with Height in Bed

Figure 21:
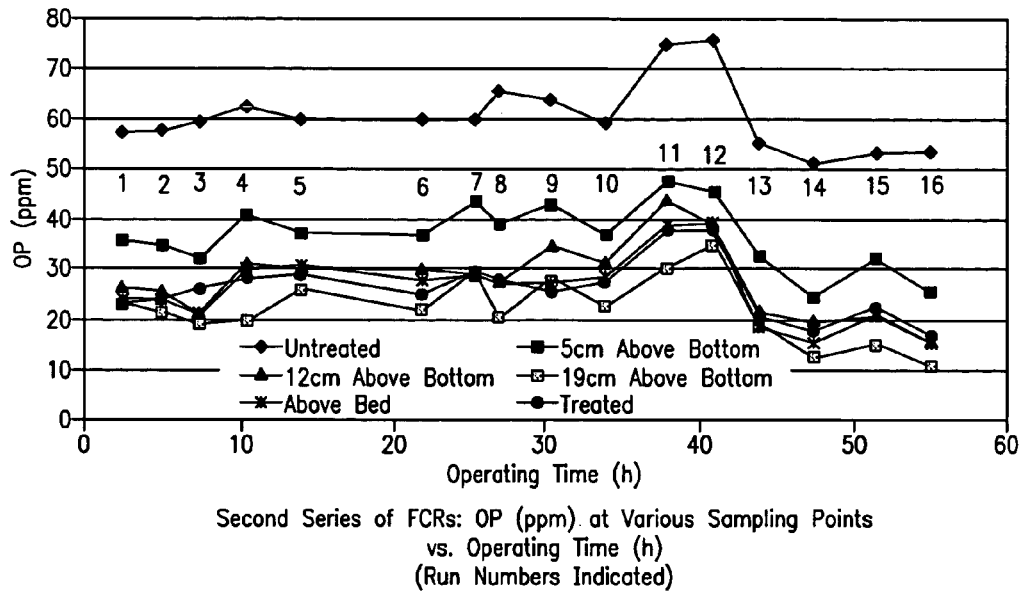
FIG. 21 is a chart for a second series of FCRs showing OP at various sampling points versus operating time.

FIG. 21 reveals that the profile of dissolved OP concentration with respect to position in the cone assumed a similar pattern for most of the runs in the second series as that observed in the first series. The degree of rebound in concentration between the liquid sampled at a height of 19 cm and the treated liquid overflowing the cone top was very little at the beginning of the series. The rebound quickly increased to the 5 to 10 ppm typical of the early part of the first series and stayed in that range for the remainder of the second series except for three scattered points.

Discussion of Results from FCR Series #2

A material balance conducted on phosphorus over the second series must reflect, in addition to the items explained in the discussion of the first series results, the effects of adding the Mg solution. To take these into account, the TP concentration in the Mg solution, multiplied by its inflow rate (1.9 L/h) and the run duration, must be added as an input. Also, the flow rate of treated liquor must be increased by 1.9 L/h as a result of the additional inflow. The balance shows inputs of 192 g in raw liquid, 12.7 g in the Mg solution, and 2.3 g in seeds. Outputs were 69.5 g in product and 107 g in treated liquid, while net accumulation was +30.0 g. Inputs are 99.9% accounted for, a very close match given the random experimental error in sampling and analysis, further lending credence to the calculated phosphorus reductions. No period of near-steady state operation was achieved during the second series, so there was no material balance conducted for a shorter series of runs within the second series.

There are at least three explanations for the bed build-up and resulting failure to achieve steady state during this series. First, the slippage of the glass input tube into the manifold, partly obstructing product discharge into the collector, appears to have contributed to the bed build-up. The fact that product discharge increased dramatically, with the accompanying drop in bed weight, immediately after the inlet tube was moved back to the correct position argues powerfully that the problem contributed to bed growth. However, the slippage cannot explain all the bed growth, because the growth resumed and product discharge trailed off again, within five runs after the problem was corrected. The manifold was checked frequently after correcting the slippage to ensure that the problem had not recurred.

Second, the higher rate of seeding could contribute to bed growth. The series was begun with a seeding rate about 2.1 times greater than that used in the first series, to accommodate the higher rate of precipitation expected in the second series due to the addition of Mg. The seeds themselves would add weight to the bed, and the greater number of seeds could also reduce the average particle size in the bed because the precipitating solid would be distributed across a greater number of particles. However, the weight of the seeds added during the series was small in comparison with the 160 g of bed weight increase during the series. Moreover, the bed weight increase continued through the first half of the series and reappeared during the last four runs, but the seeding was terminated at the end of the third run. Therefore, it appears unlikely that the seeding contributed significantly to the bed growth.

The third possible explanation is that the net creation of nuclei in the crystallizer was much greater than the rate during the first series. The rate would need to be at least 18 nuclei per second higher than that in the first series, because the rate of adding seeds was 18 seeds per second lower in most of the second series than it was in the first. An increased rate of nuclei creation could result from small particles entering the crystallizer with the Mg solution and/or from a shortened spontaneous nucleation time as a result of the Mg addition. If the addition increased the supersaturation of the entering liquid sufficiently to make the spontaneous nucleation time shorter than the time elapsed until the liquid comes into contact with the bed particles, where supersaturation can be relieved by crystallization onto already-formed surfaces, then nuclei will form spontaneously.

A balance on the number of bed particles through the series illustrates that the net rate of creation during the second series increased dramatically over the rate during the near-steady state portion of the first series. The balance was conducted in the same way as the earlier balance, except that the accumulation of particles in the bed must be reflected because steady state was never approached during the second series. In the balance, the estimated number of particles produced is 9.2 million, of which 3.2 million are product and 6.0 million are bed accumulation. Of these, 1.0 million can be accounted for as seed added during the first three runs. The remainder, 8.2 million, are attributed to net generation of nuclei in the crystallizer. The average rate of net generation over the 55-hour series, then is 41 per second. This estimated rate, approximately ten times that estimated for the first series, supports the explanation that bed build-up during the second series results at least in part from faster generation of nuclei. The estimate provides no insight into which mechanism of nucleus generation may be responsible.

Regarding the behavior of the bed, its appearance and observed movement during the second series are consistent with the hypothesis that the bed is more mixed than classified, as discussed for the first series. The fact that the rebound in phosphorus concentration between the upper bed and the treated liquid occurred through most of the series, while the channel was also observed in the bed through most of the series, supports the hypothesis that the two phenomena are linked. The rising of the bed top, enlarging of the top zone, and shrinkage of the bottom zone seem clearly correlated with build-up in the bed. In this series, when those trends in the bed appearance were observed, the bed weight was increasing. When the opposite trend was observed, the bed weight was declining.

Comparing FIG. 17 against the timing of the observation of the double bed top reveals a possible link between the two. The phenomenon occurred at a time when the distribution had two distinct, rather widely separated peaks. Note that the total weight of three intermediate-sized fractions (#30-#35, #35-#40, and #40-#50) shrank to a minimum of around 20 g during this period (about 40 to 45 h of operation time), while the two finer fractions and four coarser fractions were larger. At no other time during the first or second series was there a double peak, so distinct and widely separated, in the particle size distribution.

The comparison of treated liquid concentrations, with those expected at equilibrium, which was performed for the near-steady state portion of the first series, was not performed for the second series, because steady state was never approached.

Detailed Results from FCR Series #3 Qualitative Observations

During the first run in the third series, product was drained from the bed by reducing the liquid inflow rate to one-half its normal flow during operation. The inflow rate was held at the low level until the product collector filled, normally requiring 1 to 2 min, then raised to its normal rate to completely re-fluidize the bed before shutting down to empty the product collector. This procedure was repeated until enough bed was removed that the channeling behavior in the bed completely disappeared. Eight performances of the draining and product removal procedure were required to eliminate the channeling behavior. The bed height fell from 30 cm to 27 cm during this time. For the remainder of the first run and for all the remaining runs in the series, the product was drained from the bed whenever the bed height reached 27.5 cm. The same procedure as that used during the first run was used, except that temporary shutdown after each re-fluidization was unnecessary because the product collector did not fill until the end of the run. Each product draining lasted long enough to lower the bed level about 1 cm; i.e., to about 26.5 cm. The bed top fell several cm and lost fluidization during the drainings. Each draining was allowed to last long enough to fill about one-third of the collector, equating to about eight to ten g of product. A bed height of 27 cm, plus or minus one-half cm, was thus maintained through the thirteenth run.

During the first run, the bottom zone reappeared, then expanded to a height of about two cm during the subsequent three runs. The middle zone expanded during the first four runs to about ten cm, and the top zone shrank to about fifteen cm. The zones stabilized at those levels and remained quite constant during the fifth through thirteenth runs.

During the fourteenth run, the lagoon water intake was accidentally lifted from the storage tank for a moment, resulting in a loss of pumping force and backflow of liquid and bed material from the crystallizer through the pump discharge line, the pump (which continued to operate), and the pump suction line. The pump discharge line and several cm of the suction line were filled with bed material after the accident, and this material was recovered and loaded into the bed. However, evaluation of the bed at the end of this and the following run showed changes suggesting the accident had changed the bed significantly, thus ending the period of several runs of smooth operation with stable bed characteristics. Given that the bed fluidization and particle size distribution had remained constant enough during the ninth through thirteenth runs to regard it as having demonstrated steady state or near-steady state, it was decided to terminate the series after the fifteenth run.

The fifth run in the series also presented some difficulty. From the start of the run, small bubbles began to appear in the liquid near the top of the bed. The bubbles appeared to form at the top of the bed, forming a ring of bubbles clinging to the inside wall of the cone at the upper surface. Bubbles also frequently rose to the top surface of the liquid in the cone. Small solid particles of bed material could be seen clinging to the bubbles, carrying over with the bubbles with the overflow of treated liquid. A fine sieve screen placed at the end of the overflow tube accrued several g of fine solid bed material within a few minutes. The run was terminated and the bed material on the sieve was returned to the bed. Because the lagoon liquid in the tank was several days older than any that had been used before, it was hypothesized that digestion had produced dissolved gas sufficient to effervesce. The liquid was discarded and a fresh tank of liquid obtained. The fifth run was restarted, this time with no such problems.

Bed Weight, Particle Size Distribution, and Height

Figure 22:
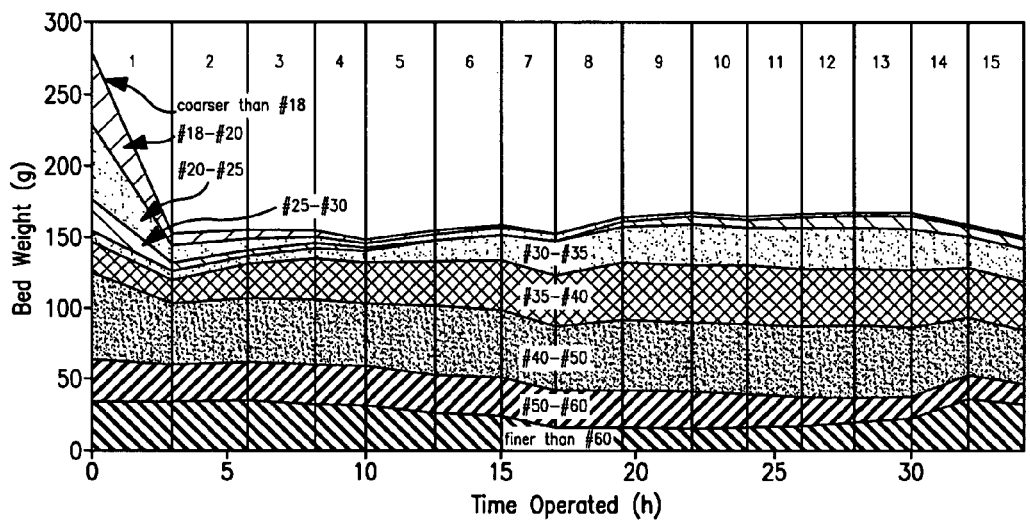
FIG. 22 is a chart for a third series of FCRs showing bed weight broken down by particle size versus time operated.

FIG. 22 shows the bed weight and particle size distribution during the third series of runs. The bed weight dropped rapidly during the first run, reaching a little over 150 g. Thereafter, the weight increased slightly on some of the runs, reaching 165–170 g by the ninth run (about 19 h operating time) and remaining there through the thirteenth run (about 30 h). The weight dropped a total of 15 9 the last two runs.

The particle size distribution became nearly constant by 19 h of operating time. The fractions coarser than #25 dropped to nearly zero by that time, the #25-#30 fraction changed little through the series, and the #30-#35 fraction first increased to compensate for the loss in the coarsest fractions then stabilized by 19 h. The #35-#40 and #40-#50 fractions also stabilized by 19 h. The finest two fractions, #50-#60 and finer than #60, did not completely stabilize by 19 h, as the former decreased and the latter increased. However, the change was slow and furthermore, the changes in these two fractions compensated for one another, resulting in little net change in the total amount of fines through the near steady-state period.

Figure 23:
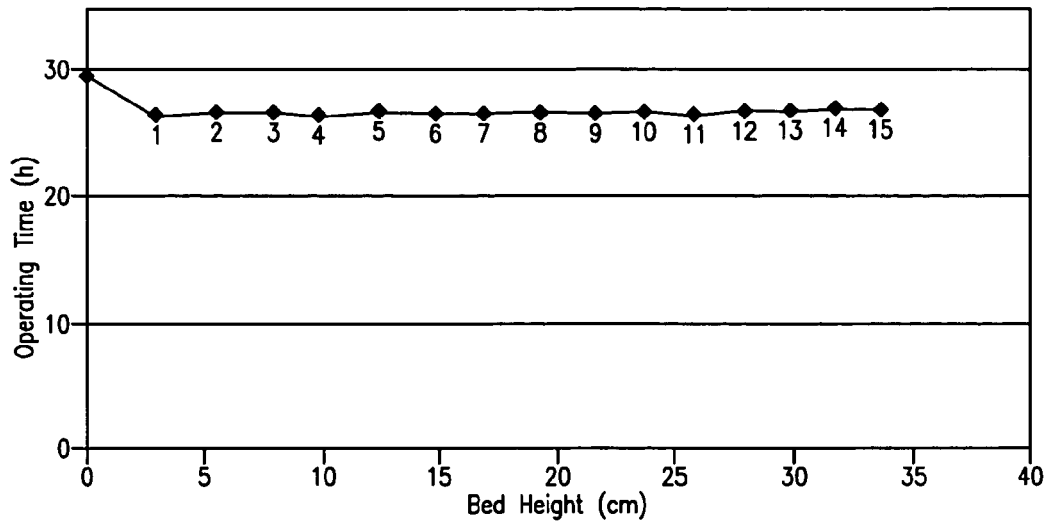
FIG. 23 is a chart for a third series of FCRs showing bed height at end of run versus operating time.

FIG. 23 shows the bed height through the series. The height dropped rapidly during the first run as the system was operated to achieve a bed height of 27.5 centimeters and then was kept near that height for the remainder of the series.

Product Weight and Particle Size Distribution

Figure 24:
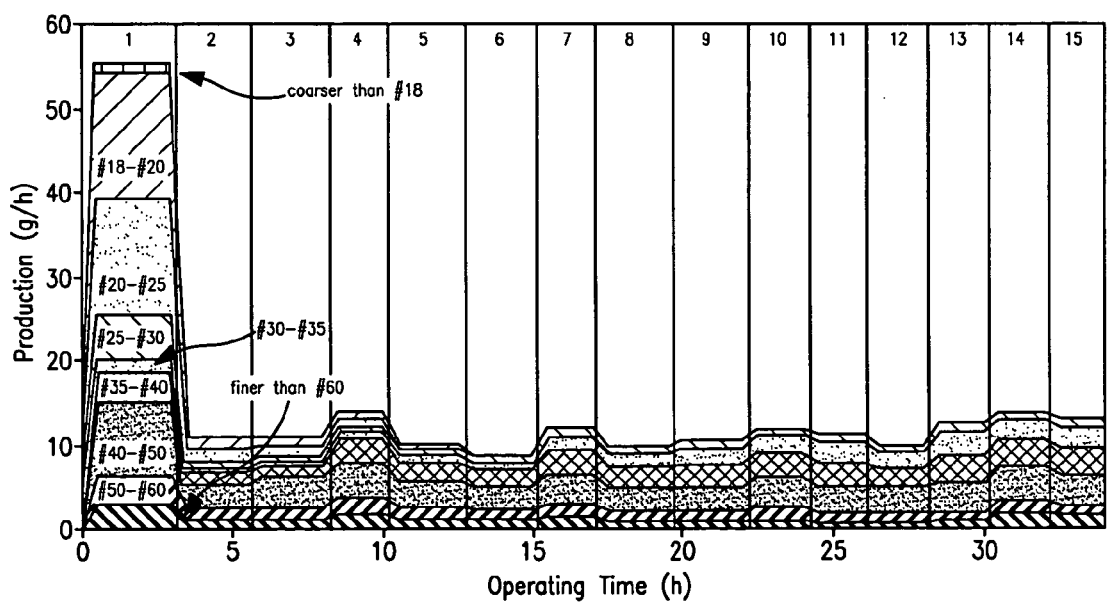
FIG. 24 is a chart for a third series of FCRs showing production averaged over each run broken down by particle size.

FIG. 24 shows the weight of product per h, broken down by particle size and averaged over each run. A very high rate, averaging more than 50 g/hr, can be seen for the first run. The rate then drops to around 11 g/h and fluctuates around that value, staying in the range of 8 to 13 g/h, for the remainder of the series. The final three runs, especially the last two, show a rate sustained near the top end of that range. The particle size distribution of the product grows richer in the finer fractions during the first five runs then remains relatively constant.

Phosphorus Reduction

Figure 25:
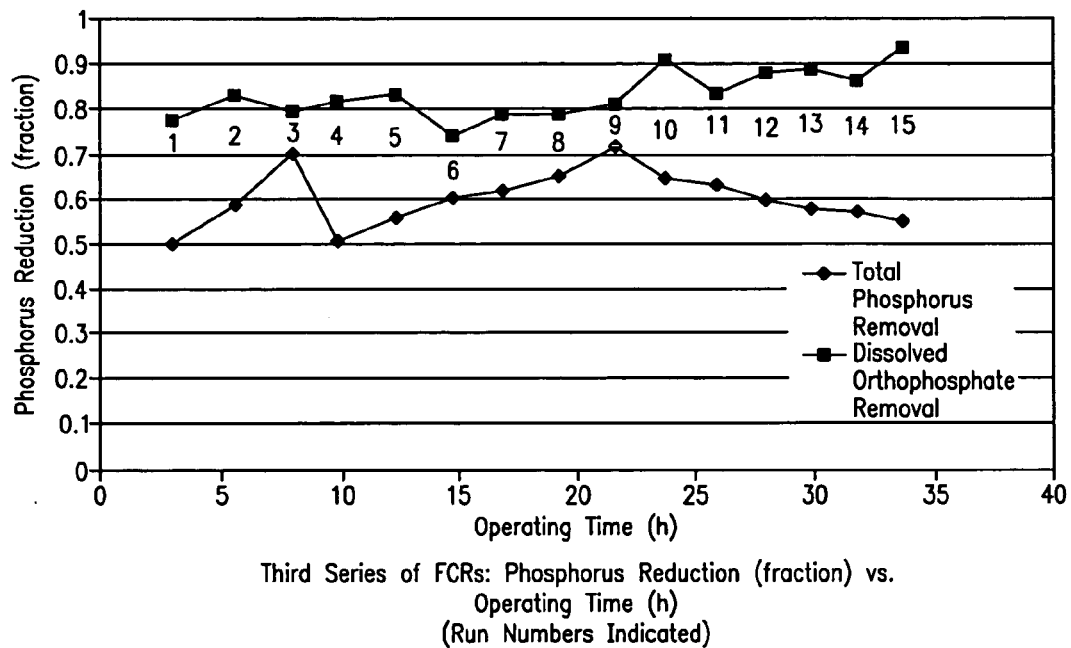
FIG. 25 is a chart for a third series of FCRs showing phosphorus reduction versus operating time.

As seen in FIG. 25 the crystallizer achieved greater phosphorus reduction in the third series than in either of the two preceding series. Reduction in TP ranged from 0.50 to 0.72, and reduction of dissolved OP ranged from 0.75 to 0.93.

TP reduction showed no trend that was sustained through the series. However, the figure suggests a possible trend toward increasing reduction in dissolved orthophosphate through the series. TP reduction exhibits two peaks of nearly equal height.

Variation of Phosphorus Concentration with Height in Bed

Figure 26:
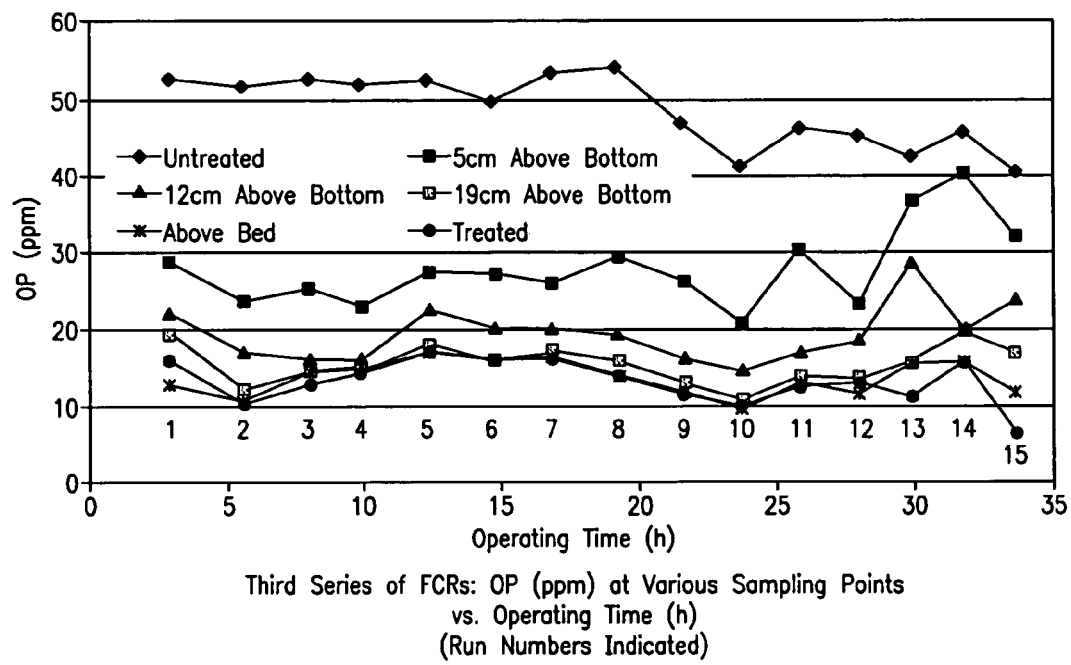
FIG. 26 is a chart for a third series of FCRs showing OP at various sampling points versus operating time.

FIG. 26 shows the profile of OP concentration across the six sampling points. For the first thirteen runs, the figure shows the typical pattern of most of the reduction occurring between the untreated liquid and the 5-cm sample point, with additional reductions of decreasing magnitude at the 12-cm and 19-cm points. The rebound in concentration seen at the end of the second series has disappeared, and the concentrations in the 19-cm sample, above-bed sample, and treated liquid are very close on the second through twelfth runs. The final three runs show a more even reduction in concentration with respect to height, but the total reduction achieved is about the same, and there is no rebound.

Discussion of Results in FCR Series #3

A phosphorus balance on the third series estimates that inputs were 108 g in the lagoon liquid and 7.7 g in the Mg solution. There was no phosphorus input in the form of seeds because there was no seeding in this series. Outputs were 44.0 g in the treated liquid and 92.2 g in the product. Net accumulation in the bed was −24.1 g. The total input is 97.5% accounted for in the output and net accumulation; however, it should be noted that the pump failure in the fourteenth run likely caused a loss in product. The amount of the loss an be estimated at 7 g, because that is the reduction in bed weight that occurred during the run. In the five previous runs, the bed weight had remained constant to within plus or minus 1.3 g. If adjusted for a loss of 7 g of bed, the accounted-for percentage rises to 98.6%.

It should also be noted that the phosphorus input in the Mg solution has been estimated by assuming the concentrations in the solution remained at the average for the second series through all of the third series. This approach was required because the phosphorus concentrations in the Mg solution were not analyzed after the second series. The approach may introduce some error, which may be responsible for some of the mis-match in the material balances.

A phosphorus balance limited to the five runs where the bed changed little, runs 9 through 13, estimates phosphorus inputs of 38.1 g in lagoon liquid and 2.7 g in the Mg solution. Outputs were 14.5 g in treated liquid and 25.9 g in product, and net accumulation was 0.4 g. Inputs were 100.8% accounted for, again showing a good match given the uncertainties in sampling and analysis.

Calculating an average reduction in TP during the near-steady state period, using the same method used for the analogous period during series one, yields a reduction percentage of 64%. Assuming again that precipitation of orthophosphate ions in the liquid is the mechanism of reduction this reduction percentage is in the range expected. The addition of the Mg should be sufficient to precipitate all the phosphorus were it all in the form of dissolved OP. However, other forms of phosphorus in the raw lagoon liquid generally constitute 20% to 40% of the TP, so even if the struvite precipitation proceeded completely to equilibrium, TP reduction could not exceed 60% to 80%.

Table 9 presents a comparison of the concentrations in the treated liquid with their expected values if struvite precipitation reached equilibrium. The comparison was conducted for the near steady state portion of the third series, using a method similar to that used for the comparison covering the analogous portion of the first series. It should be noted that, because there are two liquid input streams (raw liquid and Mg solution), the table presents concentrations for "input liquid" rather than "raw liquid." The concentrations for input liquid have been calculated by arithmetically aggregating the two streams.

The fact that Mg analyses were suspended before the third series led to two complications with the calculations for the comparison. First, no Mg analyses are available for any of the streams. Therefore, for the purposes of this comparison, the concentrations of Mg in the raw liquid stream and in the Mg solution were each approximated by setting them equal to the average of the analogous concentrations averaged across the second series. Because the sources and methods of preparing the liquids were identical for the two series, this method should produce a fair approximation. However, no approximation is possible to substitute for analyses of the treated liquid.

TABLE 9

Concentrations for Near-Steady State Portion of Third FCR Series: Input Liquid, Treated Liquid, and Expected in Treated Liquid at Equilibrium
(OP and TP Corrected for Adsorption on Sample Bottle Walls)

| Material Sampled | Sample fraction | Species | Average ppm | Average ppm expected | Divergence from expected (ppm) |
|---|---|---|---|---|---|
| Input Liquid | Centrifugate | OP | 33.2 | | |
| | | TP | 37.3 | | |
| | | TAN | 435 | | |
| | | Mg | 46.9 | | |
| | Sediment, reconstituted to original vol. | OP | 11.2 | | |
| | | TP | 21.8 | | |
| | | TAN | 35.7 | | |
| | | Mg | 10 | | |
| Treated Liquid | Centrifugate | OP | 5.1 | 3.7 | +1.4 |
| | | TP | 8.7 | 7.8 | +0.9 |
| | | TAN | 430 | 421 | +9 |
| | | Mg | — | 23.8 | — |
| | Sediment, reconstituted to original vol. | OP | 6.4 | 11.2 | −4.8 |
| | | TP | 16.4 | 21.8 | −5.4 |
| | | TAN | 40.4 | 35.7 | +4.7 |
| | | Mg | — | 10 | — |

The second complication stems from the fact that the sample sizes of centrifugate and sediment were reduced when the Mg analyses were suspended. The Mg analysis requires more sample volume than the other analyses combined. On the fourth run into the series, this fact was recognized and the volumes of the centrifugate and sediment samples were reduced to economize on time, as those samples require additional work to prepare. The lower sample volumes filled the bottles for the centrifuged samples less than half full, as opposed to being nearly full before the fourth run.

After the series was completed, the analytical results showed a change beginning on the fourth run. Through the 35 runs completed up to that time (32 in the first and second FCR series), with few exceptions, the OP and TP concentrations in uncentrifuged samples were equal to, within one or two ppm, the sum of the corresponding phosphorus concentrations in the centrifugate and in the sediment. For almost all the remaining runs, however, the sum of the OP concentrations in centrifugate and sediment fell significantly short (10 to 20 ppm) of the concentration in the uncentrifuged sample. The shortfall in TP was about the same as the OP shortfall, indicating that non-orthophosphate phosphorus was not being affected. An experiment comparing phosphorus analyses of liquid poured from the same large vessel into sample bottles of equal size but filled to different depths then demonstrated that bottles filled less than half full test 20% to 30% lower in OP than bottles completely filled with the same liquid. The data is consistent with a hypothesis that OP is adsorbed onto sample bottle walls in amounts large enough to significantly reduce the analytical result when the bottles are filled less than half full.

For the comparison in Table 9, then, a correction was made to the raw data in order to avoid exaggerating the phosphorus removal percentages. The correction was made allocating the missing OP to the centrifugate and sediment samples. The shortfall in OP was calculated as the difference between its concentration in the uncentrifuged sample and the sum of its concentrations in the centrifugate and sediment. The centrifugate and sediment concentrations were then increased by an equal percentage to eliminate the shortfall. TP concentrations in centrifugate and sediment were increased to reflect the corrections to the OP, thus eliminating the shortfall in TP, also.

Comparing this table of concentrations against the corresponding table for the first series reveals similarities and differences. First, the removal of phosphorus from the suspended phase has occurred here as it did in the first series, with the amount removed being nearly the same. Second, the loss of phosphorus from the dissolved phase has progressed most of the way toward the struvite solubility equilibrium point, as it did in the first series. However, in the present case, the loss has reached to within one or two ppm of the equilibrium point. When coupled with the fact that the equilibrium point is lower in phosphorus due to the Mg supplementation, the closer approach to equilibrium leads to a much lower amount—less than one-quarter—of phosphorus remaining in the liquid. Note that the overall phosphorus removal from both phases combined is greater than that predicted by struvite precipitation, even if the precipitation proceeded all the way to equilibrium. This result stems from the fact that the removal from the suspended phase is greater than the separation between the equilibrium point and the actual remaining concentration in the liquid.

The closer approach to equilibrium may be explained by the fact that the bed was both finer and heavier during this near-steady-state period than during that portion of the first series. Both differences result in greater surface area available for the precipitation reaction, allowing for a more complete reaction.

Due to the lack of Mg data, phosphorus-to-Mg and TAN-to-Mg ratios cannot be calculated as they were for the first series. Therefore, these concentration data offer no additional clues as to the mechanism for reduction of phosphorus from the suspended phase. The rise of TAN in the suspended phase opposes the pattern seen in the first series, and is inconsistent with all the hypotheses offered earlier for how the phosphorus reduction in the suspended phase might occur. No hypothesis accommodating loss in phosphorus and gain in nitrogen analysis results simultaneously in the suspended phase can be offered, other than the possibility of sampling or analysis error.

Comparisons of the appearance of the bed with its particle size distribution and with the profile of OP concentration versus reactor position comport with earlier discussion. The bed lightening and reduction in coarseness associated with the draining down of the bed early in the series coincided with upward movement of the boundaries between the bottom and middle and between the middle and top bed zones. They also coincided with the disappearance of the channel in the top zone of the bed. Furthermore, the disappearance of the channel coincides with dissipation of the rebound of phosphorus concentration between the top zone and the treated liquid, further strengthening the link between those phenomena hypothesized in the discussion of the first series.

The calculation of net generation of particles during the near-steady state period, using the same method used for that portion of the first series, indicates a net generation of nearly 2.1 million particles during the period. This figure equates to 52 particles per second, and is about 27% higher than the rate calculated for the second series. The difference provides some evidence in favor of the spontaneous nucleation hypothesis. The bottom bed zone grew higher in the third series, resulting in more of the incoming liquid spending more time in the supersaturated state before coming into contact with the bed particles, in turn leading to generation of more nuclei.

The mode of product removal used in this series proved successful in achieving and maintaining a near-steady state condition. Changes in bed characteristics were no greater than the changes in the raw lagoon liquid during the period of near-steady state behavior. The loss of near-steady state behavior at the end of the period seems very likely related to the pump failure. The evaluation of the bed at the end of that run showed a loss in weight, consistent with the observation that bed material had backed through the pump and been lost into the raw liquid feed tank. On the following, final run, the evaluation showed further loss in total weight, but increase in the weight of fines. The fines may have increased due to grinding by the pump of bed material that had backed through the pump but had not moved far enough back to be lost. When the pump was restarted, this material was drawn through the pump and flowed into the bed. The two exposures to the shearing action of the gear pump may have ground this portion of material into fines. The increase in fine material could have caused the bed top to rise higher than it would have otherwise, resulting in greater product removal to maintain the desired bed top height and a decreased bed weight.

The bubbling observed in the crystallizer during the aborted fifth run may have resulted from biological reactions in the raw liquid. The liquid had sat considerably longer than liquid used for any other run. Dissolved $CO_2$ and/or methane, which are produced in anaerobic digestion, may have accumulated in the liquid, which was quiescent, during this time. Agitation, pumping, and contact with the bed may have then stimulated the gases to effervesce in the crystallizer feed line and reactor itself.

The possible weak upward trend noted in dissolved OP reduction through the series cannot be correlated well with any other observed trends with the possible exception of bed fineness. Bed fineness, as earlier discussed, could increase phosphorus removal by providing greater surface area to complete the reaction. However, the increasing removal of OP should be reflected also in TP, which instead shows two peaks, with the last several runs on a downward trend.

Results in the MVRs and Discussion Overview of MVR Results

The results in the second stage, which consisted of one series of three multi-variate runs (MVRs), demonstrated some differences in phosphorus reduction among the condition sets tested. The condition sets were arranged factorially and randomized into three complete blocks, each block corresponding with a run; therefore, statistical analyses were straightforward. The analyses showed with high confidence that phosphorus reduction correlates positively with ammonia addition and with Mg addition up to a point. It showed little correlation with liquid flow rate.

Detailed Results

Figure 27:
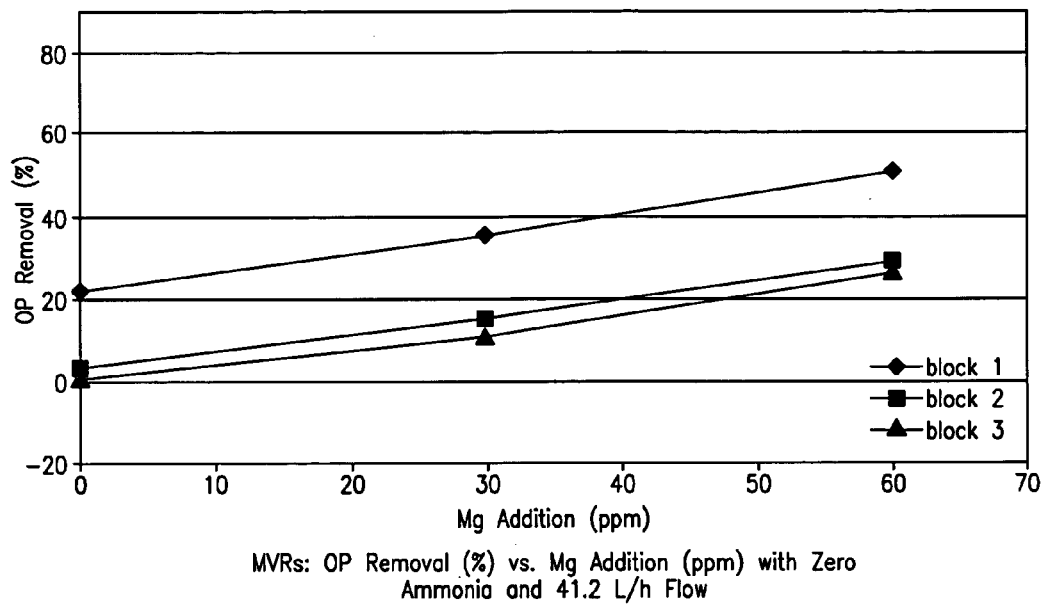
FIG. 27 is a chart for MVRs showing OP removal versus Mg addition with zero ammonia and 41.2 L/h flow.
Figure 28:
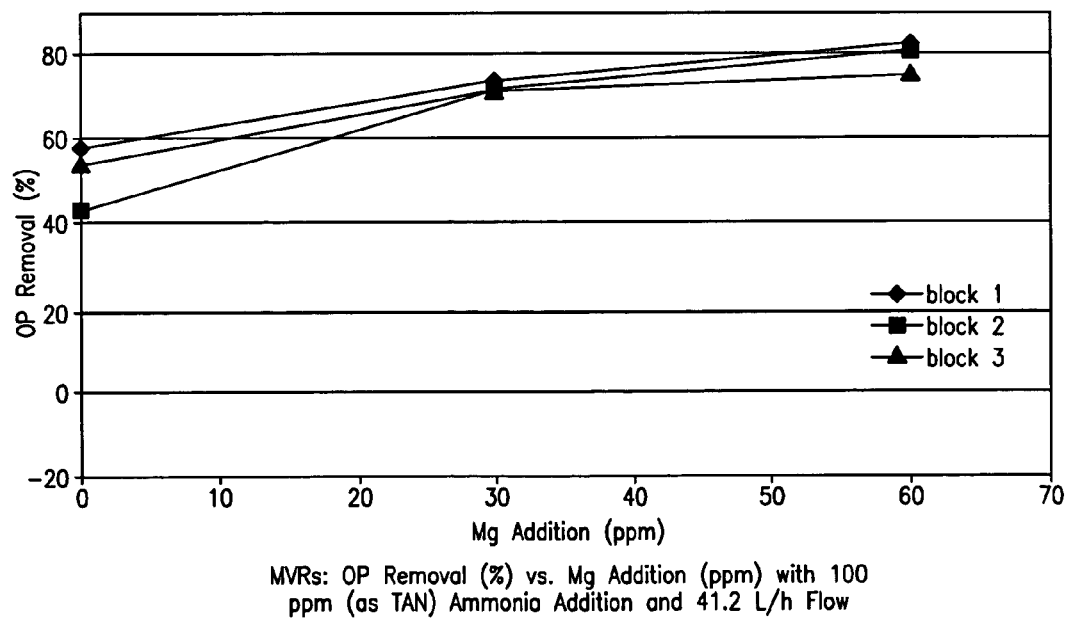
FIG. 28 is a chart for MVRs showing OP removal versus Mg addition with 100 ppm ammonia addition and 41.2 L/h flow.
Figure 29:
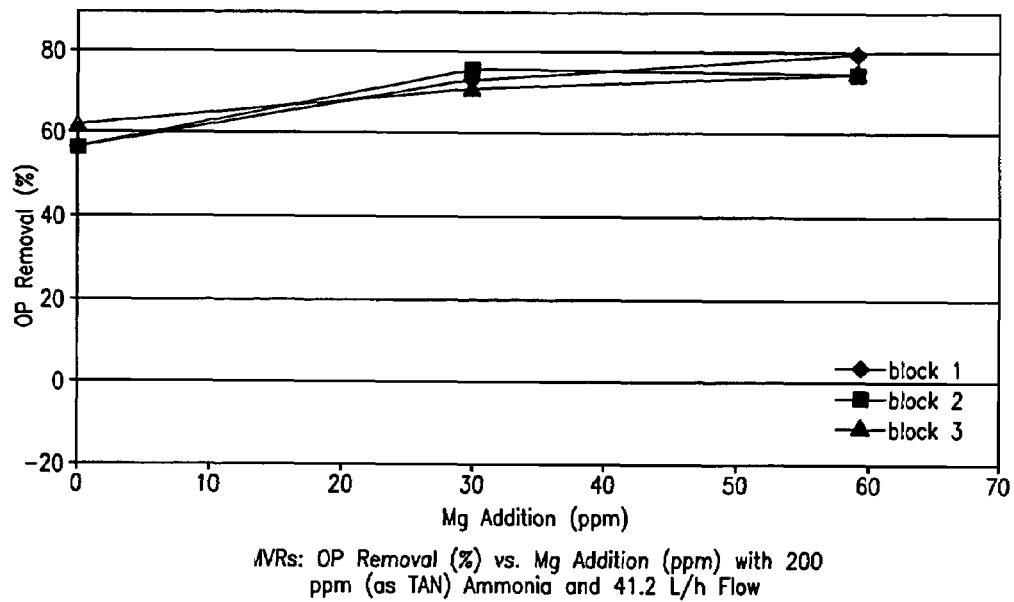
FIG. 29 is a chart for MVRs showing OP removal versus Mg addition with 200 ppm ammonia and 41.2 L/h flow.
Figure 30:
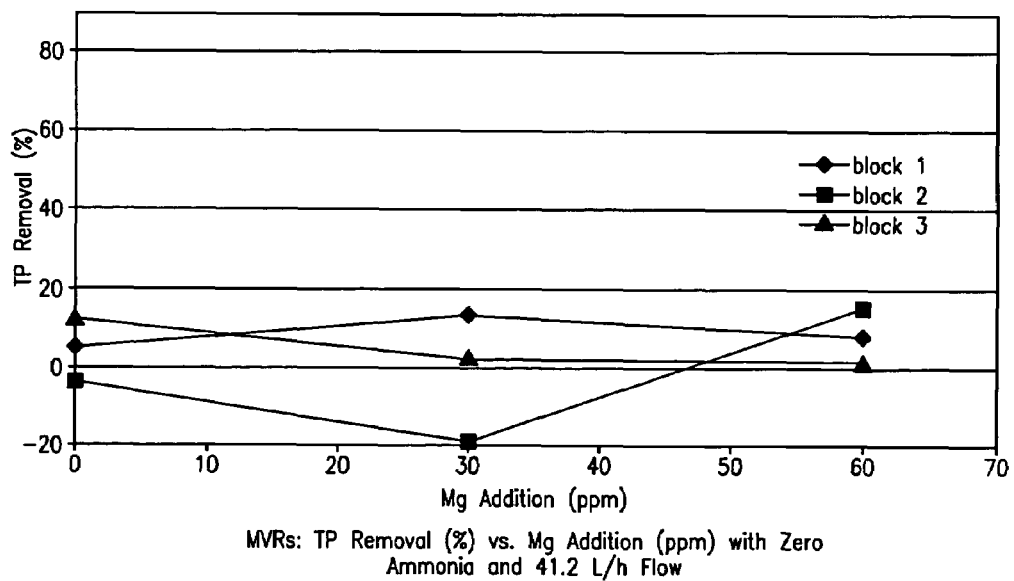
FIG. 30 is a chart for MVRs showing TP removal versus Mg addition with zero ammonia and 41.2 L/h flow.
Figure 31:
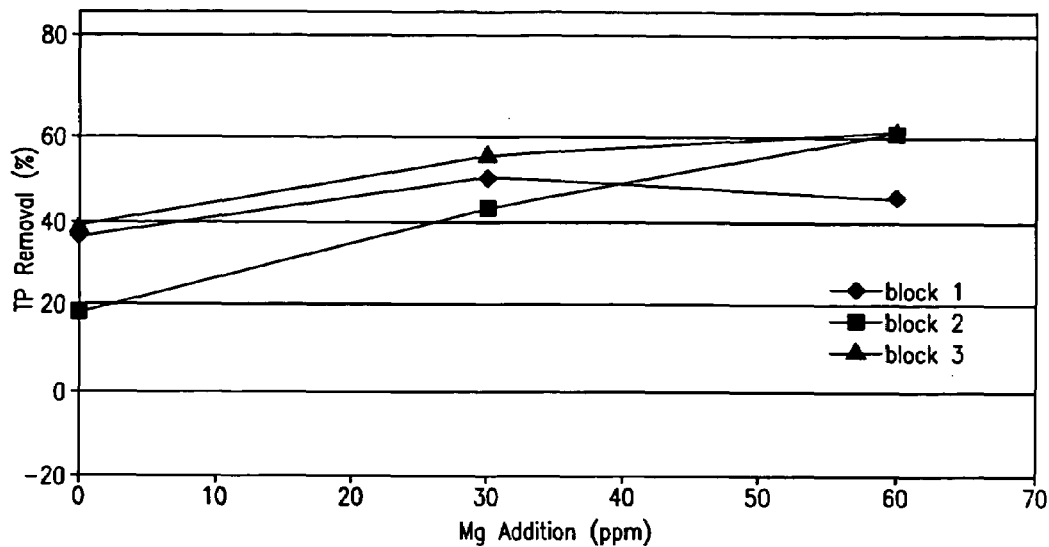
FIG. 31 is a chart for MVRs showing TP removal versus Mg addition with 100 ppm ammonia and 41.2 L/h flow.
Figure 32:
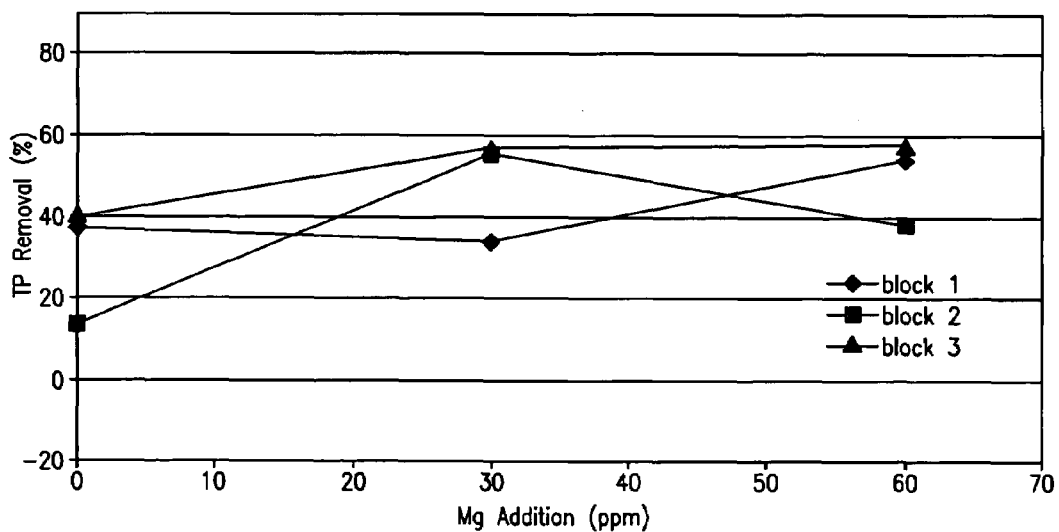
FIG. 32 is a chart for MVRs showing TP removal versus Mg addition with 200 ppm ammonia and 41.2 L/h flow.
Figure 33:
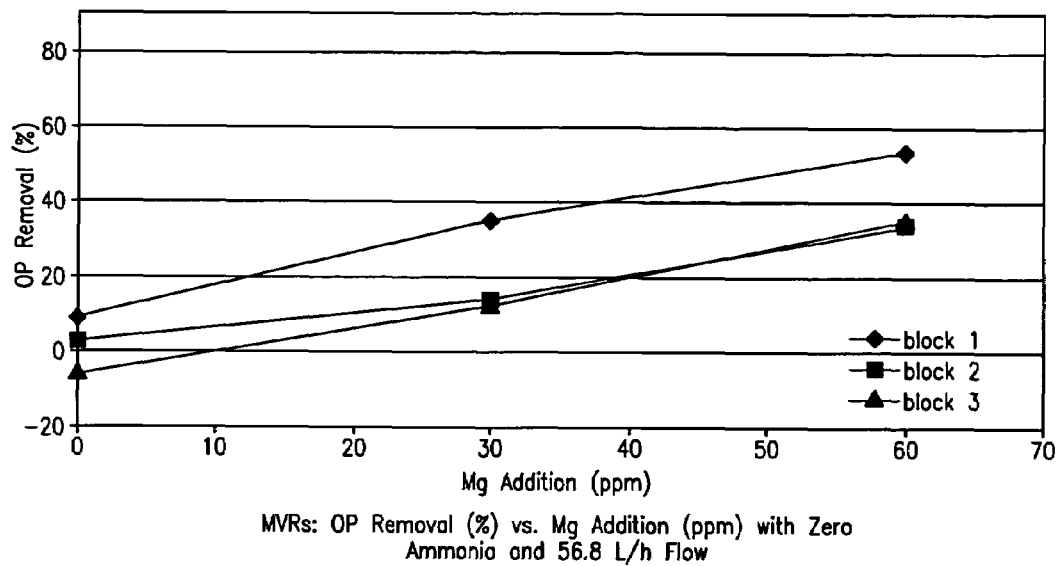
FIG. 33 is a chart for MVRs showing OP removal versus Mg addition with zero ammonia and 56.8 L/h flow.
Figure 34:
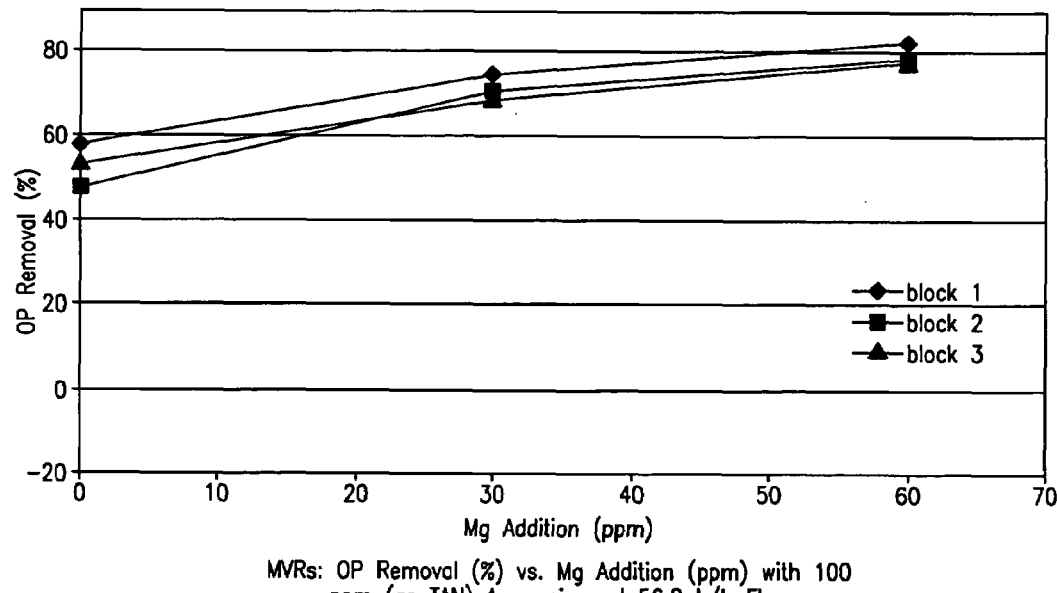
FIG. 34 is a chart for MVRs showing OP removal versus Mg addition with 100 ppm ammonia and 56.8 L/h flow.
Figure 35:
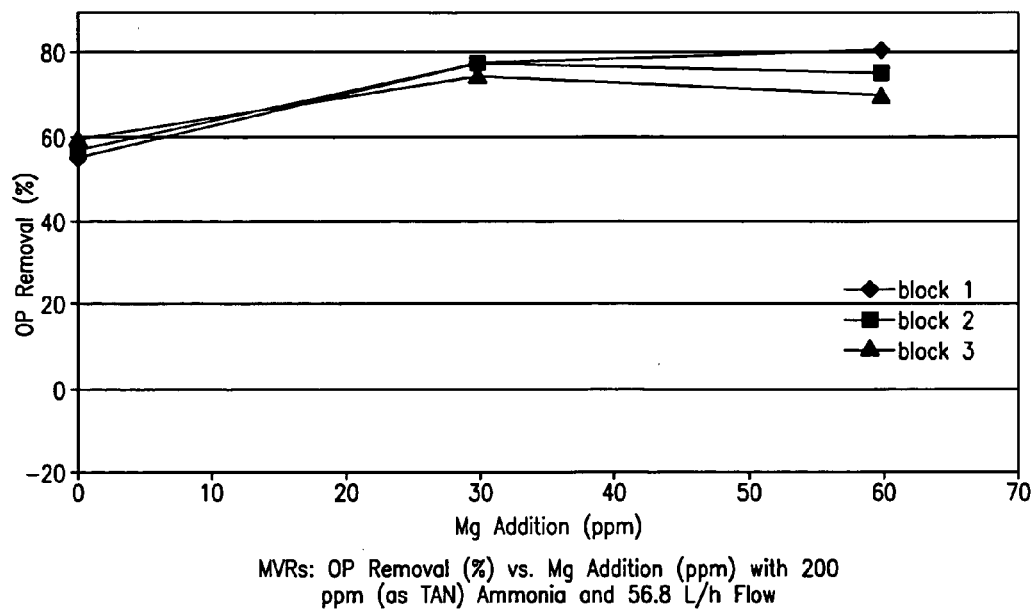
FIG. 35 is a chart for MVRs showing OP removal versus Mg addition with 200 ppm ammonia and 56.8 L/h flow.
Figure 36:
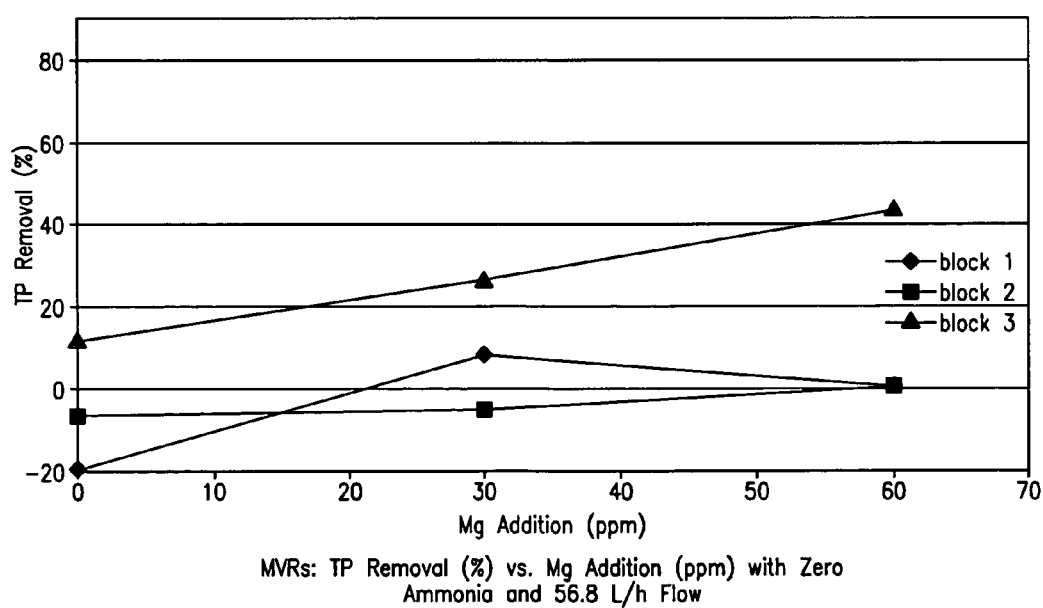
FIG. 36 is a chart for MVRs showing TP removal versus Mg addition with zero ammonia and 56.8 L/h flow.
Figure 37:
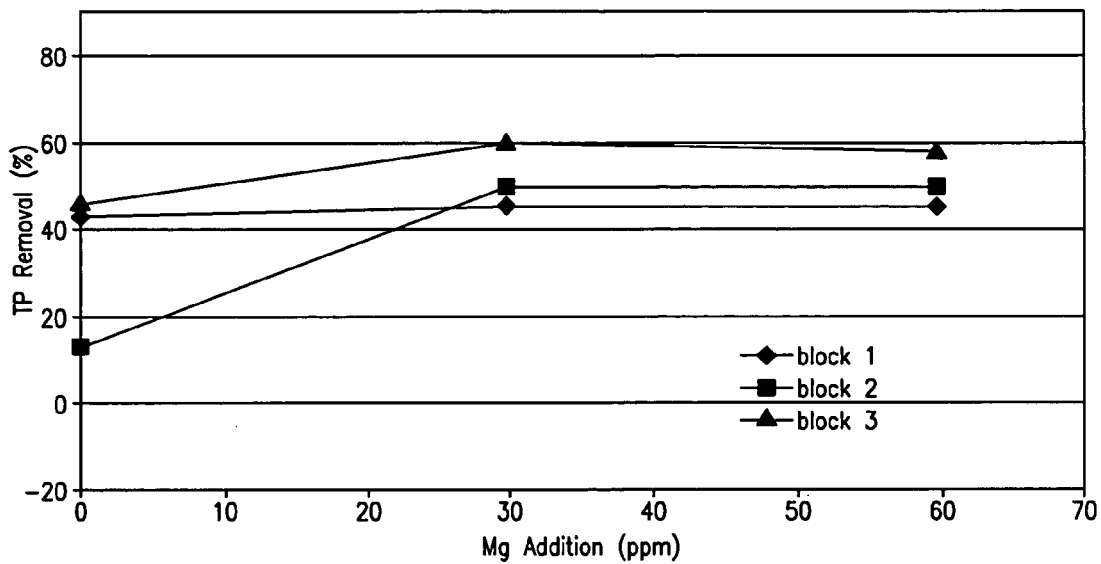
FIG. 37 is a chart for MVRs showing TP removal versus Mg addition with 100 ppm ammonia and 56.8 L/h flow.
Figure 38:
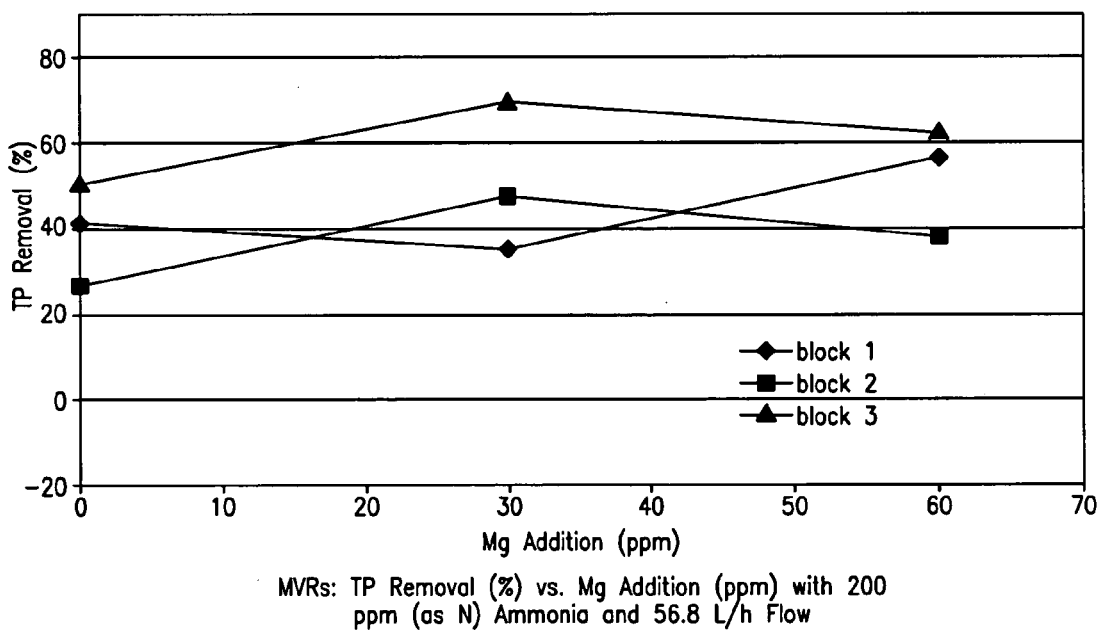
FIG. 38 is a chart for MVRs showing TP removal versus Mg addition with 200 ppm ammonia and 546.8 L/h flow.

FIGS. 27 through 29 illustrate reduction achieved in OP at 41.2 L/h liquid flow rate. Each of the three figures corresponds with one ammonia addition level, and includes all nine results (three blocks with three Mg addition levels). FIGS. 30 through 32 depict the analogous results for TP reduction. FIGS. 33 through 38 present, in the same order and format, the data taken at 56.8 L/h.

Two trends can be observed in the figures. First, there is a general up slope in the plots, indicating higher reduction in both OP and TP at higher Mg addition rates. The trend often looks stronger in going from 0 to 30 ppm Mg than in going from 30 ppm to 60 ppm. Second, higher phosphorus reduction was generally achieved in the second and third figure of each group of three (i.e., the higher two ammonia addition levels) than in the first (i.e., zero ammonia addition), meaning that phosphorus reduction was higher at the higher levels of ammonia addition. Again, the trend looks stronger in moving from the lowest level to the medium level than in moving from the medium to highest level.

Some other observations can be made. First, the range in phosphorus reduction is near that documented in the runs in the first stage, except that less phosphorus reduction is achieved when no ammonia is added. Second, TP reduction was less than OP reduction. Third, in some cases reductions in one block exceeded those for the other blocks at all three Mg levels (block 1 in FIGS. 27, 28, 33 and 34; block 3 in FIGS. 32, 36, 37, and 38). Finally, six instances of negative reduction were recorded, all occurring with zero ammonia addition and Mg at one of its two lower levels.

Statistical analyses treating OP reduction as the dependent variable and ammonia addition, Mg addition, and flow rate as fixed independent variable were conducted. An analysis of variance including the effect of blocks (treated as a random, rather than fixed, independent variable because it is useless in predicting phosphorus reduction) and of the fixed independent variables, including their three simple effects and all fourteen quadratic effects and interactions, was first performed to identify significant effects. Significant effects are here defined as those with associated p-values of 0.02 or less. The significant effects identified were (1) block; (2) simple effect of ammonia; (3) simple effect of Mg; (4) ammonia and Mg interaction; (5) ammonia quadratic effect; and (6) Mg quadratic effect. (Quadratic effect of a variable is weakening or strengthening of its effect with increasing level of the variable. For example, a negative quadratic effect of an independent variable means that increasing it when it is already at a high level yields less increase in the dependent variable than it yields when the independent variable is lower.) A summary of this analysis of variance is presented in Table 10.

TABLE 10

Analysis of Variance for OP Reduction, Including All Effects of All Independent Variables
(Significant effects, with p-value 0.02 or less, indicated in bold type)

| | Sum of Squares | Degrees of Freedom | Mean Square | F value | p-value |
|---|---|---|---|---|---|
| Block | 754.4 | 1 | 754.4 | 23.9 | <0.0001 |
| Block × block | 173.8 | 1 | 173.8 | 5.5 | 0.0250 |
| Ammonia | 20721.6 | 1 | 20721.6 | 655.7 | <0.0001 |
| Flow | 0.05 | 1 | 0.05 | 0.0 | 0.9693 |
| Magnesium | 5983.0 | 1 | 5983.0 | 189.3 | <0.0001 |
| Ammonia × magnesium | 321.2 | 1 | 321.2 | 10.16 | 0.0031 |
| Flow × magnesium | 26.2 | 1 | 26.2 | 0.83 | 0.3691 |
| Ammonia × flow | 1.7 | 1 | 1.7 | 0.05 | 0.8162 |
| Ammonia × ammonia | 6040.5 | 1 | 6040.5 | 191.16 | <0.0001 |

TABLE 10-continued

Analysis of Variance for OP Reduction, Including All Effects of All Independent Variables
(Significant effects, with p-value 0.02 or less, indicated in bold type)

| | Sum of Squares | Degrees of Freedom | Mean Square | F value | p-value |
|---|---|---|---|---|---|
| Magnesium × magnesium | 222.2 | 1 | 222.2 | 7.03 | 0.0121 |
| Ammonia × ammonia × magnesium | 8.4 | 1 | 8.4 | 0.27 | 0.6094 |
| Ammonia × ammonia × flow | 0.4 | 1 | 0.4 | 0.01 | 0.9094 |
| Ammonia × magnesium × magnesium | 174.8 | 1 | 174.8 | 5.53 | 0.0246 |
| Ammonia × flow × magnesium | 54.0 | 1 | 54.0 | 1.71 | 0.1999 |
| Flow × magnesium × magnesium | 4.6 | 1 | 4.6 | 0.15 | 0.7050 |
| Ammonia × ammonia × magnesium × magnesium | 16.1 | 1 | 16.1 | 0.51 | 0.4800 |
| Ammonia × ammonia × flow × magnesium | 26.4 | 1 | 26.4 | 0.84 | 0.3671 |
| Ammonia × flow × magnesium × magnesium | 7.0 | 1 | 7.0 | 0.22 | 0.6416 |
| Ammonia × ammonia × flow × magnesium × magnesium | 11.9 | 1 | 11.9 | 0.38 | 0.5427 |
| Error | 1074.4 | 34 | 31.6 | — | — |

Then, using only the five identified effects of the fixed independent variables, a new analysis of variance (Table 11) and a regression (Table 12) were performed. The new analysis of variance again showed all five of the effects to be significant, with p-values less than 0.02.

TABLE 11

Analysis of Variance for OP Reduction, Including Only the Significant Effects of the Fixed Independent Variables

| Source | Sum of Squares | Degrees of Freedom | Mean Square | F value | p-value |
|---|---|---|---|---|---|
| Ammonia | 20721.6 | 1 | 20721.6 | 426.1 | <0.0001 |
| Magnesium | 5983.0 | 1 | 5983.0 | 123.0 | <0.0001 |
| Ammonia × magnesium | 321.2 | 1 | 321.2 | 6.6 | 0.0133 |
| Ammonia × ammonia | 6040.5 | 1 | 6040.5 | 124.2 | <0.0001 |
| Magnesium × magnesium | 222.2 | 1 | 222.2 | 4.6 | 0.0377 |
| Error | 2334.3 | 48 | 48.6 | — | — |

TABLE 12

Regression of OP Reduction Against Significant
Effects of the Fixed Independent Variables

| Parameter | Estimate | Standard Error of Estimate |
|---|---|---|
| Intercept | 3.4268 | 2.5552 |
| Ammonia | 0.7252 | 0.0443 |
| Magnesium | 0.8385 | 0.1475 |
| Ammonia × magnesium | −0.0012 | 0.0005 |
| Ammonia × ammonia | −0.0022 | 0.0002 |
| Magnesium × magnesium | −0.0048 | 0.0022 |

Using the estimated coefficients from the regression yields the following equation for predicting OP removal:

$$OPR = 3.43 + 0.725\ (AM) + 0.83\ (MG) - 0.00122\ (AM \times MG) - 0.00224\ (AM \times AM) - 0.0048\ (MG \times MG) \quad (5)$$

where OPR=percent reduction in orthophosphate phosphorus;

AM=ppm (as N) ammonia addition; and

MG=ppm Mg addition.

The same statistical analyses were repeated, this time treating TP reduction as the dependent variable. The analysis of variance that includes the effect of block and of the fixed independent variables and their interactions and quadratic effects is summarized in Table 13. The effects revealed as significant by the analysis were fewer than in OP analysis, namely (1) block and quadratic block; (2) simple effect of ammonia; (3) simple effect of Mg; and (4) quadratic effect of ammonia.

The analysis of variance and the linear regression, using only the fixed effects indicated as significant, are summarized in Tables 14 and 15. Again, a p-value of less than 0.02 is associated with each of the effects.

TABLE 13

Analysis of Variance for TP Reduction, Including All Effects of
All Independent Variables
(Significant effects, with p-value 0.02 or less, indicated in bold type)

| | Sum of Squares | Degrees of Freedom | Mean Square | F value | p-value |
|---|---|---|---|---|---|
| Block | 1298.4 | 1 | 1298.4 | 12.5 | 0.0012 |
| Block × block | 1650.5 | 1 | 1650.5 | 15.9 | 0.0003 |
| Ammonia | 14480.1 | 1 | 14480.1 | 139.2 | <0.0001 |
| Flow | 69.4 | 1 | 69.4 | 0.7 | 0.4198 |
| Magnesium | 2448.6 | 1 | 2448.6 | 23.5 | <0.0001 |
| Ammonia × magnesium | 37.2 | 1 | 37.2 | 0.4 | 0.5535 |
| Flow × magnesium | 0.3 | 1 | 0.3 | 0.0 | 0.9547 |
| Ammonia × flow | 9.0 | 1 | 9.0 | 0.1 | 0.7704 |
| Ammonia × ammonia | 4907.3 | 1 | 4907.3 | 47.2 | <0.0001 |
| Magnesium × magnesium | 221.6 | 1 | 221.6 | 2.1 | 0.1536 |
| Ammonia × ammonia × magnesium | 91.4 | 1 | 91.4 | 0.9 | 0.3553 |
| Ammonia × ammonia × flow | 49.6 | 1 | 49.6 | 0.5 | 0.4945 |
| Ammonia × magnesium × magnesium | 126.7 | 1 | 126.7 | 1.2 | 0.2775 |
| Ammonia × flow × magnesium | 178.8 | 1 | 178.8 | 1.7 | 0.1987 |
| Flow × magnesium × magnesium | 46.0 | 1 | 46.0 | 0.4 | 0.5104 |
| Ammonia × ammonia × magnesium × magnesium | 62.2 | 1 | 62.2 | 0.6 | 0.4447 |
| Ammonia × ammonia × flow × magnesium | 76.7 | 1 | 76.7 | 0.7 | 0.3966 |
| Ammonia × flow × magnesium × magnesium | 125.6 | 1 | 125.6 | 1.2 | 0.2795 |
| Ammonia × ammonia × flow × magnesium × magnesium | 0.5 | 1 | 0.5 | 0.0 | 0.9477 |
| Error | 3536.4 | 34 | 104.0 | — | — |

TABLE 14

Analysis of Variance for TP Reduction, Including Only the
Significant Effects of the Fixed Independent Variables

| Source | Sum of Squares | Degrees of Freedom | Mean Square | F value | p-value |
|---|---|---|---|---|---|
| Ammonia | 14480.1 | 1 | 14480.1 | 95.5 | <0.0001 |
| Magnesium | 2448.6 | 1 | 2448.6 | 16.2 | 0.0002 |
| Ammonia × ammonia | 4907.3 | 1 | 4907.3 | 32.4 | <0.0001 |
| Error | 7580.2 | 50 | 151.6 | — | — |

TABLE 15

Regression of TP Reduction Against Significant
Effects of the Fixed Independent Variables

| Parameter | Estimate | Standard Error of Estimate |
|---|---|---|
| Intercept | −2.8027 | 3.5543 |
| Ammonia | 0.6050 | 0.0740 |
| Magnesium | 0.2749 | 0.0684 |
| Ammonia × ammonia | −0.0020 | 0.0004 |

Using the regression coefficients, the following predictive equation for reduction in TP can be formed:

$$TPR = -2.81 + 0.605(AM) + 0.275(MG) - 0.00202\ (AM \times AM) \quad (6)$$

where "TPR" signifies total phosphorus reduction, and "AM" and "MG" have the same meaning as in the regression equation for OP reduction.

Discussion of Results in MVRs

The range in phosphorus reduction in the MVRs mostly adheres to expectations built upon observations in the FCRs. The greatest difference is that lower reductions were seen in some cases than in any FCRs. However, these lower reductions in the MVRs occurred at times of zero ammonia addition, a condition never tested in the FCRs. The six cases of observed negative reduction were less expected. Possible causes of negative reduction include (1) random error in phosphorus sampling and/or analysis in cases where reduction was actually zero or slightly positive; (2) slight reduction in pH due to acidity in the Mg solution, leading to dissolution of some phosphorus-containing bed material and liberation into the liquid stream; and (3) phosphorus reduction in the cone insufficient to compensate for the phosphorus input resulting from the phosphorus impurities in the material used to produce the Mg solution.

The simple effects of both Mg and ammonia to increase reduction in both OP and TP, which were revealed in the statistical analyses, are consistent with the overall upward trends observed in the plots. These simple effects also comport with the overall hypothesis for the mechanism of phosphorus reduction: that supersaturation with respect to struvite solubility leads to precipitation of phosphorus onto the bed material.

The negative quadratic effects seen in the statistical analysis also can be seen in the plots. The higher gains in reduction noted earlier in the plots in going from the lowest to the middle level of ammonia or Mg than in going from the middle level to the highest level evidence these effects.

The quadratic effects may result from the fact that the middle levels of Mg and ammonia addition are sufficient to push the rate high enough to achieve phosphorus removal near equilibrium and, because removal by struvite precipitation cannot surpass equilibrium, the additions of even more Mg and ammonia are less effective at precipitating additional phosphorus. Another possibility is that the middle levels of addition push the equilibrium phosphorus concentration quite low, and further additions of ammonia or Mg lead to less dramatic decreases. Yet a third possibility is that the highest levels of addition supersaturate the liquid sufficiently to produce spontaneous nucleation, which would limit phosphorus reduction because of small particles carrying over in the treated liquid.

All three explanations, however, seem as if they should apply as well to the quadratic effect of Mg on TP, which the analyses indicated was not significant, as it does to the three quadratic effects that were indicated to be significant. Perhaps Mg addition throughout the Mg range speeds some unrecognized mechanism of non-orthophosphate phosphorus removal. Perhaps there really is a negative quadratic effect, but not strong enough to generate a high-confidence signal in this experiment. Note that the p-value associated with this effect was the lowest among the fourteen effects with p-values greater than 0.05.

The negative interaction effect of Mg and ammonia indicated as significant for OP reduction suggests that further supersaturation from moderate levels achieves less additional OP reduction than supersaturation to the moderate levels, even when the additive used to achieve the higher level is not the same as the additive used to achieve the moderate level (i.e., ammonia to moderately supersaturate and Mg to further supersaturate). The same three explanations offered for the negative quadratic effects may thus also be considered for the negative interaction effect. Again, the effect is not indicated as significant for TP reduction, and again an unrecognized mechanism for non-orthophosphate phosphorus removal may be considered. However, the hypothesis that random error obscures the negative quadratic effect is less plausible in this case because the p-value is quite low.

The indication by the analyses that flow rate has no significant effect on phosphorus removal is consistent with the observation that the appearance of the plots of data at 41.2 L/h appear very similar to those at 56.8 L/h. The lack of effect suggests that the surface area for reaction provided in the bed is more than sufficient, at the lower flow rate, for the reaction to proceed to near equilibrium by the time the liquid exits the bed. The phosphorus concentration at the lower rate, then, would drop very quickly to near equilibrium in the lower half of the bed then remain nearly constant through the upper portion. As the flow rate increased, the point at which the concentration reached to near-equilibrium would rise higher in the bed, and eventually, at some higher flow rate, the liquid would exit the bed without having had sufficient time to approach equilibrium. At this point, flow rate would become a significant factor in phosphorus removal. As discussed under the results from the first stage, which was conducted at a flow rate half-way between the low and high flow rates here, the phosphorus concentration profile was observed to drop very fast to a near-constant level somewhere in the mid-portion of the bed. That observation provides evidence in favor of this explanation for the lack of flow rate effect.

The low p-values for block and quadratic block effects indicate differences among the blocks in TP and OP reductions. This result is consistent with the earlier-noted observation that phosphorus reductions were at times higher for blocks and 3. The differences among blocks cannot be attributed to any known variation; rather, it can be considered random experimental error resulting from differences in the raw liquid, sample handling, and/or sample testing among the blocks, each of which was conducted on a different day with a different batch of raw liquid. That there is variation among the blocks is not a surprise. The design of the experiment incorporated blocks in this fashion specifically to remove these day-to-day variations from the rest of the variability, thus revealing the effects of ammonia, Mg, and flow more sharply.

Equations (5) and (6) were used to predict the optimum levels of Mg and ammonia addition for, respectively, OP reduction and TP reduction. For OP reduction, the predicted optimum of 83.7% reduction is at 143 ppm ammonia addition and 68 ppm Mg addition. These are the values of AM and MG that yield zero values for the partial differentials of equation (5) with respect to AM and MG. Applying the same method to equation (6) produces a value of 150 ppm ammonia addition to optimize TPR reduction, but there is no value of MG that will yield a zero value for the partial differential of equation (6) with respect to MG. This result, which is expected because the equation is linear in MG rather than quadratic, means that equation (6) predicts no optimum amount of Mg addition; i.e., the trend of increasing TP removal with increases in Mg addition holds true at all levels of Mg addition. For ammonia addition at the optimum level and Mg addition at its highest tested value, equation (6) predicts TP removal of 59.0%, the highest predicted level in the tested addition ranges.

Care must be exercised in interpreting these optima because they apply specifically to the lagoon liquid tested. As a first approximation, 140 to 150 ppm ammonia may be predicted as the optimum level for TP and OP reduction in effluent from a typical North Carolina lagoon. However, differences in TAN and/or phosphorus concentrations, pH levels, or other variables could shift the optima. Moreover, Mg addition predicted optima must be viewed with caution because they lie outside the tested range, subject to effects not observed in the MVRs. Reduction in OP may not actually reach a maximum at 68 ppm Mg addition and then begin decreasing beyond that point. Other trends may prevail outside the tested range, resulting in a higher optimum. Likewise, trends not evidenced in the tested range may result in a non-infinite optimum in Mg addition for TP reduction.

The ammonia addition levels may be viewed as pH rises by one considering use of an alkali or alkaline substance other than ammonia. The peaks in TP and OP reduction are predicted at around 150 ppm ammonia addition. In the MVRs, 200 ppm addition was observed to produce pH rises of 1.2 to 1.3 points above the pH of the raw lagoon liquid, and 100 ppm resulted in rises of about 0.8 to 0.9 pH points. If one accepts an assumption that the effect of pH rise on phosphorus reduction will be the same regardless of what substance induces the pH rise, then phosphorus reductions near the maximum predicted in the MVR range would be expected when adding enough of the alternative alkali or alkaline substance to increase pH by an amount roughly mid-way between the two observed rises, or about 1.0 to 1.1 pH points.

IV. Experiments with Field-Scale Crystallizer
Design of the Field-Scale Crystallizer The continuous laboratory-scale crystallizer system, generally designated 100, for phosphorus removal was scaled up to a design useful for testing on a hog farm. The design is exhibited in FIG. 39 of the drawings, which is a schematic representation of the system showing principal components only. The lagoon pump 102 draws raw lagoon liquid through a foot valve 104 and pumps it through pressure regulators 106 to the bottom of the crystallizer cone 108 (the main cone) and to the bottom of dissolver cone 110. The lagoon liquid flowing toward the dissolver cone 110 receives a metered flow of $CO_2$ arriving from a pressurized tank 112 and passes through a float valve 114 before entering the dissolver cone 110. Mg solution overflows the dissolver cone 110, which is equipped with a ball valve and drain, into the surge tank 116. The Mg solution is moved from the surge tank 116 by the Mg pump 118 through a meter 120 into the bottom of the crystallizer cone 108, where it is injected into the raw lagoon liquid entering that cone. Ammonia being fed from a pressurized tank 122 through a meter also is injected at the bottom of the crystallizer cone 108. Treated liquid TL overflows from the top of the crystallizer cone 108. The crystallizer cone 108 is equipped with a product chamber and basket, and both cones have plug valves.

The preferred inverted cone-shape of crystallizer cone 108 is very important to the subject invention. The inverted cone-shape of crystallizer cone 108 serves to keep the very fine struvite particles in the bed and to prevent them from being swept out of the bed and lost with the liquid flowing over the top of cone 108. At the same time, the inverted cone-shape of crystallizer cone 108 also serves to keep the larger particles in the bed and growing. Keeping the small struvite particles in crystallizer cone 108 gives high surface area per volume which allows the struvite precipitator to be much smaller than it would otherwise be in order to work properly. Also, keeping the larger struvite particles is important since they can keep growing and this results in a more granular product which is easier to handle, de-water and dry.

While the preferred embodiment of crystallizer 108 envisions an inverted cone-shaped apparatus, it is understood that crystallizer 108 may comprise any such apparatus wherein the cross-sectional area thereof generally increases from a relatively smaller cross-sectional area at the bottom thereof to a relatively larger cross-sectional area at the top thereof. Non-limiting examples may further include an inverted pyramid or several cubes stacked upon one another in ascending volume order.

Additional descriptions of the main components are provided below. The capacity of the system, 117 gallons (gal) per h (443 L/h) of lagoon water, was estimated to accommodate one thousand hogs of 150 pounds (68 kg) each. The capacity estimate is equal to 7,850 gal (67,650 L) per week, the average weekly volume of manure slurry (feces, urine, and excess water) produced by that quantity of hogs in a flush system, inflated by 10% to allow for occasional interruptions in crystallizer operation. It was assumed that the crystallizer would treat only the stream of lagoon water going to irrigation, which would have to average the same volume rate as the manure slurry entering the system if there are no other net inflows. Water for flushing was assumed to be recycled from the lagoon, resulting in no net inflow for flushing.

Net rainfall (rainfall minus evaporation) was assumed to be zero to approximate the condition of a covered lagoon. For an open lagoon, the calculation would need to recognize net rainfall onto the lagoon. As an example, if 20,000 square ft (1,859 square meters, or $m^2$) of lagoon surface were attributed to the one thousand hogs, rainfall were estimated at 125 cm per year and evaporation at 100 cm per year, then an additional 15.3 gal per hour (58.0 L/h) of capacity would be needed. The additional capacity would amount to a 13% increase.

Dimensions of the Main Cone

The scaled-up capacity, 117 gal per h (443 L/h), is equal to nine times the flow rate at which the laboratory system operated during the testing in the first stage. Assuming the same particle size distribution in the bed material, the liquid upflow velocity needed to fluidize the bed to the same degree needs to be the same as that used in the laboratory cone. Because the upflow velocity varies inversely with the square of the diameter of the cone, a flow nine times greater in volume per time flowing through a cone three times the diameter will yield the same upflow velocity. Therefore, to achieve the same range in upflow velocity, the minimum and maximum diameters of the field scale unit would need to be triple those of the laboratory scale cone. Also, to approximate the same character of liquid flow in the cone, the pitch of the slope of the side would need to be the same. The result is that the field scale cone would measure 1.5 in. (3.81 cm) and 12 in. (30.5 cm). in. diameter at the bottom and top respectively and 47 in. (119.4 cm) in height.

Rather than targeting the same fluid flow characteristics as those observed in the laboratory, however, it was preferred to reduce the tendency toward channeling observed in the laboratory system. Because a more gradual increase in diameter with height was thought likely to reduce the tendency, two changes were made to reduce the pitch of the sides. First, the top diameter was reduced from 12 in. (30.5 cm) to 10 in. (25.4 cm), and second, the height was increased from 47 in. (119.4 cm) to 60 in. (152.4 cm).

The principal concern associated with these changes is that the narrowing of the cone and resulting increased upflow velocity at the cone top could elevate the bed top, risking overflow of bed material with the exiting liquid. However, the concern is ameliorated by three factors.

First, the changes increase the upflow velocity that at the top to the velocity that would otherwise have existed less than one-fifth of the way down into the cone. The bed top in the laboratory cone reached near this height only during periods of abnormal bed buildup due to lack of product discharge, a problem unlikely to arise in the field unit.

Second, according to the plug-flow liquid, mixed bed (PLMB) model, which best predicted the observed behavior of the laboratory unit, two-thirds less mass of bed material than that resulting from a volumetric scale-up of the cone and bed is required to achieve the lab-observed phosphorus reduction. According to the model, the extent of reaction will be the same if the surface area is increased in proportion to the liquid flow rate. Therefore, only nine times as much bed mass (assuming equal particle size distribution) is required because the flow is nine times greater, as opposed to a volumetric scale-up, which would require 27 times the bed mass (by cubing the one-dimensional scale-up factor of 3). Volumetric scale-up would result in a bed-top height in the field unit at about the same percentage of total cone height as observed in the laboratory unit. The scale-up by flow rate (factor of nine) results in a bed only one-third the mass, so its top height would be expected to be lower, because the bed height in the laboratory system was observed to lower with less bed mass. Therefore, the reduced bed mass in the field unit in comparison with the overall cone volume provides additional safety margin against bed material overflow resulting from reducing cone top diameter. In fact, bed mass could be allowed (and was allowed) to build beyond the factor of nine-that is, up to a point more than halfway up the cone, but not so high as to threaten overflow to achieve even greater contact time than that in the laboratory.

Third, the increase in cone height increases the cone volume, further reducing the height to which a bed of a given mass and density would fill the cone. The height of 60 in. (52.4 cm) was selected because it was judged to be the maximum that would still permit easy access to the cone top using a small stepladder.

MG Portion of the System

Figure 39:
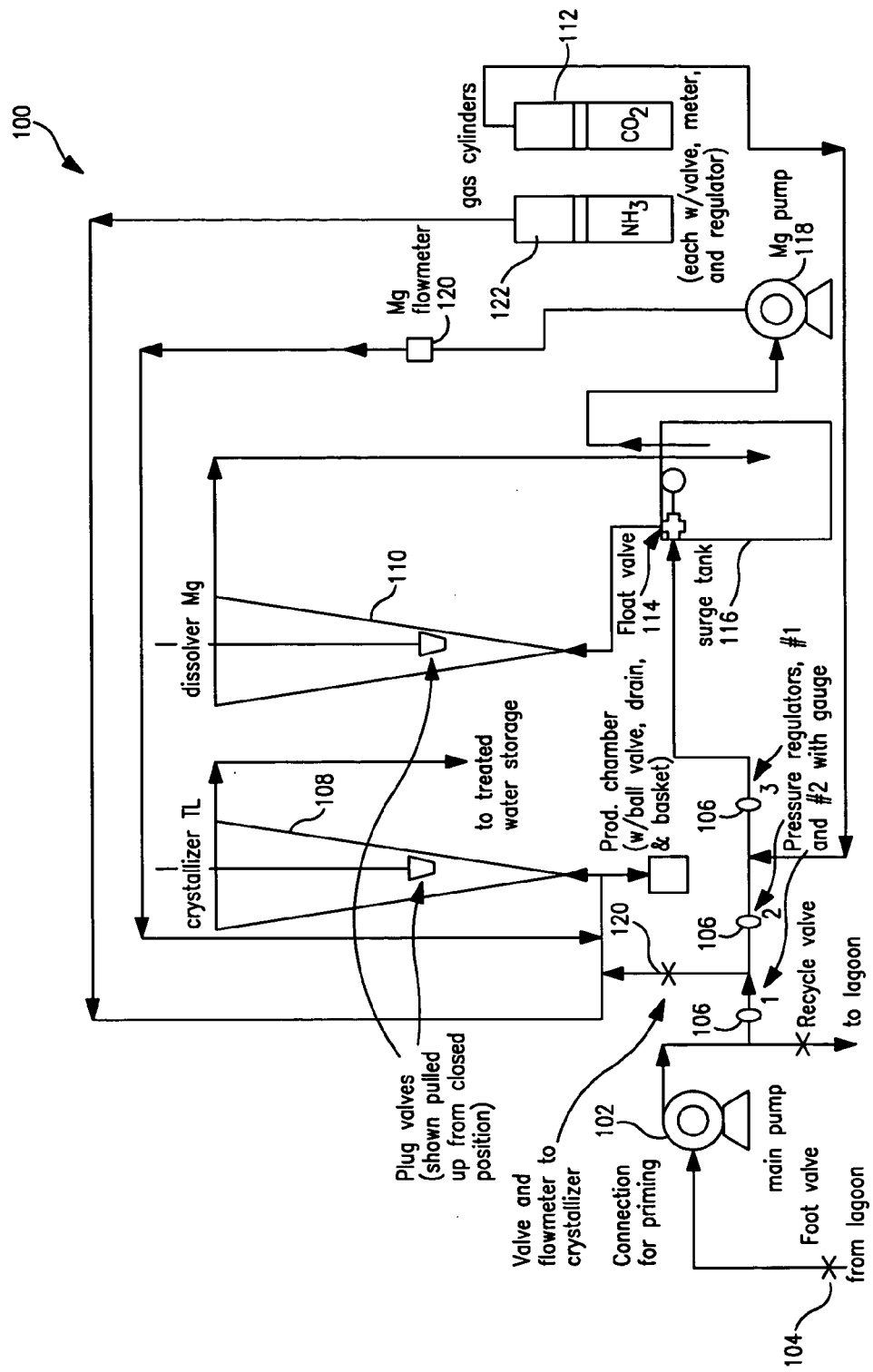
FIG. 39 is schematic diagram of a field-scale crystallizer according to the present invention.

The Mg portion of the system was designed around the process that the preliminary Mg test suggested was best suited for producing Mg-supplementing liquid; that is, infusion of a bed of feed-grade calcined magnesite with carbonated lagoon water. For flexibility and economy, a cone of the same dimensions as that used for the crystallizer was specified for this function in the field-scale system, As seen in FIG. 39, from the flow of lagoon liquid feeding the crystallizer, the design provided for drawing of a small stream of the liquid, mixing it with $CO_2$ flowing from a pressurized cylinder, and feeding it into the bottom of the Mg dissolving cone ("dissolver"). In the cone, it flows through the magnesite bed, and then overflows into a tank from which it is fed into the bottom of the crystallizer.

The Mg portion of the system can also accommodate brine of magnesium chloride or other Mg salts as the Mg source. In this case, the brine is placed in the overflow tank and then fed into the crystallizer in the same manner as would carbonated, magnesite-exposed lagoon water.

Other Aspects of the Cones

Both cones were equipped with plug valves, easily accessed and operated from the cone top. These valves permit operators to close the bottom of each cone easily to support the bed when the liquid flow is shut off. Both cones were manufactured to specifications by laying up unsaturated polyester resin with fiberglass reinforcing. Ultraviolet (UV) stabilizers were incorporated to reduce degradation induced by sunlight. Fiberglass was applied in a manner preserving as much transparence as possible, to permit easier viewing of the bed top and bed behavior. Flexible drain piping was adapted to the flange on the overflow connection on both cones. The cones were supported by an aluminum framework provided with rubber cushions at the contact points.

The crystallizer cone was designed with a stainless steel product chamber having an acrylic window on one side and a removable door on the other. A stainless steel product collector basket was designed in such a way as to allow being placed into and removed from the chamber through the removable door and viewed through the window.

Ammonia Delivery

The ammonia delivery into the crystallizer cone bottom was also specified to be accomplished through feed from a pressurized cylinder. A perforated bell attachment for the exit end of the ammonia delivery tube was provided to diffuse tile ammonia into small bubbles, thus, encouraging faster dissolution and pH reduction.

Standard Components

The remaining components, necessary for transporting and controlling the flows of the liquids and gases, were more common items and therefore could be specified as stock items from manufacturers. The most important of these were pumps, conduits, valves, meters, pressure regulators, and strainers.

Two pumps were specified. The main liquid pump is a centrifugal pump of the type used for water wells. This design is appropriate for drawing liquid from a level below the pump, which is the case here. The pump for feeding liquid from the Mg tank is a variable speed gear pump, suitable for maintaining rather low flows of liquid at a specified level.

The conduits for the lagoon liquid and Mg solution were PVC pipe where rigid conduit was acceptable, and high-pressure rubber hose where flexibility and ability for easy disconnect and reconnect were required. The gases flowed through high-pressure tubing made of UV-stabilized linear low-density polyethylene.

Valves for the liquids were placed at crucial points for controlling flow and isolating components when necessary. The valves were threaded-stem gate valves except for two ball valves in piping under the cones, where quicker activation may be necessary Valves for the gases were of standard type for pressurized gases and were incorporated into the gas pressure regulators and meters, discussed below. A float valve was used on the Mg tank for maintaining a proper level. A check valve was provided at the bottom of the dissolver to prevent backflow during periods of operation when Mg solution flow was low or zero to prevent overfilling of the Mg tank. A check valve was also provided at the intake in the lagoon to retain liquid in the suction line while the system is shut down, thus obviating the need to re-prime the main pump each time the system is re-started.

Two liquid flow meters of the float-and-tube type were used. One indicated the flow rate of raw lagoon liquid into the crystallizer, and the other indicated the flow rate of Mg solution into the crystallizer. Two gas flow meters were used—one on the ammonia and the other on the $CO_2$. Both incorporated a floating ball-in-tube for flow indication and a needle valve for flow control.

Two pressure regulators were used for the feeding of raw lagoon liquid. One regulator stepped the pressure down from the lagoon pump discharge pressure to a lower, constant pressure to allow easier control over the flow rate into the crystallizer with a simple gate valve and flow meter. The other regulator stepped the pressure down further to that required for accepting the $CO_2$ feed. The $CO_2$ and ammonia cylinders were each fitted with a pressure regulator to reduce the pressure from that in the tank to the constant, lower pressure required downstream.

A coarse strainer was provided at the end of the hose drawing liquid from the lagoon. Finer strainers were provided just upstream of each liquid pressure regulator.

Results

Results for the test runs and the factorial experiments are reported below. In the test runs, the raw lagoon water ranged in pH from 7.84 to 8.25 and contained 40–49 ppm Mg, 107–123 ppm TAN, 22–30 ppm OP, and 54–69 ppm TP. In the factorial experiments, it ranged in pH from 7.69 to 7.72 and contained 53–66 ppm Mg, 176–180 ppm TAN, 38–46 ppm OP, and 82–93 ppm TP.

Test Runs

The system was operated in fifteen test runs, each lasting 0.5 to 29.5 h. These runs aimed to test whether the system would operate as planned, to develop ability to run smoothly in preparation for factorial experiments, and to obtain some limited data on variation of phosphorus reduction performance with Mg and ammonia addition. The results of the test runs are summarized in Table 16.

added, with TAN in raw liquid ranging from 107 to 124 ppm and ranging from 140 to 175 ppm in the treated liquid.

Samples of the raw liquid, treated liquid, and Mg solution were collected at times evenly spaced out across each run. The samples were blended into one sample for each run (with the exception of run 8, for which two blended samples were produced) and analyzed for TAN, TP, OP, and Mg. Analysis results for run 8 appearing in Table 16 are the average of the two blended samples.

In the 11 runs with ammonia and Mg both flowing, TP reduction ranged from 25% to 68%, with 7 runs achieving greater than 50% reduction. When ammonia or Mg or both were off, TP reduction ranged from 4% to 53%. In 8 of the 11 runs with ammonia and Mg flowing, the TP reduction was greater than can be explained solely by precipitation of dissolved OP. In these cases, the percentage reduction in TP exceeded the percentage of TP accounted for by OP in the raw liquid, sometimes by wide margins. For example, in test runs 4 and 5, only 39% and 37%, respectively, of the TP in the raw liquid is accounted for by OP, but TP reduction was 68% and 66%, respectively. This comparison suggests, as

TABLE 16

Results from Test Runs with Field-Scale System

| Run # | Duration (h) | Total Phosphorus (TP) | | | Orthophosphate Phosphorus (OP) | | | Bed height (cm) | | Product removed (kg) | Estimated Mg added (ppm) |
|---|---|---|---|---|---|---|---|---|---|---|---|
| | | Raw (ppm) | Treated (ppm) | Reduction | Raw (ppm) | Treated (ppm) | Reduction | Begin | end | | |
| 1 | 1 | 62.4 | 33.3 | 47% | 29.4 | 20.2 | 31% | 90 | 90 | 0 | 29 |
| 2 | 4.5 | 56.3 | 25.9 | 54% | 25.4 | 15.4 | 39% | 90 | 86 | 0 | 60 |
| 3 | 6 | 63.1 | 31.2 | 51% | 29.1 | 14.5 | 50% | 86 | 86 | 0 | 46 |
| 4 | 5 | 68.7 | 21.9 | 68% | 27 | 17.8 | 34% | 86 | 90 | 0 | 33 |
| 5 | 4 | 59 | 20.3 | 66% | 22.1 | 16.7 | 24% | 90 | 97 | 0.66 | 28 |
| 6 | 4 | 58 | 27.5 | 53% | 25.4 | 19.7 | 22% | 88 | 93 | 0 | 24 |
| 7 | 6 | 57.7 | 28 | 51% | 22.2 | 16.7 | 25% | 93 | 98 | 0 | 19 |
| 8 | 29.5 | 60.2 | 27.1 | 55% | 25.2 | 16.3 | 35% | 98 | 112 | 3.42 | 7 |
| 9 | 24 | 54.1 | 40.8 | 25% | 25.7 | 16.4 | 36% | 80 | 119 | 1.6 | 10 |
| 10 | 5 | 54.6 | 37.3 | 32% | 29.7 | 13.4 | 55% | 114 | 116 | 0 | 11 |
| 11 | 6.4 | 59.5 | 38.2 | 36% | 33.6 | 14 | 58% | 116 | 117 | 0 | 11 |
| 12* | 2 | 61.5 | 46.2 | 25% | 27.2 | 15.2 | 56% | 116 | 115 | 0 | 20 |
| 13 | 1.5 | 60.4 | 28.6 | 53% | 30.3 | 13.1 | 57% | 115 | 114 | 0 | Off |
| 14* | 2.8 | 61.6 | 58.7 | 5% | 28 | 25.5 | 9% | 114 | 113 | 0 | Off |
| 15* | 0.5 | 65.2 | 62.6 | 4% | 27.7 | 23.8 | 14% | 117 | 117 | 0 | 17 |

*Ammonia was off for runs 12, 14, and 15.

The crystallizer was initially loaded with a small bed, consisting of 2.1 pounds (0.95 kg) of product from the laboratory-scale crystallizer. During the first 9 runs, product was removed at the end of a run if the level had risen to two-thirds the height of the crystallizer, to lessen the risk of bed carry-over into the treated liquid. Also, if the bed had become heavy enough that channeling was observed, product was drained to achieve more homogeneous fluidization. In the remaining runs, the bed was allowed to build to around 75% of the crystallizer height, and no channeling was observed.

For the first eleven runs, the targeted Mg supplementation was 30 ppm and ammonia was added to raise pH 0.75 points. For runs 12 and 15, ammonia was turned off while Mg continued; for run 13, Mg was off while ammonia flowed; and for run 14, both were turned off. Augmentation in TAN averaged 40 to 45 ppm as nitrogen when ammonia was being did similar comparisons on results with the laboratory-scale unit, that another phosphorus removal mechanism may occur.

The system operated in general as planned; however, fluctuations in pH and Mg flow, possibly causing the inconsistencies observed in phosphorus reduction, were experienced. The fluctuations were traced to two difficulties that needed to be addressed.

First, scaling of the diffusing bell, through which the ammonia flowed into the lagoon liquid at the dissolver bottom, obstructed the flow of the ammonia. To maintain the target pH rise, the ammonia pressure needed to be continually raised to compensate for the obstruction. Eventually, obstruction was complete and no ammonia could flow. The obstructed bell was replaced with a clean one, but the scaling occurred again. To solve the problem, the bell was removed, leaving a plain-ended tube to admit the ammonia to the liquid. Despite the absence of the diffusing bell, the ammonia dissolved well into the liquid, and the system was therefore operated without it.

The other problem was that the Mg-dissolving system proved difficult to control closely. The regulator controlling the liquid pressure to the carbonating area operated unsteadily, slowing and speeding the flow over cycles lasting an hour or more, rather than reaching and holding a steady flow. The flow cycling resulted in cycling of pH in the liquid entering the dissolver and thus also in Mg content of the Mg-supplementing liquid. The system was designed to achieve about 300 ppm Mg in the supplementing solution, but through the test runs the actual content achieved ranged from 68 to 599 ppm. This fluctuation resulted in actual supplementation ranging from 7 to 60 ppm. The Mg system was operated in this manner through the test runs, and with some improvements could suffice in the future for extended operation where fine control, as for experimentation, is not required. However, it was decided after completing the test runs that, to achieve fine control for the factorial experiment to follow, Mg solution would be made by mixing Mg chloride into lagoon liquid in the Mg surge tank and fed with the Mg pump and flowmeter at the flow rate required to achieve prescribed levels of Mg supplementation in the crystallizer.

Factorial Experiment Methods

An experiment was conducted to test the extent of phosphorus removal at three Mg addition rates (addition of 0, 30, and 60 ppm), addition of ammonia to raise pH by three increments (none, 0.5 point rise, and 1.0 point pH rise), and two liquid flow rates (90 gal, or 341 L, per h; and 150 gal, or 568 L, per h). The experiment was organized into a randomized complete block design, with each block being conducted on a separate day.

In each block, the system was run in all eighteen combinations (in random order) of the levels of the three variables. For each combination, the levels were set and the crystallizer allowed to run through at least two residence times to ensure changes resulting from setting the levels had worked through the system. Then a sample of the treated liquid was collected for TP and OP analysis. During each block, samples of the raw liquid were also taken and blended into a single large sample representing the raw liquid for that block.

Product was removed between blocks to keep the bed height nearly constant. Bed height ranged from 97 to 108 cm at the lower liquid flow rate and from 110 to 119 cm at the higher flow rate. Mg addition was by magnesium chloride solution, made by mixing magnesium chloride solid into lagoon liquid in the surge tank and acidifying with sufficient HCl to keep pH below 6.7 to avoid struvite precipitation in the tank. The solution was fed by the Mg pump, using the Mg flow meter to achieve the flow rate required for the prescribed Mg addition level. Ammonia was admitted into the liquid through a plain-ended tube with no diffusing bell.

Results

Operation was smooth through all three blocks, and pH and Mg flow were well controlled. Ammonia addition in ppm TAN was not monitored. However, the ammonia flow meter settings required to achieve the pH reductions were in the same range as those observed in the test run, when 50 to 100 ppm TAN of ammonia addition was achieved. Reduction in TP ranged from −4.9% to 81.9%, and reduction in OP ranged from 3.7% to 87.1%. When ammonia and Mg were being added, TP reduction averaged 70.2% and OP reduction averaged 77.3%. Again, the degree of TP reduction cannot be explained solely by dissolved OP precipitation, because OP constituted only 64% of the TP in the raw liquid, on average. Table 17 shows the TP and OP content of the raw liquid for each block and the reduction from those levels achieved at each condition set.

TABLE 17

Detailed Results from Factorial Experiment with Field-Scale System

| Raw Liquid | | BLOCK 1 | | BLOCK 2 | | BLOCK 3 | |
|---|---|---|---|---|---|---|---|
| | | TP | OP | TP | OP | TP | OP |
| pH rise | Mg added | 91.8 ppm | 54.7 ppm | 85.9 ppm | 53.6 ppm | 87.7 ppm | 61.4 ppm |
| Reductions in treated liquid at 90 gal/h (341 L/h) | | | | | | | |
| None | None | −0.9% | 16.8% | −4.9% | 4.7% | 6.6% | 16.8% |
| None | 30 ppm | 15.1% | 20.3% | 19.9% | 15.7% | 9.1% | 32.1% |
| None | 60 ppm | 12.5% | 24.3% | 29.2% | 17.0% | 28.4% | 31.9% |
| 0.5 | None | 57.1% | 61.6% | 61.0% | 53.2% | 60.2% | 67.3% |
| 0.5 | 30 ppm | 61.0% | 73.5% | 70.4% | 67.7% | 77.2% | 78.0% |
| 0.5 | 60 ppm | 68.3% | 77.7% | 63.6% | 81.2% | 74.1% | 87.1% |
| 1.0 | None | 64.7% | 66.9% | 62.8% | 66.2% | 65.1% | 69.9% |
| 1.0 | 30 ppm | 81.9% | 79.0% | 76.4% | 72.4% | 81.3% | 81.8% |
| 1.0 | 60 ppm | 70.4% | 78.4% | 78.5% | 71.8% | 68.6% | 77.8% |
| Reductions in treated liquid at 150 gal/h (568 L/h) | | | | | | | |
| None | None | 8.7% | 9.9% | 9.4% | 3.7% | 1.6% | 24.3% |
| None | 30 ppm | 12.3% | 15.7% | 9.8% | 14.7% | 13.9% | 34.5% |
| None | 60 ppm | 9.2% | 20.7% | 5.4% | 23.7% | 29.0% | 37.3% |
| 0.5 | None | 36.9% | 50.6% | 35.8% | 49.6% | 52.9% | 67.8% |
| 0.5 | 30 ppm | 50.5% | 61.4% | 69.7% | 70.2% | 69.6% | 80.0% |
| 0.5 | 60 ppm | 63.4% | 78.1% | 63.9% | 75.6% | 74.5% | 81.4% |

TABLE 17-continued

Detailed Results from Factorial Experiment with Field-Scale System

| Raw Liquid | | BLOCK 1 | | BLOCK 2 | | BLOCK 3 | |
|---|---|---|---|---|---|---|---|
| | | TP | OP | TP | OP | TP | OP |
| pH rise | Mg added | 91.8 ppm | 54.7 ppm | 85.9 ppm | 53.6 ppm | 87.7 ppm | 61.4 ppm |
| 1.0 | None | 55.8% | 61.6% | 66.4% | 60.4% | 66.9% | 70.0% |
| 1.0 | 30 ppm | 72.6% | 79.9% | 71.0% | 77.6% | 80.5% | 86.4% |
| 1.0 | 60 ppm | 71.2% | 81.2% | 73.5% | 74.8% | 74.1% | 82.9% |

Figure 40:
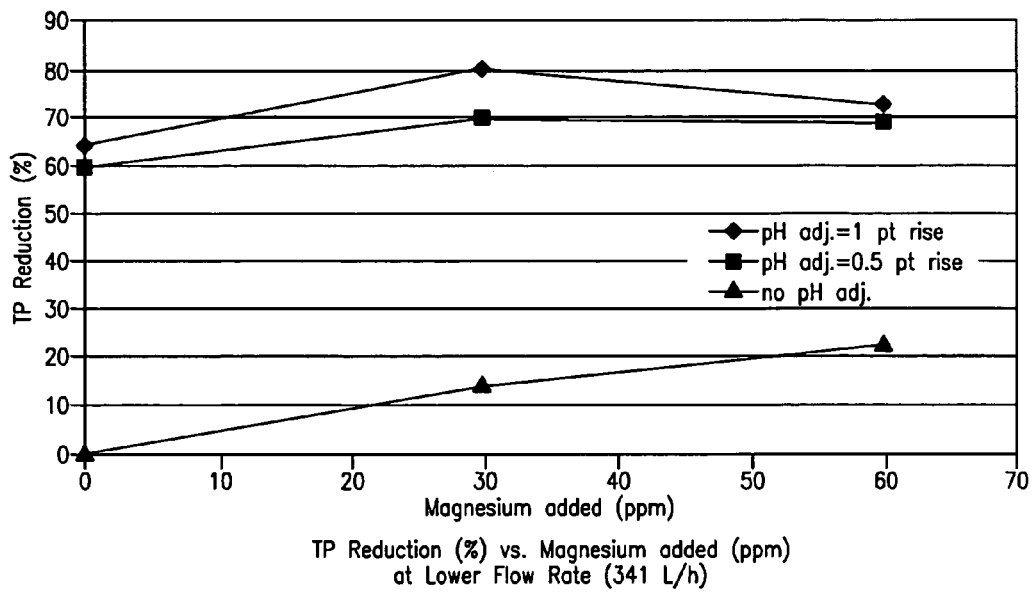
FIG. 40 is a chart showing TP reduction versus magnesium added at lower flow rate (341 L/h)
Figure 41:
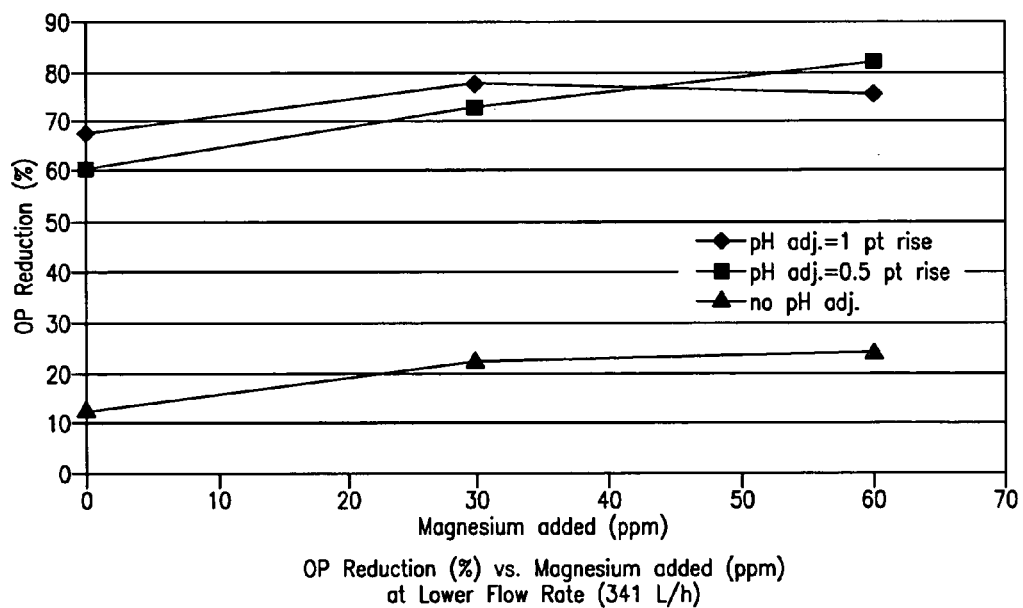
FIG. 41 is a chart showing OP reduction versus magnesium added at lower flow rate (341 L/h)
Figure 42:
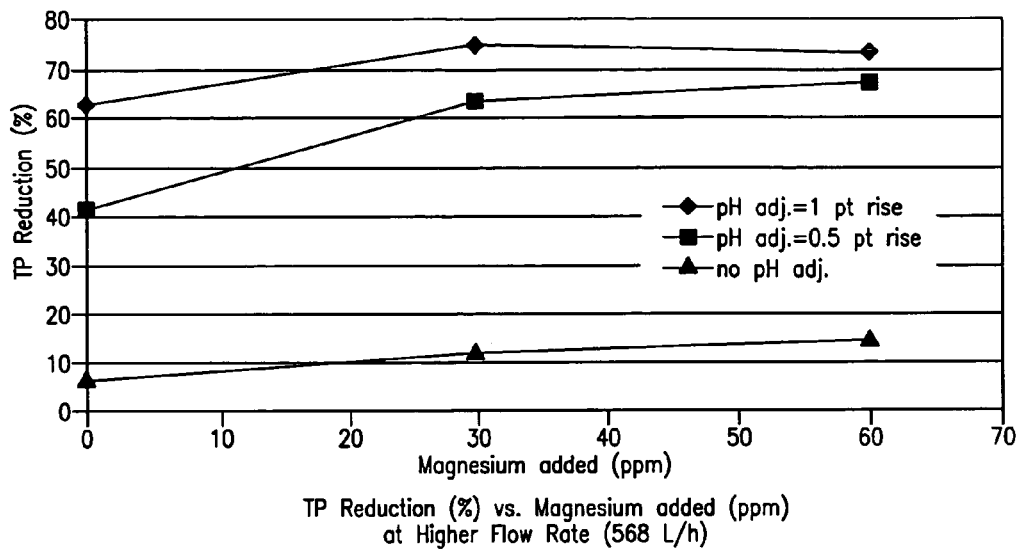
FIG. 42 is a chart showing TP reduction versus magnesium added at higher flow rate (568 L/h)
Figure 43:
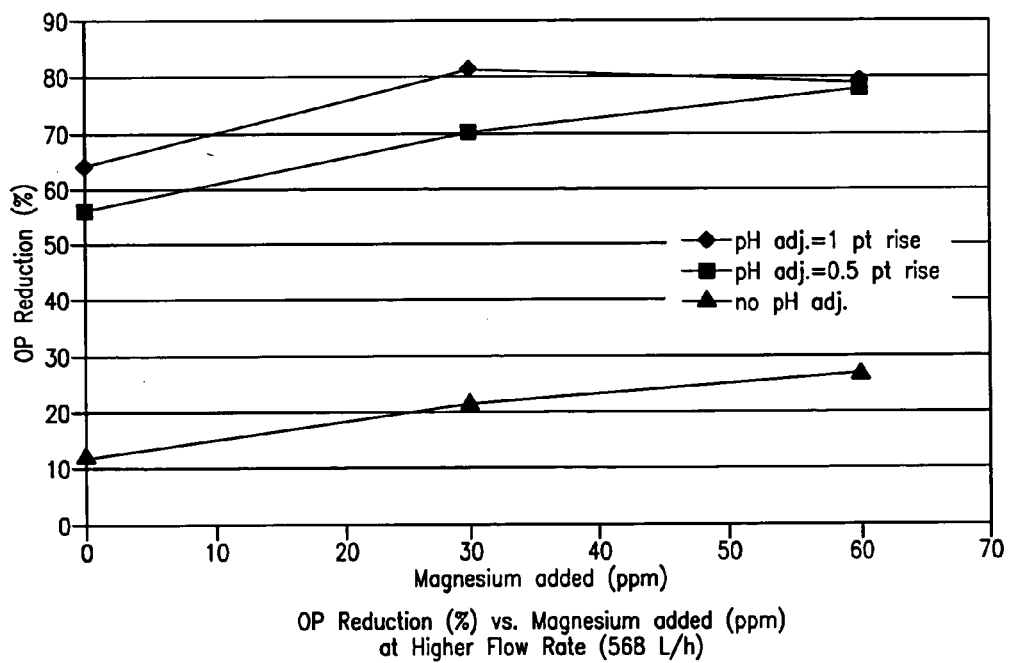
FIG. 43 is a chart showing OP reduction versus magnesium added at higher flow rate (568 L/h).

FIGS. 40 through 43 summarize the data graphically. FIG. 40 shows, for the lower liquid flow rate, TP reduction versus amount of Mg added for the three pH adjustment levels, while FIG. 41 shows OP reduction for the same conditions. FIGS. 42 and 43 show the data for the higher flow rate. In the figures, each point represents the average of all three results (one from each block) for the specified condition set (liquid flow rate, pH adjustment level, and Mg addition rate).

The data were also analyzed statistically by conducting analyses of variance and regressions. Table 18 shows the results of a complete analysis of variance, treating TP reduction as the dependent variable.

TABLE 18

Analysis of Variance for Field-Scale TP Reduction, Including All Effects of Independent Variables
(significant effects, with p-value 0.02 or less, indicated in bold type)

| Source | Sum of Squares | Degrees of Freedom | Mean Square | F value | p-value |
|---|---|---|---|---|---|
| Block | 419.6 | 1 | 419.6 | 12.3 | 0.0013 |
| Block × block | 4.0 | 1 | 4.0 | 0.1 | 0.7354 |
| Ammonia | 31648.4 | 1 | 31648.4 | 926.1 | <0.0001 |
| Flow | 220.4 | 1 | 220.4 | 6.4 | 0.0158 |
| Magnesium | 1759.8 | 1 | 1759.8 | 51.5 | <0.0001 |
| Ammonia × magnesium | 62.1 | 1 | 62.1 | 1.8 | 0.1866 |
| Flow × magnesium | 1.7 | 1 | 1.7 | 0.0 | 0.8231 |
| Ammonia × flow | 0.1 | 1 | 0.1 | 0.0 | 0.9549 |
| Ammonia × ammonia | 4856.2 | 1 | 4856.2 | 142.1 | <0.0001 |
| Magnesium × Magnesium | 450.2 | 1 | 450.2 | 13.2 | 0.0009 |
| Ammonia × ammonia × magnesium | 50.0 | 1 | 50.0 | 1.5 | 0.2348 |
| Ammonia × ammonia × flow | 128.9 | 1 | 128.9 | 3.8 | 0.0604 |
| Ammonia × magnesium × magnesium | 96.6 | 1 | 96.6 | 2.8 | 0.1019 |
| Ammonia × flow × magnesium | 105.0 | 1 | 105.0 | 3.1 | 0.0886 |
| Flow × magnesium × magnesium | 3.0 | 1 | 3.0 | 0.1 | 0.7676 |
| Ammonia × ammonia × magnesium × magnesium | 5.6 | 1 | 5.6 | 0.2 | 0.6880 |
| Ammonia × ammonia × flow × magnesium | 263.0 | 1 | 263.0 | 7.7 | 0.0089 |
| Ammonia × flow × magnesium × magnesium | 5.7 | 1 | 5.7 | 0.2 | 0.6864 |
| Ammonia × ammonia × flow × magnesium × magnesium | 26.7 | 1 | 26.7 | 0.8 | 0.3826 |
| Error | 1161.9 | 34 | 34.2 | — | — |

The analysis included the effects of the three independent variables (flow rate; Mg level; and pH level, identified as "ammonia" in the tables) as well as all quadratic and interaction effects of the independent variables. Table 19 shows the results of an analysis of variance, including only the effects that complete analysis indicated were significant. Table 20 shows the results of a regression of TP reduction against those effects. Tables 21, 22, and 23 present the results of the same analyses, treating OP as the independent variable rather than TP reduction.

TABLE 19

Analysis of Variance for Field-Scale TP Reduction, Including Only the Significant Effects of the Fixed Independent Variables

| Source | Sum of Squares | Degrees of Freedom | Mean Square | F value | p-value |
|---|---|---|---|---|---|
| Ammonia | 31648.4 | 1 | 31648.4 | 650.9 | <0.0001 |
| Flow | 220.4 | 1 | 220.4 | 4.53 | 0.0384 |
| Magnesium | 1759.8 | 1 | 1759.8 | 36.19 | <0.0001 |
| Ammonia × ammonia | 4856.2 | 1 | 4856.2 | 99.87 | <0.0001 |
| Magnesium × magnesium | 450.2 | 1 | 450.2 | 9.26 | 0.0038 |
| Error | 2333.9 | 48 | 48.6 | — | — |

TABLE 20

Regression of Field-Scale TP Reduction Against Significant Effects of the Fixed Independent Variables

| Parameter | Estimate | Standard Error of Estimate |
|---|---|---|
| Intercept | 10.95 | 4.348 |
| Ammonia | 139.77 | 8.381 |
| Flow | −0.0673 | 0.032 |
| Magnesium | 0.641 | 0.140 |

TABLE 20-continued

Regression of Field-Scale TP Reduction Against Significant
Effects of the Fixed Independent Variables

| Parameter | Estimate | Standard Error of Estimate |
|---|---|---|
| Ammonia × ammonia | −80.46 | 8.052 |
| Magnesium × magnesium | −0.00681 | 0.002 |

TABLE 21

Analysis of Varianc for Field-Scale OP Reduction, Including All
Effects of Independent Variables
(Significant effects, with p-value 0.02 or less, indicated in bold type)

| Source | Sum of Squares | Degrees of Freedom | Mean Square | F value | p-value |
|---|---|---|---|---|---|
| Block | 622.5 | 1 | 622.5 | 40.5 | <0.0001 |
| Block × block | 647.8 | 1 | 647.8 | 42.2 | <0.0001 |
| Ammonia | 26400.8 | 1 | 26400.8 | 1717.9 | <0.0001 |
| Flow | 5.4 | 1 | 5.4 | 0.4 | 0.5567 |
| Magnesium | 2202.7 | 1 | 2202.7 | 143.3 | <0.0001 |
| Ammonia × magnesium | 1.9 | 1 | 1.9 | 0.1 | 0.7255 |
| Flow × magnesium | 32.1 | 1 | 32.1 | 2.1 | 0.1575 |
| Ammonia × flow | 0.9 | 1 | 0.9 | 0.1 | 0.8100 |
| Ammonia × ammonia | 6239.6 | 1 | 6239.6 | 406.0 | <0.0001 |
| Magnesium × magnesium | 230.0 | 1 | 230.0 | 15.0 | 0.0005 |
| Ammonia × ammonia × magnesium | 172.4 | 1 | 172.4 | 11.2 | 0.0020 |
| Ammonia × ammonia × flow | 60.3 | 1 | 60.3 | 3.9 | 0.0557 |
| Ammonia × magnesium × magnesium | 45.8 | 1 | 45.8 | 3.0 | 0.0935 |
| Ammonia × flow × magnesium | 7.0 | 1 | 7.0 | 0.5 | 0.5030 |
| Flow × magnesium × magnesium | 2.6 | 1 | 2.6 | 0.2 | 0.6827 |
| Ammonia × ammonia × magnesium × magnesium | 20.4 | 1 | 20.4 | 1.3 | 0.2572 |
| Ammonia × ammonia × flow × magnesium | 8.3 | 1 | 8.3 | 0.5 | 0.4683 |
| Ammonia × flow × magnesium × magnesium | 18.0 | 1 | 18.0 | 1.2 | 0.2868 |
| Ammonia × ammonia × flow × magnesium × magnesium | 0.7 | 1 | 0.7 | 0.0 | 0.8282 |
| Error | 522.5 | 34 | 15.4 | — | — |

TABLE 22

Analysis of Varianc for Field-Scale OP R duction, Including Only
the Effects Indicated as Significant in the Complete Analysis

| Source | Sum of Squares | Degrees of Freedom | Mean Square | F value | p-value |
|---|---|---|---|---|---|
| Ammonia | 26400.8 | 1 | 26400.8 | 591.09 | <0.0001 |
| Magnesium | 2202.7 | 1 | 2202.7 | 49.32 | <0.0001 |
| Ammonia × ammonia | 6239.6 | 1 | 6239.6 | 139.70 | <0.0001 |
| Magnesium × magnesium | 230.0 | 1 | 230.0 | 5.15 | 0.0278 |
| Ammonia × ammonia × magnesium | 2407 | 1 | 24.7 | 0.55 | 0.4603 |
| Error | 2143.9 | 48 | 44.7 | — | — |

TABLE 23

Regression of Field-Scale OP Reduction Against the Effects
Indicated as Significant in the Complete Analysis

| Parameter | Estimate | Standard Error of Estimate |
|---|---|---|
| Intercept | 10.13 | 2.308 |
| Ammonia | 145.37 | 8.032 |
| Magnesium | 0.580 | 0.139 |
| Ammonia × ammonia | −89.26 | 8.150 |
| Magnesium × magnesium | −0.00486 | 0.00214 |
| Ammonia × ammonia × magnesium | −0.0650 | 0.0874 |

Trends can be discerned in FIGS. 40 through 43. These trends often can be identified in the statistical analyses, also.

In each of the four figures, it can be seen from the way the three lines stack that increasing the pH adjustment level increases the phosphorus removal. This trend appears in Tables 18, 19, 21, and 22 in the form of low p-values for the effect of ammonia, indicating that the effect is significant. It appears in Tables 20 and 23 in the form of positive estimates for regression coefficients, indicating the correlation is positive. The effect in going from zero pH adjustment to 0.5 pH points, however, is much greater than the effect seen in going the remaining step, to the highest pH level. This attribute, which may be interpreted as a "diminishing return" on ammonia addition, causes the top line in each figure to be closer to the middle line than is the bottom line. This phenomenon can be seen in Tables 18, 19, 21, and 22 as low p-values for the quadratic effect of ammonia (ammonia×ammonia), indicating that the effect is significant, and in Tables 20 and 23 in the form of negative estimates for the regression coefficients, indicating the effect is negative.

Similar phenomena for Mg can be seen by comparing among Mg levels. The phosphorus reduction generally increases as Mg addition increases, and the effect is greater in going from the lowest Mg level to the middle level than in going from the middle to the highest level. These attributes cause each line to rise toward the right overall, but to rise more sharply in going from zero to the middle Mg level than they do in going from the middle to the highest Mg level. The statistical tables reflect these trends for Mg in the same way they reflected the ammonia trends.

Another trend, most pronounced in the OP figures (FIGS. 41 and 43), is that the tendency for the middle line to be closer to the top line than to the bottom line is strongest at the right side of the graphs. This attribute means that the return (in the form of additional OP reduction) gained for adding more ammonia diminishes more severely at higher Mg levels. In FIG. 41, the middle line even crosses the top line at the right side of the graph. This characteristic can also be seen in Table 21 in the form of a p-value low enough to indicate significance for the quadratic ammonia by Mg (ammonia×ammonia×Mg) effect. This trend, however, is the weakest (has the highest p-value) of those indicated as significant by the complete analysis of variance for OP reduction, and is not even indicated as being significant in the complete analysis for TP reduction. Furthermore, in the analysis of variance for OP reduction, using only the effects indicated as significant in the complete analysis, the (ammonia×ammonia×Mg) effect no longer shows up as a significant effect.

The practical implication of the simple and quadratic effects of ammonia and Mg is that adding more of either will improve the phosphorus removal, but the improvement slows, stops, or even reverses itself beyond a certain point. The analysis suggests there may be a maximum reduction, possibly around 80 to 85% for TP and 85 to 90% for OP, that cannot be surpassed. Reductions near the maxima may be achieved by adding moderate amounts of Mg and ammonia, but additional gains will be comparatively small regardless of how much additional Mg and ammonia are added.

It can be seen in comparing FIGS. 40 and 42 that higher TP reductions were achieved at the lower liquid flow rate. This difference is reflected in Table 18 by the low p-value for flow, indicating that flow does have a significant effect on TP reduction. The effect of flow is not significant for OP reduction. Because TP is the parameter of interest for waste treatment and environmental protection, the practical implication is that a flow rate nearer the lower rate used in this experiment may be preferred where high phosphorus removal is required. Because only two flow rates were tested, it is impossible to conclude from the experiment whether the optimum flow rate is below the lower rate tested or between the two rates tested.

Table 18 shows a low p-value for the effect of blocks and Table 21 shows low p-values for the block and quadratic block effects. These effects are not discernible in FIGS. 40 through 43 because the effects constitute differences in phosphorus reduction among blocks, and in the figures show only data that are averaged across the three blocks. The low p-values for the effects indicate that the reduction, averaged across all eighteen condition sets, varied significantly among the three days on which the experiment was conducted. The difference may have resulted from day-to-day differences in weather, phosphorus content of the raw liquid, some unidentified condition that varies from day to day, or some combination of these factors. The variation can be regarded as a random effect, because there is no known controllable parameter of interest that was set at a different level for each block.

The regressions summarized in Tables 20 and 23 for TP and OP reduction, respectively, can be rendered as equations:

$$TPR = 11.0 + 140(AP) - 0.0673(FL) + 0.641(MG) - 80.5(AP)^2 - 0.00681(MG)^2 \quad (7)$$

and $$OPR = 10.1 + 145(AP) + 0.580(MG) - 89.3(AP)^2 - 0.00486(MG)^2 - 0.0650(AP)^2(MG), \quad (8)$$

where TPR is the percent reduction in TP, OPR is the percent reduction in OP, AP is the amount of pH adjustment by ammonia addition, FL is the liquid flow rate in the crystallizer expressed in gal/h, and MG is the amount of Mg added expressed in ppm.

The (ammonia×ammonia×Mg) effect, which was indicated as significant in only one of the two analyses of variance treating OPR as the independent variable, can be seen in equation (8) to contribute a relatively small effect to OPR. Throughout the range tested, its contribution to the predicted OPR ranges from zero to only 3.9%.

Equation (7) can be optimized to find the conditions needed to yield the highest predicted reduction in TP. Differentiating the equation with respect to AP, FL, and MG reveals the optimum conditions to be ammonia addition to achieve 0.87 points of pH rise and Mg addition of 47 ppm. The equation is linear with respect to FL, with a negative coefficient, and therefore the optimum with respect to flow is at its lowest possible value, which is zero. Because there are no interaction terms, at any given non-zero flow, the optimum with respect to the other variables remains 0.87 pH rise and 47 ppm Mg addition. The predicted TP reduction at the optimum is 87.0%. However, this optimum is at zero flow, which is outside the tested range. The greatest predicted TP removal within the range tested would be at the same values of ammonia and Mg, with flow at the lowest tested (90 gal/h, or 341 L/h). At this set of conditions, predicted TP reduction is 80.9%.

Equation (8) can be optimized to find the conditions needed to yield the highest predicted reduction in OP. The optimum point, defined only by ammonia and Mg addition since flow is not a factor in the equation, is at 55 ppm Mg addition and ammonia addition to achieve a pH rise of 0.78. This optimum, which is within the range tested, yields a predicted OP reduction of 83.9%.

V. Operation of the Field-Scale Crystallizer

The following are general procedures for stating up and shutting down the field-scale system and for removing product Starting Up To begin, open the valve on the line that recycles back to the lagoon at the discharge of the raw lagoon water pump. If the system has been idle long enough for liquid to drain through the foot valve in the pump suction line, it will be necessary to prime the pump by filling the suction line with water at one of the connections near the pump. Start up the pump, and once strong, constant flow out the recycle line is observed, the valve on the line into the crystallizer can be opened. If the plug valve at the crystallizer has been firmly seated into the cone bottom, it will have to be loosened or removed to allow flow through the crystallizer. The valve on the recycle line can then be closed enough to raise the pressure on the pump discharge gauge to about 60 psi, which is 414 kilopascals (kPa). The first pressure regulator should then be adjusted to provide a pressure of about 40 psi (276 kPa) on the gauge downstream from it. The second pressure regulator should be adjusted to provide about 20 psi (138 kPa) on the gauge downstream from it. To adjust this pressure properly, the float valve should be open at the Mg surge tank to ensure some flow through the second pressure regulator. If the float valve is closed, it can be opened by pushing down on the float or by removing liquid from the tank. Also, in the event the plug valve in the dissolver bottom has become tightly seated, it should be loosened to ensure liquid can flow through the dissolver.

Once the regulators have been adjusted to provide the proper pressures, the valve at the flowmeter to the crystallizer can be set to the desired flow rate of about 117 gal per h (443 L/h). The bed in the crystallizer can be viewed through the crystallizer wall to note the position of the bed top and the character of bed motion. The Mg pump can then be started, and the motor speed control used to bring the flow rate as read on the flowmeter to 10 gal per h (37.9 L/h). The flow rate can be adjusted as necessary to achieve the target supplementation of 30 ppm to the liquid entering the crystallizer, based on sampling and analysis of the Mg solution from the surge tank. The bed in the dissolver should also be viewed to ensure there is motion, indicating the liquid is percolating through the bed. If the bed top has fallen to below the desired level of about 8 in (20.3 cm) from the bottom, magnesite can be added by filling a bottle or small can half full with magnesite, then wetting it with liquid and pouring it into the dissolver top. If the float has been pushed down to achieve flow at the float valve for start-up, the float valve can now be released.

The pressures and flows of the gases can then be started. Open the valve at the ammonia tank and at the ammonia flowmeter. Set the ammonia pressure regulator to 10 to 15 psi (69 to 103 kPa), then the flowmeter to the rate necessary to achieve the desired pH rise in the crystallizer. In the current design, a pH rise of about three-quarters of a pH point is called for, and a flowmeter reading of 10% to 15% will likely be needed. This reading will permit 20 to 40 g/h of ammonia to flow, or about 25 to 50 L/h at standard temperature and pressure. To measure the pH rise, use a pH meter to compare the pH in the raw liquid against the pH in the liquid at the crystallizer top. Now check the Mg surge tank to see if its liquid level has stabilized. If so, open the valve on the $CO_2$ tank and set the pressure regulator to about 22 psi (152 kPa), or about 2 psi (14 kPa) above the pressure indicated downstream of the second pressure regulator on the liquid lines. Set the valve on the $CO_2$ flowmeter to achieve a pH in the dissolver overflow of about one point below the raw lagoon water pH. If the valve at the flowmeter is opened all the way, yet the pH at the dissolver top remains too high, increase the pressure on the $CO_2$ pressure regulator by 2 psi (14 kPa). Several minutes should be allowed after adjusting the $CO_2$ flow rate before checking the pH at the dissolver top, because it will take a few minutes for a change in $CO_2$ flow to result in pH change.

Shutting Down

Shut-down procedure will be in general the reverse of the start-up. Turn the $CO_2$ pressure regulator to zero and close the valves at the $CO_2$ tank and flowmeter. Turn the ammonia pressure regulator also to zero, and close the valves at the ammonia tank and flowmeter. Turn off the Mg pump. Place the plug valve loosely in the crystallizer bottom if it has been removed. Open fully the valve on the recycle line from the main pump discharge and close the valve at the flowmeter into the crystallizer to shut off flow to the crystallizer. Turn off the main pump and then close the recycle valve to prevent slow leakage of liquid in the suction through the foot valve. Slowing the leakage will better maintain the prime on the main pump for easier start-up.

Removing Product

Product should be removed from the crystallizer periodically to prevent the bed top from rising so high that bed material could overflow into the exiting treated liquid. Keeping the bed from growing too heavy will also minimize chances that the bed will develop a channel instead of fluidizing evenly.

Product can be removed without shutting the system down. First, check to make sure the cap has been screwed onto the drain of the product chamber. Then, if the chamber is not already filled with liquid, remove the cap from the fill line and, using a hose, fill the chamber with water and replace the cap. Bail one or two buckets of liquid from the crystallizer top to lower the liquid level to several inches below the overflow. Then, immediately open the ball valve above the product chamber to release any remaining trapped air before the liquid level rises to the overflow level, thus providing an opportunity for any bed material stirred up by the escaping air to settle before liquid again begins to overflow. Turn the Mg liquid and ammonia flows to one-quarter or less of their normal flow rates. Using the valve at the flowmeter for liquid into the crystallizer, reduce the flow rate until bed material can be seen falling into the collector basket.

When the basket appears nearly full, increase the crystallizer liquid flow, the Mg liquid flow, and the ammonia flow to their normal levels again. Close the ball valve above the product chamber and place the plug valve loosely into the crystallizer bottom. Drain the liquid from the product chamber by removing the drain cap. Unfasten the door on the chamber and remove the filled basket. Slide an emptied one back into the chamber and re-secure the door. Screw the cap back onto the drain and open the fill line, re-fill the chamber with water, and screw the cap onto the fill line. Empty the product from the filled basket onto a smooth surface and spread into a thin layer to dry.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. An apparatus for removing phosphorus from a wastewater effluent stream comprising:
   (a) a continuous crystallizer tower comprising a fluidized bed of struvite therein and a struvite crystal product collection chamber therebeneath, said crystallizer being formed such that the cross sectional area thereof generally increases from a relatively smaller cross sectional area at the bottom thereof to a relatively larger cross sectional area at the top thereof;
   (b) a dissolver tower comprising a bed of magnesite therein;
   (c) a first pump for pumping a first portion of the wastewater effluent to the bottom of the continuous crystallizer and a second portion of the wastewater effluent to the bottom of the dissolver tower;
   (d) a second pump for pumping magnesium overflow solution from the top of the dissolver tower to the bottom of the continuous crystallizer tower;
   (e) an ammonia source for injecting ammonia into the first portion of the wastewater effluent at the bottom of the continuous crystallizer;
   (f) a carbon dioxide ($CO_2$) source for injecting carbon dioxide into the second portion of the wastewater effluent entering the bottom of the dissolver tower; and
   (g) a drain for capturing the treated wastewater effluent from the top of the continuous crystallizer tower.

2. The apparatus according to claim 1 wherein the crystallizer tower comprises an inverted cone-shaped tower about 60 inches high and about 1.5 inches in diameter at the bottom and 10.0 inches in diameter at the top.

3. The apparatus according to claim 1 wherein the apparatus operates at up to about 600 L/h of total liquid flow therethrough.

4. The apparatus according to claim 1 wherein the crystallizer includes a plug valve at the bottom thereof for selectively operating and purging the continuous crystallizer.

5. The apparatus according to claim 1 wherein the dissolver tower comprises an inverted cone-shaped tower with a cone-shaped plug valve at the bottom thereof.

6. The apparatus according to claim 1 wherein the first pump comprises a centrifugal pump.

7. The apparatus according to claim 1 wherein the second pump comprises a variable speed gear pump.

8. The apparatus according to claim 1 wherein the ammonia source comprises a pressurized ammonia cylinder.

9. The apparatus according to claim 1 wherein the $CO_2$ source comprises a pressurized $CO_2$ cylinder.

10. The apparatus according to claim 1 wherein the drain conducts treated wastewater effluent to a storage reservoir.

11. The apparatus according to claim 1 including a tank for receiving magnesium overflow solution directly from the dissolver tower and from which the second pump then pumps the solution to the bottom of the crystallizer tower.

12. The apparatus according to claim 11 including a float valve on the tank for maintaining a proper level of magnesium in the tank.

* * * * *